US011718984B2

(12) United States Patent
Tiramani et al.

(10) Patent No.: US 11,718,984 B2
(45) Date of Patent: Aug. 8, 2023

(54) LIFTABLE FOLDABLE TRANSPORTABLE BUILDINGS

(71) Applicant: Build IP LLC, North Las Vegas, NV (US)

(72) Inventors: Paolo Tiramani, Las Vegas, NV (US); Galiano Tiramani, Las Vegas, NV (US); Kyle Denman, North Las Vegas, NV (US)

(73) Assignee: Build IP LLC, North Las Vegas, NV (US)

( * ) Notice: Subject to any disclaimer, the term of this patent is extended or adjusted under 35 U.S.C. 154(b) by 0 days.

(21) Appl. No.: 17/675,653

(22) Filed: Feb. 18, 2022

(65) Prior Publication Data

US 2022/0220723 A1 Jul. 14, 2022

Related U.S. Application Data

(63) Continuation-in-part of application No. 17/527,520, filed on Nov. 16, 2021, which is a continuation of
(Continued)

(51) Int. Cl.
| | |
|---|---|
| *E04H 1/00* | (2006.01) |
| *E04B 1/344* | (2006.01) |
| *E04C 2/292* | (2006.01) |
| *E04B 1/348* | (2006.01) |
| *B32B 5/18* | (2006.01) |
| *B32B 15/04* | (2006.01) |
| *B32B 15/18* | (2006.01) |
| *B32B 15/20* | (2006.01) |
| *B32B 7/12* | (2006.01) |
| *E04B 1/343* | (2006.01) |
| *E04C 2/00* | (2006.01) |

(52) U.S. Cl.
CPC .............. *E04B 1/3445* (2013.01); *B32B 5/18* (2013.01); *B32B 7/12* (2013.01); *B32B 15/046* (2013.01); *B32B 15/18* (2013.01); *B32B 15/20* (2013.01); *E04B 1/34815* (2013.01); *E04C 2/292* (2013.01); *B32B 2266/0228* (2013.01); *B32B 2419/00* (2013.01); *E04B 2001/34389* (2013.01); *E04C 2002/002* (2013.01)

(58) Field of Classification Search
CPC ................. E04C 2/292; B32B 2419/00; E04B 2001/34389
USPC .......................................................... 52/79.5
See application file for complete search history.

(56) References Cited

U.S. PATENT DOCUMENTS

| | | |
|---|---|---|
| 1,498,173 A | 6/1924 | Kelley |
| 2,063,052 A | 12/1936 | Washington |
(Continued)

FOREIGN PATENT DOCUMENTS

| | | |
|---|---|---|
| AU | 2013200386 A1 | 2/2013 |
| CA | 2227003 A1 | 7/1999 |
(Continued)

OTHER PUBLICATIONS

U.S. Appl. No. 17/527,520, filed Nov. 16, 2021, Tiramani et al.
(Continued)

*Primary Examiner* — Basil S Katcheves
(74) *Attorney, Agent, or Firm* — McCarter & English, LLP

(57) ABSTRACT

A fork tube arrangement for facilitating the movement of a foldable transportable building.

28 Claims, 30 Drawing Sheets

Related U.S. Application Data application No. PCT/US2021/059440, filed on Nov. 16, 2021, application No. 17/675,653 is a continuation-in-part of application No. PCT/US2021/056415, filed on Oct. 25, 2021.

(60) Provisional application No. 63/196,400, filed on Jun. 3, 2021, provisional application No. 63/192,349, filed on May 24, 2021, provisional application No. 63/188,101, filed on May 13, 2021, provisional application No. 63/181,447, filed on Apr. 29, 2021, provisional application No. 63/136,268, filed on Jan. 12, 2021.

(56) References Cited

U.S. PATENT DOCUMENTS

| | | |
|---|---|---|
| 2,070,924 A | 2/1937 | Derman |
| 2,126,511 A | 8/1938 | Soule |
| 2,302,101 A | 11/1942 | Boydstun |
| 2,644,203 A | 7/1953 | Donahue |
| 2,704,223 A | 3/1955 | Houdart |
| 2,780,843 A | 2/1957 | Sherbinin |
| 2,832,637 A | 4/1958 | Decosse |
| 2,883,713 A | 4/1959 | Zug |
| 2,904,849 A | 9/1959 | Bergstrom |
| 2,904,850 A | 9/1959 | Whitman et al. |
| 2,920,920 A | 1/1960 | Whitman et al. |
| 2,933,055 A | 4/1960 | Whitman et al. |
| 3,044,129 A | 7/1962 | Bigelow |
| 3,097,400 A | 7/1963 | Davis et al. |
| 3,107,116 A | 10/1963 | Weaker |
| 3,147,024 A | 9/1964 | Brockman |
| 3,206,903 A | 9/1965 | Johnson |
| 3,280,796 A | 10/1966 | Hatcher |
| 3,292,331 A | 12/1966 | Sams |
| 3,305,993 A | 2/1967 | Nels |
| 3,315,974 A | 4/1967 | Weaver et al. |
| 3,324,831 A | 6/1967 | St. Onge |
| 3,341,987 A | 9/1967 | Ragnhill |
| 3,378,276 A | 4/1968 | Fulmer |
| 3,465,488 A | 9/1969 | Miller |
| 3,468,081 A | 9/1969 | Saarinen |
| 3,469,356 A | 9/1969 | White |
| 3,497,231 A | 2/1970 | Fulmer et al. |
| 3,500,596 A | 3/1970 | Andersson |
| 3,550,334 A | 12/1970 | Van Der Lely |
| 3,611,659 A | 10/1971 | Greenlaugh |
| 3,624,786 A | 11/1971 | Lundahl |
| 3,631,999 A | 1/1972 | Walerowski |
| 3,694,977 A | 10/1972 | Verman |
| 3,711,363 A | 1/1973 | Jarema et al. |
| 3,712,007 A | 1/1973 | Kump |
| 3,720,022 A | 3/1973 | Dattner |
| 3,722,168 A | 3/1973 | Comm |
| 3,750,366 A | 8/1973 | Rich, Jr. et al. |
| 3,793,796 A | 2/1974 | Hughes |
| 3,828,502 A | 8/1974 | Carlsson |
| 3,844,063 A | 10/1974 | Jackson |
| 3,863,404 A | 2/1975 | Wahlquist |
| 3,866,365 A | 2/1975 | Honigman |
| 3,866,672 A | 2/1975 | Rich, Jr. et al. |
| RE28,367 E | 3/1975 | Rich, Jr. et al. |
| 3,971,172 A * | 7/1976 | Gentil .................. E04B 1/3483 52/28 |
| 3,983,665 A | 10/1976 | Burton |
| 3,984,949 A | 10/1976 | Wahlquist |
| 3,990,193 A | 11/1976 | Ray et al. |
| 4,035,964 A | 7/1977 | Robinson |
| 4,050,215 A | 9/1977 | Fisher |
| 4,068,434 A | 1/1978 | Day et al. |
| 4,074,475 A | 2/1978 | Wahlquist |
| 4,118,901 A | 10/1978 | Johnson |
| 4,155,204 A | 5/1979 | Prozinski |
| 4,165,591 A | 8/1979 | Fitzgibbon |
| 4,186,539 A | 2/1980 | Harmon et al. |
| 4,235,054 A | 11/1980 | Cable et al. |
| 4,360,553 A | 11/1982 | Landheer |
| 4,376,593 A | 3/1983 | Schaefer |
| 4,415,184 A | 11/1983 | Stephenson et al. |
| 4,423,913 A | 1/1984 | Lee |
| 4,441,286 A | 4/1984 | Skvaril |
| 4,464,877 A | 8/1984 | Gebhardt et al. |
| 4,534,141 A | 8/1985 | Fagnoni |
| 4,567,699 A | 2/1986 | McClellan |
| 4,570,959 A | 2/1986 | Grinwald |
| 4,592,175 A | 6/1986 | Werner |
| 4,599,829 A | 7/1986 | DiMartino, Sr. |
| 4,603,518 A | 8/1986 | Fennes |
| 4,603,658 A | 8/1986 | Garnsey |
| 4,633,626 A | 1/1987 | Freeman et al. |
| 4,635,412 A | 1/1987 | Le Poittevin |
| 4,641,468 A | 2/1987 | Slater |
| 4,644,708 A | 2/1987 | Baudot et al. |
| 4,674,250 A | 6/1987 | Altizer |
| 4,689,924 A | 9/1987 | Jurgensen |
| 4,744,182 A | 5/1988 | Shacket et al. |
| 4,766,708 A | 8/1988 | Sing |
| 4,779,514 A | 10/1988 | Prigmore et al. |
| 4,780,996 A | 11/1988 | Julien, Jr. |
| 4,856,244 A | 8/1989 | Clapp |
| 4,890,437 A | 1/1990 | Quaile |
| 4,891,919 A | 1/1990 | Palibroda |
| 4,958,874 A | 9/1990 | Hegedus |
| 4,958,974 A | 9/1990 | Schenk |
| 4,989,379 A | 2/1991 | Suzuki |
| 5,070,667 A | 12/1991 | Schulte |
| 5,107,639 A | 4/1992 | Morin et al. |
| 5,160,567 A | 11/1992 | Konicek et al. |
| 5,185,973 A | 2/1993 | Oldani et al. |
| 5,185,981 A | 2/1993 | Martinez |
| 5,218,803 A | 6/1993 | Wright |
| 5,265,394 A | 11/1993 | Gardner |
| 5,345,730 A | 9/1994 | Jurgensen |
| 5,447,000 A * | 9/1995 | Larsen ................ E04B 1/34315 52/234 |
| 5,461,832 A | 10/1995 | Smith |
| 5,491,934 A | 2/1996 | Bigelow, Jr. et al. |
| 5,497,593 A | 3/1996 | Riesberg |
| 5,596,844 A | 1/1997 | Kalinowski |
| 5,657,606 A | 8/1997 | Ressel et al. |
| 5,664,388 A | 9/1997 | Chapman et al. |
| 5,732,839 A | 3/1998 | Schimmang et al. |
| 5,755,063 A | 5/1998 | Ohnishi et al. |
| 5,761,854 A | 6/1998 | Johnson et al. |
| 5,765,330 A | 6/1998 | Richard |
| 5,775,046 A | 7/1998 | Fanger et al. |
| 5,845,441 A | 12/1998 | Swartz |
| 5,867,963 A | 2/1999 | Hershey |
| 5,899,037 A | 5/1999 | Josey |
| 5,906,075 A | 5/1999 | Sowers |
| 5,930,962 A | 8/1999 | Sokolean |
| 5,950,373 A | 9/1999 | von Hoff et al. |
| 5,966,956 A | 10/1999 | Morris et al. |
| 6,003,278 A | 12/1999 | Weaver et al. |
| 6,003,919 A | 12/1999 | Shook |
| 6,047,519 A | 4/2000 | Bagn |
| 6,054,194 A | 4/2000 | Kane |
| 6,073,413 A | 6/2000 | Tongiatama |
| 6,158,184 A | 12/2000 | Timmerman, Sr. et al. |
| 6,185,898 B1 | 2/2001 | Pratt |
| 6,195,950 B1 | 3/2001 | Harris |
| 6,223,479 B1 | 5/2001 | Stockli |
| 6,231,706 B1 | 5/2001 | Higaki et al. |
| 6,244,016 B1 | 6/2001 | Wolf |
| 6,279,284 B1 | 8/2001 | Moras |
| 6,308,469 B1 | 10/2001 | Leung |
| 6,385,942 B1 | 5/2002 | Grossman et al. |
| 6,481,165 B1 | 11/2002 | Romary et al. |
| 6,481,172 B1 | 11/2002 | Porter |
| 6,625,937 B1 | 9/2003 | Parker et al. |
| 6,663,740 B2 | 12/2003 | Yamasaki |
| 6,745,531 B1 | 6/2004 | Egan |
| 6,925,761 B1 | 8/2005 | De La Marche |

(56) References Cited

U.S. PATENT DOCUMENTS

| | | |
|---|---|---|
| 6,941,718 B1 | 9/2005 | diGirolamo et al. |
| 6,959,514 B1 | 11/2005 | Pingel |
| 6,959,515 B1 | 11/2005 | Beighton |
| 6,983,567 B2 | 1/2006 | Ciotti |
| 6,996,947 B2 | 2/2006 | Albora |
| 6,997,495 B1 | 2/2006 | Groezinger |
| 7,299,596 B2 | 11/2007 | Hildreth |
| 7,326,022 B2 | 2/2008 | Brown et al. |
| 7,444,953 B1 | 11/2008 | Player |
| 7,740,257 B2 | 6/2010 | Haire |
| 7,828,367 B2 | 11/2010 | Hickam et al. |
| 7,841,136 B2 | 11/2010 | Czyznikiewicz |
| 7,882,659 B2 | 2/2011 | Gyory et al. |
| 7,930,857 B2 | 4/2011 | Pope |
| 8,141,304 B2 | 3/2012 | Shen et al. |
| 8,166,715 B2 | 5/2012 | De Azambuja |
| 8,186,109 B2 | 5/2012 | Warminsky |
| 8,201,362 B2 | 6/2012 | Alford et al. |
| 8,276,328 B2 | 10/2012 | Pepin |
| 8,347,560 B2 | 1/2013 | Gyory et al. |
| 8,365,473 B2 | 2/2013 | Bjerre |
| 8,474,194 B2 | 7/2013 | Tiramani |
| 8,516,778 B1 | 8/2013 | Wilkens |
| 8,733,029 B2 | 5/2014 | Tiramani |
| 8,925,270 B2 | 1/2015 | Grisolia et al. |
| 9,617,739 B2 | 4/2017 | Krause |
| D820,469 S | 6/2018 | Watson |
| 10,196,173 B2 | 2/2019 | Tiramani |
| 10,661,835 B2 | 5/2020 | Tiramani |
| 10,688,906 B2 | 6/2020 | Tiramani et al. |
| 10,829,029 B2 | 11/2020 | Tiramani et al. |
| 10,926,689 B2 | 2/2021 | Tiramani et al. |
| 10,961,016 B2 | 3/2021 | Tiramani |
| 11,007,921 B2 | 5/2021 | Tiramani et al. |
| 11,066,832 B2 | 7/2021 | Krause |
| 11,118,344 B2 | 9/2021 | Tiramani et al. |
| 11,220,816 B2 | 1/2022 | Tiramani et al. |
| 11,525,256 B2 | 12/2022 | Tiramani et al. |
| 11,554,898 B2 | 1/2023 | Brunner et al. |
| 2001/0004820 A1 | 6/2001 | Poliquin |
| 2002/0046514 A1 | 4/2002 | Leung |
| 2002/0095896 A1 | 7/2002 | Commins et al. |
| 2002/0179598 A1 | 12/2002 | Kuhn |
| 2003/0009964 A1 | 1/2003 | Trarup et al. |
| 2003/0051314 A1 | 3/2003 | Jenks |
| 2003/0071426 A1 | 4/2003 | Larouche |
| 2004/0108750 A1 | 6/2004 | Park |
| 2004/0128930 A1 | 7/2004 | Ohnishi |
| 2004/0139674 A1 | 7/2004 | DiLorenzo |
| 2004/0148889 A1 | 8/2004 | Bibee et al. |
| 2004/0177581 A1 | 9/2004 | Starke |
| 2005/0055973 A1 | 3/2005 | Hagen et al. |
| 2005/0066620 A1 | 3/2005 | Albora |
| 2005/0076600 A1 | 4/2005 | Moody et al. |
| 2005/0122014 A1 | 6/2005 | Bucher et al. |
| 2005/0283371 A1 | 12/2005 | Tiramani |
| 2006/0037256 A1 | 2/2006 | Pryor |
| 2006/0070306 A1 | 4/2006 | Lin |
| 2006/0137269 A1 | 6/2006 | Di Lorenzo |
| 2006/0150573 A1 | 7/2006 | Elliott et al. |
| 2006/0251851 A1 | 11/2006 | Bowman |
| 2006/0260268 A1 | 11/2006 | Ritchie |
| 2007/0051069 A1 | 3/2007 | Grimes |
| 2007/0079573 A1 | 4/2007 | Sarine et al. |
| 2007/0096473 A1 | 5/2007 | Ortega |
| 2007/0144078 A1 | 6/2007 | Frondelius |
| 2007/0170740 A1 | 7/2007 | Di Franco |
| 2007/0209294 A1 | 9/2007 | Harvey |
| 2007/0271857 A1 | 11/2007 | Heather et al. |
| 2008/0047225 A1 | 2/2008 | Kawai et al. |
| 2008/0066417 A1 | 3/2008 | Orchard |
| 2008/0134589 A1* | 6/2008 | Abrams .............. E04B 1/34807 52/79.1 |
| 2008/0264463 A1 | 10/2008 | Kim et al. |
| 2009/0014044 A1 | 1/2009 | Hartman et al. |
| 2009/0139153 A1 | 6/2009 | Hudson |
| 2009/0193734 A1 | 8/2009 | Harig et al. |
| 2009/0205277 A1 | 8/2009 | Gibson |
| 2009/0217600 A1 | 9/2009 | De Azambuja |
| 2009/0239059 A1* | 9/2009 | Kipp .................. C04B 28/26 428/323 |
| 2009/0266006 A1 | 10/2009 | Gyory et al. |
| 2009/0293395 A1 | 12/2009 | Porter |
| 2010/0012000 A1 | 1/2010 | Gordon |
| 2010/0018130 A1 | 1/2010 | Lopez et al. |
| 2010/0018131 A1* | 1/2010 | Green ................ E04B 1/34807 52/79.5 |
| 2010/0043309 A1* | 2/2010 | Martin .................... E03C 1/01 52/79.5 |
| 2010/0162636 A1 | 7/2010 | Bonebrake |
| 2010/0192481 A1 | 8/2010 | Shen et al. |
| 2010/0269419 A1 | 10/2010 | Gyory et al. |
| 2011/0094167 A1 | 4/2011 | Noiseux et al. |
| 2011/0126479 A1 | 6/2011 | Alford et al. |
| 2011/0268916 A1 | 11/2011 | Pardue, Jr. |
| 2011/0297675 A1 | 12/2011 | Johnson et al. |
| 2012/0006369 A1 | 1/2012 | Cantin et al. |
| 2012/0137610 A1 | 6/2012 | Knight et al. |
| 2012/0180404 A1 | 7/2012 | Scouten |
| 2012/0240501 A1 | 9/2012 | Spiegel |
| 2012/0255240 A1 | 10/2012 | Shen |
| 2012/0317902 A1 | 12/2012 | Kapteyn |
| 2013/0036688 A1 | 2/2013 | Gosain |
| 2013/0067841 A1 | 3/2013 | Grieco et al. |
| 2013/0081346 A1 | 4/2013 | Kulprathipanja et al. |
| 2013/0232902 A1 | 9/2013 | Mayer et al. |
| 2013/0263527 A1 | 10/2013 | Barrett et al. |
| 2013/0269267 A1 | 10/2013 | Tiramani |
| 2013/0283618 A1 | 10/2013 | Wiliams |
| 2013/0305626 A1 | 11/2013 | Strickland et al. |
| 2013/0326986 A1 | 12/2013 | Krivtsov et al. |
| 2014/0001786 A1 | 1/2014 | Cantin et al. |
| 2014/0033619 A1 | 2/2014 | Merchant |
| 2014/0115991 A1 | 5/2014 | Sievers et al. |
| 2014/0150352 A1 | 6/2014 | Lee |
| 2014/0157710 A1 | 6/2014 | Potter et al. |
| 2014/0202089 A1 | 7/2014 | Nakajima et al. |
| 2014/0311051 A1 | 10/2014 | Fagan |
| 2015/0007506 A1 | 1/2015 | Wallance |
| 2015/0034634 A1 | 2/2015 | Mullaney |
| 2015/0076728 A1* | 3/2015 | Mathieu ............. B28B 23/0006 425/456 |
| 2015/0079356 A1* | 3/2015 | Mathieu .................. E04C 2/049 428/192 |
| 2015/0093535 A1 | 4/2015 | Lambach et al. |
| 2015/0121775 A1 | 5/2015 | Lippert |
| 2015/0135623 A1 | 5/2015 | Garrett et al. |
| 2015/0204068 A1 | 7/2015 | Miller |
| 2015/0239221 A1 | 8/2015 | Gillman |
| 2015/0315776 A1* | 11/2015 | Duncan ................. B65D 90/14 52/66 |
| 2015/0322668 A1 | 11/2015 | Quinn et al. |
| 2015/0361653 A1 | 12/2015 | Grant et al. |
| 2016/0059104 A1 | 3/2016 | Monaco |
| 2016/0069062 A1 | 3/2016 | Dynon |
| 2016/0069067 A1 | 3/2016 | Ciuperca |
| 2016/0138258 A1 | 5/2016 | Schatfert et al. |
| 2016/0160501 A1 | 6/2016 | Taraba et al. |
| 2016/0160515 A1* | 6/2016 | Wallance ................ E04F 10/10 52/745.02 |
| 2016/0208479 A1 | 7/2016 | Krause |
| 2016/0215508 A1 | 7/2016 | Kimel |
| 2017/0030071 A1 | 2/2017 | Sorensen et al. |
| 2017/0037637 A1 | 2/2017 | Grisolia et al. |
| 2017/0051497 A1* | 2/2017 | Kolbe .................. E04H 1/1205 |
| 2017/0107011 A1* | 4/2017 | Melland ............... B65D 19/004 |
| 2017/0145692 A1 | 5/2017 | Zheng et al. |
| 2017/0146055 A1 | 5/2017 | Lowrey |
| 2017/0260737 A1* | 9/2017 | Ota ......................... E04H 1/02 |
| 2017/0268232 A1 | 9/2017 | Renke et al. |
| 2017/0306610 A1* | 10/2017 | Leahy .................... E04C 2/526 |
| 2017/0323780 A1 | 11/2017 | Koga et al. |
| 2017/0342723 A1 | 11/2017 | Krause |
| 2017/0350114 A1 | 12/2017 | Crozier |

(56) References Cited

U.S. PATENT DOCUMENTS

| | | | |
|---|---|---|---|
| 2018/0016781 A1 | 1/2018 | Fox et al. | |
| 2018/0079589 A1* | 3/2018 | Meister | B65D 88/129 |
| 2018/0112394 A1 | 4/2018 | Giles | |
| 2018/0141134 A1 | 5/2018 | Brigham | |
| 2018/0148923 A1 | 5/2018 | Bravo Valenzuela | |
| 2018/0313074 A1 | 11/2018 | Brown et al. | |
| 2019/0010692 A1* | 1/2019 | Segall | E04H 1/005 |
| 2019/0024364 A1 | 1/2019 | Lestini et al. | |
| 2019/0056237 A1 | 2/2019 | White et al. | |
| 2019/0100908 A1 | 4/2019 | Tiramani et al. | |
| 2019/0128847 A1 | 5/2019 | Humfeld et al. | |
| 2019/0161964 A1 | 5/2019 | Figueroa | |
| 2019/0352515 A1 | 11/2019 | Zoitos et al. | |
| 2020/0002552 A1 | 1/2020 | Song et al. | |
| 2020/0123776 A1 | 4/2020 | Leatherman et al. | |
| 2020/0263412 A1 | 8/2020 | Tiramani et al. | |
| 2020/0263413 A1 | 8/2020 | Tiramani et al. | |
| 2020/0317880 A1 | 10/2020 | Ruckdaeschel et al. | |

FOREIGN PATENT DOCUMENTS

| | | |
|---|---|---|
| CA | 2442403 C | 12/2008 |
| CA | 2665960 A1 | 8/2009 |
| CH | 713912 A1 | 12/2018 |
| CN | 101249663 A | 8/2008 |
| CN | 205935221 U | 2/2017 |
| CN | 107012982 A | 8/2017 |
| CN | 206957136 U | 2/2018 |
| CN | 110000252 A | 7/2019 |
| CN | 110273517 B | 7/2020 |
| CN | 113423901 A | 9/2021 |
| CN | 113454302 A | 9/2021 |
| CN | 214994585 U | 12/2021 |
| DE | 1937440 A1 | 2/1971 |
| DE | 19800291 A1 | 7/1999 |
| DE | 19631647 C2 | 4/2000 |
| EP | 0205278 A1 | 12/1986 |
| EP | 2000611 A2 | 12/2008 |
| EP | 2636807 A2 | 9/2013 |
| EP | 3059357 A1 | 8/2016 |
| EP | 3239423 A1 | 11/2017 |
| FR | 1484291 A | 6/1967 |
| FR | 2652620 A1 | 4/1991 |
| GB | 1209160 A | 10/1970 |
| GB | 2290567 A | 1/1996 |
| WO | 86/04630 A1 | 8/1986 |
| WO | 1996013402 A1 | 5/1996 |
| WO | 1997013931 A1 | 4/1997 |
| WO | 2002066755 A1 | 8/2002 |
| WO | 2006056383 A1 | 1/2006 |
| WO | 2008067592 A1 | 6/2008 |
| WO | 2012154898 A1 | 11/2012 |
| WO | 2014/169320 A1 | 10/2014 |
| WO | 2015155438 A1 | 10/2015 |
| WO | 2016074116 A1 | 5/2016 |
| WO | 2017182471 A1 | 10/2017 |
| WO | 2019121958 A1 | 6/2019 |
| WO | 2020167671 A2 | 8/2020 |
| WO | 2020167673 A1 | 8/2020 |
| WO | 2020167674 A1 | 8/2020 |

OTHER PUBLICATIONS

U.S. Appl. No. 17/539,706, filed Dec. 1, 2021, Tiramani et al.
U.S. Appl. No. 17/513,176, filed Oct. 28, 2021, Tiramani et al.
U.S. Appl. No. 17/513,207, filed Oct. 28, 2021, Tiramani et al.
U.S. Appl. No. 17/513,266, filed Oct. 28, 2021, Tiramani et al.
U.S. Appl. No. 17/587,051, filed Jan. 28, 2022, Tiramani et al.
U.S. Appl. No. 17/504,883, filed Oct. 19, 2021, Tiramani et al.
U.S. Appl. No. 17/675,646, filed Feb. 18, 2022, Tiramani et al.
U.S. Appl. No. 17/552,108, filed Dec. 15, 2021, Tiramani et al.
U.S. Appl. No. 17/569,962, filed Jan. 6, 2022, Tiramani et al.
U.S. Appl. No. 17/245,187, filed Apr. 30, 2021, Tiramani et al.
U.S. Appl. No. 17/786,202, filed Oct. 20, 2022, Tiramani et al.
U.S. Appl. No. 17/592,984, filed Feb. 4, 2022, Tiramani et al.
U.S. Appl. No. 17/592,986, filed Feb. 4, 2022, Tiramani et al.
U.S. Appl. No. 17/592,988, filed Feb. 4, 2022, Tiramani et al.
U.S. Appl. No. 17/592,990, filed Feb. 4, 2022, Tiramani et al.
International Search Report and Written Opinion from related Int'l Patent Appl'n No. PCT/US2022/01699 dated Jul. 7, 2022.
APA Product Guide—Structural Insulated Panels, printed 2018.
International Search Report and Written Opinion from related Int'l Patent Appl'n No. PCT/US2020/017524 dated Jul. 30, 2020.
International Search Report and Written Opinion from related Int'l Patent Appl'n No. PCT/US2021/061343 dated Feb. 9, 2022.
International Search Report and Written Opinion from related Int'l Patent Appl'n No. PCT/US2021/056415 dated Feb. 25, 2022.
International Search Report and Written Opinion from related Int'l Patent Appl'n No. PCT/US2021/058912 dated Feb. 24, 2022.
Moore, Tom, PE, "SIPs: An Engineer's Perspective," Powerpoint presented by the Structural Insulated Panel Association, 2018.
Structural Insulated Panels Association, "Designing With SIP's: Design Considerations", printed 2018.
Video entitled, "Mega advanced Boxabl tech?", found at: https://www.facebook.com/boxabl/videos/660885174475648/ (May 8, 2020).
Video entitled, "Mega advanced Boxabl tech?", found at: https://www.tiktok.com/@boxabl/video/6824523989658930437?is_copy_url=1&is_from_webapp=v1 (May 8, 2020).
Video entitled, "Sneak peek of some Boxabl parts being made in a fully automated steel processing . . . ," found at: https://www.facebook.com/boxabl/videos/1113135289041201/ (Apr. 30, 2020).
European Search Report from related European patent application No. 18864413.2 dated May 19, 2021.
European Search Report from related European patent application No. 18863822.5 dated Jun. 28, 2021.
topsider.com/floorF.html—believed available as submitted herewith by May 13, 2008.
Ching, Building Construction Illustrated (3d edition), Wall Systems 5.03, believed available as submitted herewith by Oct. 3, 2006.
BOCA 1999 (14th edition), p. 267, believed available as submitted herewith by Oct. 3, 2006.
Portion of www.thisoldhouse.com , believed available as submitted herewith by Aug. 2, 2006.
Pages 1 and 2 of //www.taunton.com/finehomebuilding/pages/h00023.asp , believed available as submitted herewith by Aug. 2, 2006.
Affidavit of Robert Delorenzo dated Oct. 3, 2006.
Decision on Appeal, Ex Parte Paolo Tiramani, Appeal 2010-008385, U.S. Appl. No. 10/653,523, dated Aug. 28, 2012.
International Search Report & Written Opinion, dated Jan. 2, 2019, in PCT/US2018/053006. (15 Pages).
International Search Report & Written Opinion, dated Jan. 29, 2019 in corresponding PCT application No. PCT/US2018/053015.
Heavy Timbers, Structural Insulated Panels, SIPS, http://heavytimbers.com/sips.html. last viewe Oct. 31, 2018.
International Search Report and Written Opinion from related International Patent Application No. PCT/US2020/017527 dated Jun. 4, 2020.
Thomas, Robert, MgO Board, igO Board, https://www.wconline.com/articles/85449-mgo-board, Oct. 31, 2007.
International Search Report and Written Opinion from related International Patent Application No. PCT/US2020/017528 dated May 1, 2020.
International Search Report and Written Opinion from related Int'l Patent Appl'n No. PCT/US2021/059440 dated Mar. 16, 2022.
Search Report from related European Patent Application No. 20755992.3 dated Oct. 7, 2022.
Search Report from related European Patent Application No. 20755993.1 dated Nov. 17, 2022.
European Office Action for Application No. 20755992.3, dated Feb. 3, 2023, 24 pages.
Non-Final Office Action from related U.S. Appl. No. 17/675,646 dated Feb. 2, 2023.
International Search Report and Written Opinion from related Int'l Patent Appl'n No. PCT/US2022/014224 dated Apr. 25, 2022.

(56) References Cited

OTHER PUBLICATIONS

International Search Report and Written Opinion from related Int'l Patent Appl'n No. PCT/US2021/063581 dated May 3, 2022.
International Search Report and Written Opinion from related Int'l Patent Appl'n No. PCT/US2022/011415 dated May 24, 2022.
First Examination Report from related Chinese Patent Application No. 202080014606.4 dated Apr. 20, 2022.
U.S. Non-Final Office Action from related U.S. Appl. No. 16/786,202 dated Apr. 22, 2022.
First Examination Report from related Chinese Patent Application No. 202080014607.9 dated Mar. 24, 2022.

* cited by examiner

LIFTABLE FOLDABLE TRANSPORTABLE BUILDINGS

CROSS-REFERENCES TO RELATED APPLICATIONS

This application is a continuation in part of U.S. patent application Ser. No. 17/527,520, filed Nov. 16, 2021, which application is a continuation of PCT Patent Application No. PCT/US/2021/059440, filed Nov. 16, 2021 and which application claims the benefit of U.S. Provisional Application No. 63/188,101, filed May 13, 2021 and U.S. Provisional Application No. 63/136,268, filed Jan. 12, 2021; this application is also a continuation in part of PCT Patent Application No. PCT/US/2021/056415, filed Oct. 25, 2021, which application claims the benefit of U.S. Provisional Application No. 63/196,400, filed Jun. 3, 2021, U.S. Provisional Application No. 63/181,447, filed Apr. 29, 2021 and U.S. Provisional Application No. 63/136,268, filed Jan. 12, 2021; and this application claims the benefit of U.S. Provisional Application No. 63/188,101, filed May 13, 2021, U.S. Provisional Application No. 63/181,447, filed Apr. 29, 2021, and U.S. Provisional Application No. 63/192,349, filed May 24, 2021.

BACKGROUND OF THE INVENTION

Field of the Invention

The inventions herein relate to structures, such as dwellings and other buildings for residential occupancy, commercial occupancy and/or material storage, and to components for such structures.

Description of the Related Art

In the field of residential housing, the traditional technique for building homes is referred to as "stick-built" construction, where a builder constructs housing at the intended location using in substantial part raw materials such as wooden boards, plywood panels, and steel columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like, in an effort to reduce costs. In this regard, significant advancements in the construction of dwellings and commercial space have been made by the current inventors, as exemplified by their patent documents, including U.S. Pat. Nos. 8,474,194, 8,733,029, 10,688,906, 10,829,029, 10,926,689 and 11,220,816. In one aspect, these patents pertain to fabricating wall, floor and roof components in a factory that are folded together into a compact shipping module, and which are then transported to the intended location and unfolded to yield a fully formed structure.

SUMMARY OF THE INVENTION

In one aspect, the present inventions are directed to a folded building structure transportable to a desired site at which the building structure is to be erected, which comprises a fixed space portion that includes a planar rectangular first floor portion having first and second longitudinal floor edges, first and second transverse floor edges and a thickness, with the first floor portion comprising across its thickness (i) a first structural layer having a first face and an opposing second face; (ii) a foam panel layer having a first face and an opposing second face, the first face of the foam panel layer being bonded to the opposing second face of the first structural layer; (iii) a second structural layer having a first face and an opposing second face, the first face of the second structural layer being bonded to the opposing second face of the foam panel layer; and (iv) a first edge reinforcement proximate the first longitudinal floor edge, and a second edge reinforcement proximate the second longitudinal floor edge. Between the first structural layer and the second structural layer, the first floor portion includes (i) a first fork tube oriented in a transverse direction and spanning the distance from the first longitudinal floor edge to the second longitudinal-floor edge so as to define a first aperture in the first longitudinal floor edge and a second aperture in the second longitudinal floor edge, (ii) a planar elongate longitudinally-oriented first fork tube plate secured to the first edge reinforcement and to the first fork tube; and (iv) a planar elongate longitudinally-oriented second fork tube plate secured to the second edge reinforcement and to the first fork tube.

This and other aspects of the present inventions are described in the drawings annexed hereto, and in the description of the preferred embodiments and claims set forth below.

DETAILED DESCRIPTION OF THE PREFERRED EMBODIMENTS

Figure 1:
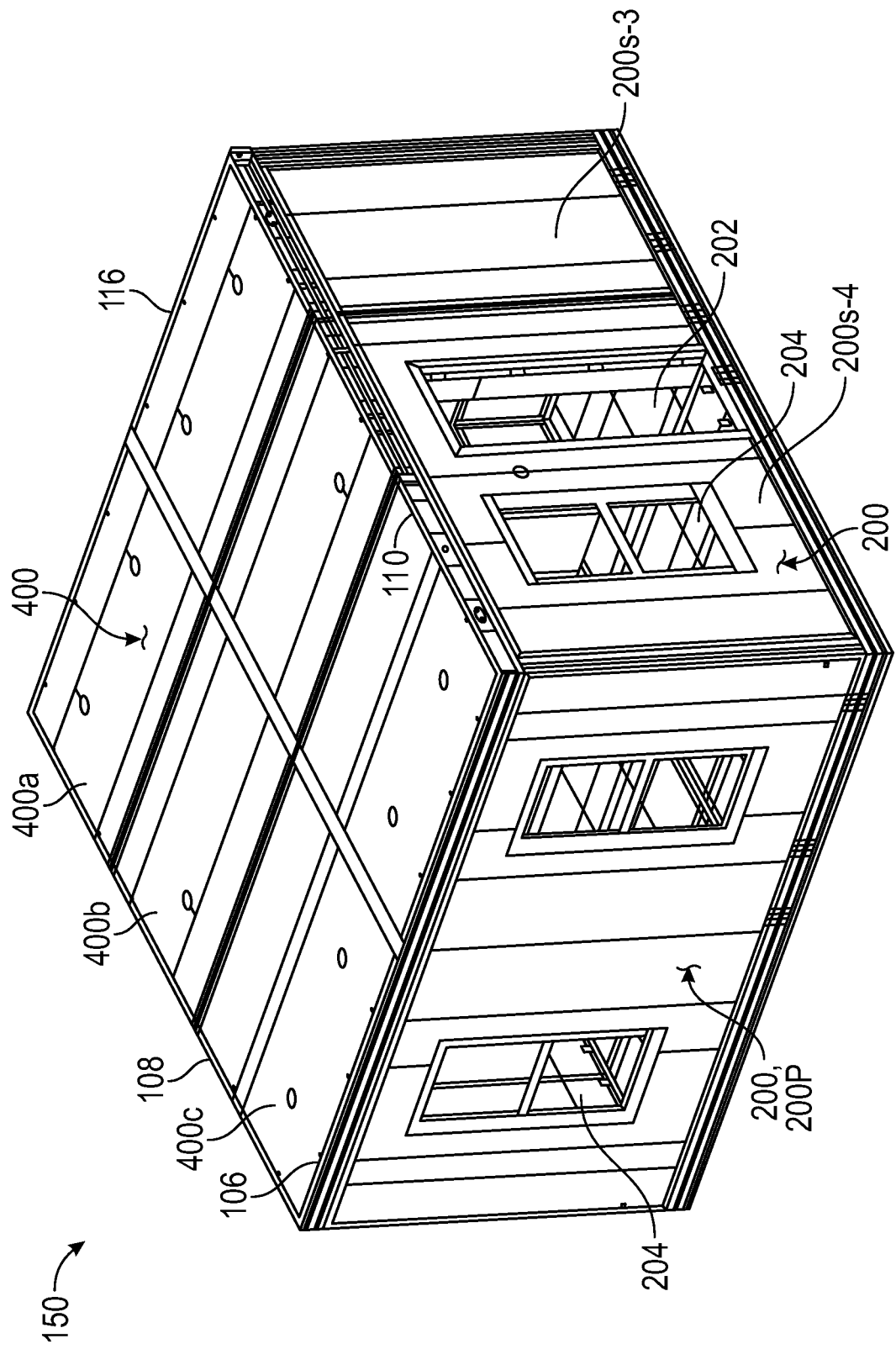
FIG. 1 is a perspective view of a structure prepared in accordance with the present inventions.
Figure 2:
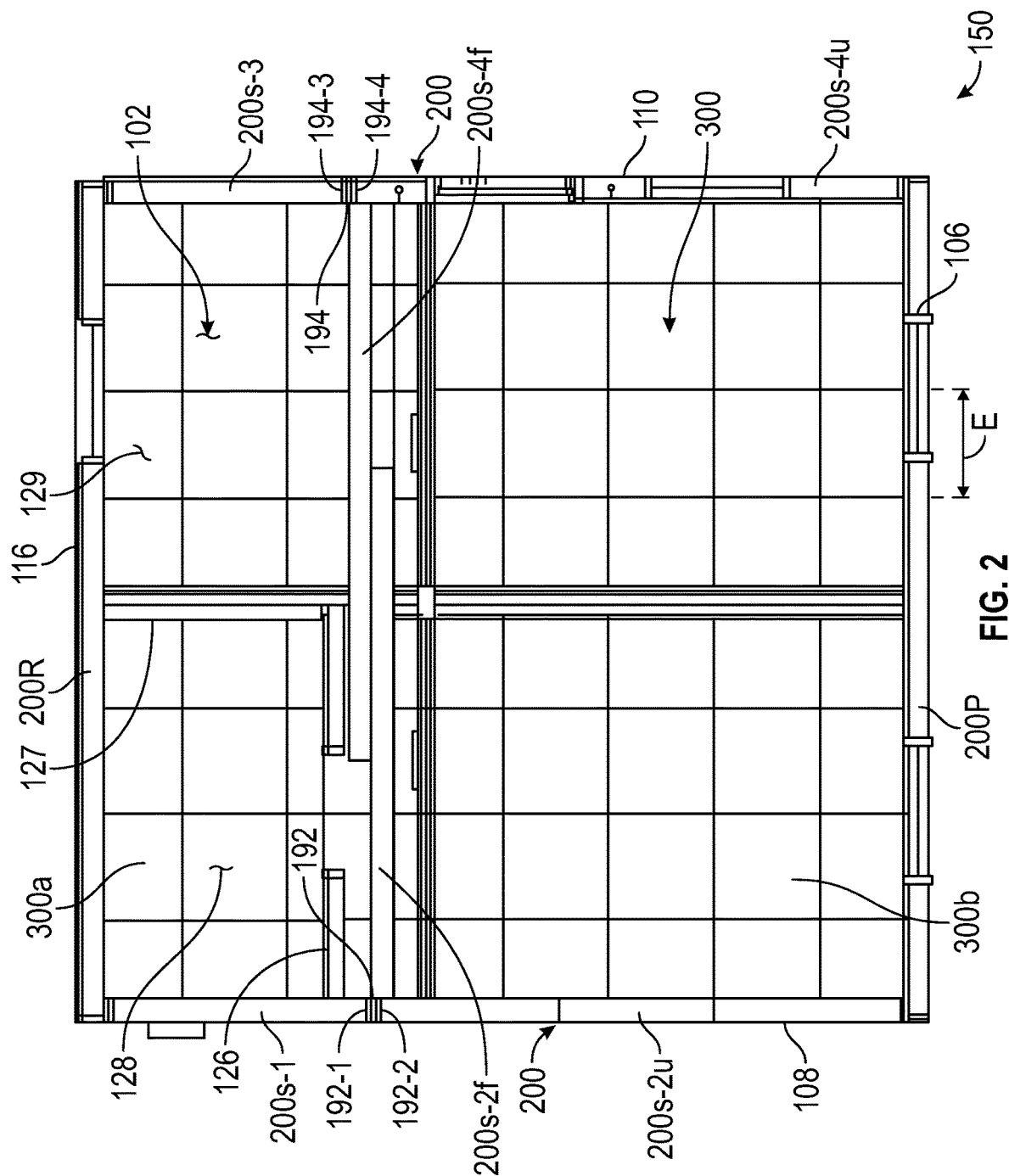
FIG. 2 is a top schematic view of the structure shown in FIG. 1.

An embodiment of the foldable, transportable structure 150 in which the inventions disclosed herein can be implemented is depicted in FIGS. 1 through 5. When fully unfolded, as exemplified by FIG. 1, structure 150 has a rectangular shape made of three types of generally planar and rectangular enclosure components 155, the three types of enclosure components 155 consisting of a wall component 200, a floor component 300, and a roof component 400. As shown in FIGS. 1 and 2, the perimeter of structure 150 is defined by first longitudinal edge 106, first transverse edge 108, second longitudinal edge 116 and second transverse edge 110. For convenience, a direction parallel to first longitudinal edge 106 and second longitudinal edge 116 may be referred to as the "longitudinal" direction, a direction parallel to first transverse edge 108 and second transverse edge 110 may be referred to as the "transverse" direction; and a direction parallel to the vertical direction in FIG. 1 may be referred to as the "vertical" direction. Structure 150 as shown has one floor component 300, one roof component 400 and four wall components 200; although it should be understood that the present inventions are applicable to structures having other configurations as well.

Figure 3:
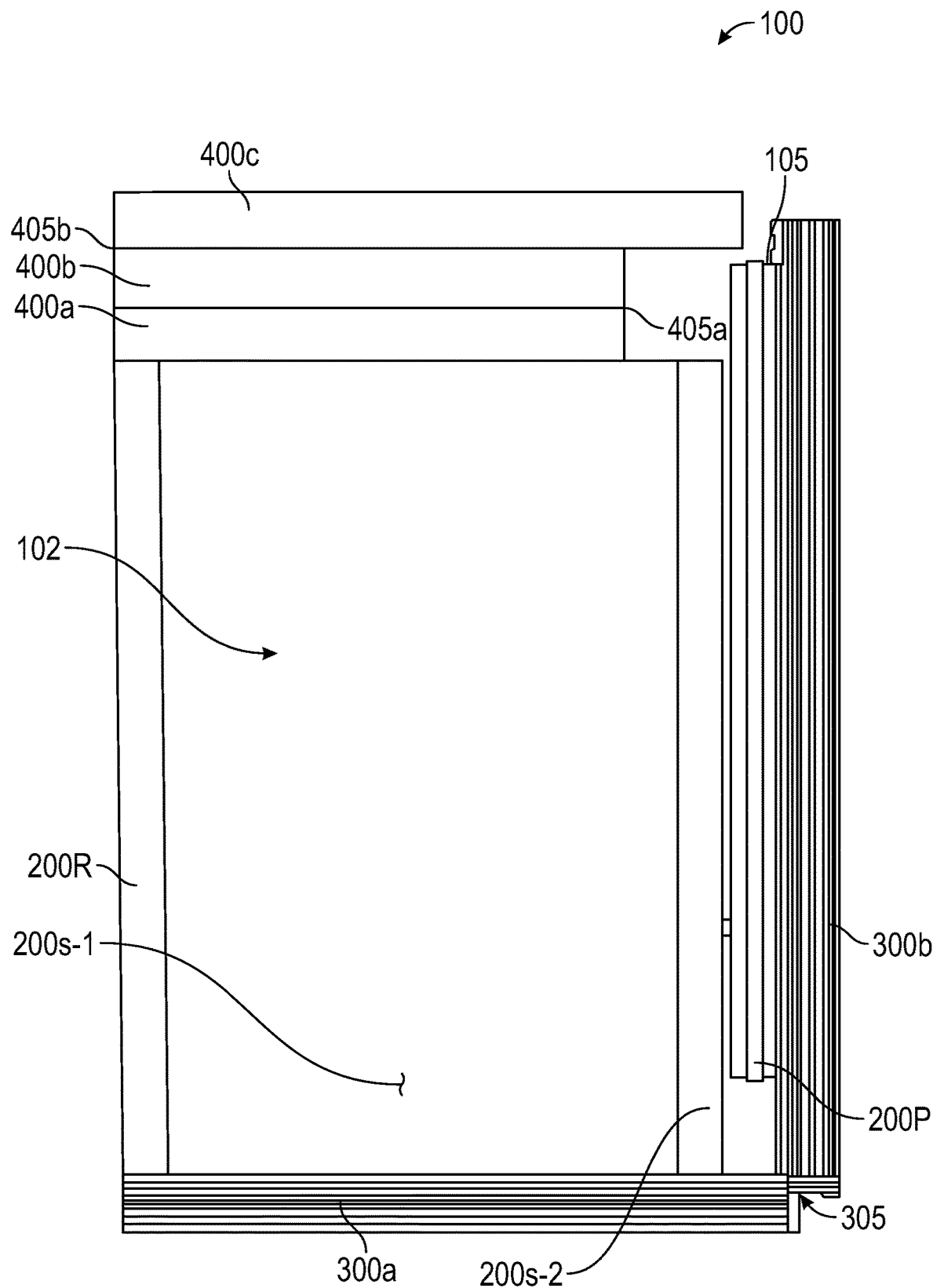
FIG. 3 is an end view of a shipping module from which is formed the finished structure shown in FIG. 1.

Enclosure components 155 (wall component 200, floor component 300 and roof component 400) can be fabricated and dimensioned as described herein and positioned together to form a shipping module 100, shown end-on in FIG. 3. The enclosure components 155 are dimensioned so that the shipping module 100 is within U.S. federal highway dimensional restrictions. As a result, shipping module 100 can be transported over a limited access highway more easily, and with appropriate trailering equipment, transported without the need for oversize permits. Thus, the basic components of structure 150 can be manufactured in a factory, positioned together to form the shipping module 100, and the modules 100 can be transported to the desired site for the structure, where they can be readily assembled, as described herein.

Enclosure Component (155): General Description

The enclosure components 155 of the present invention include a number of shared design features that are described below.

A. Laminate Structure Design

Enclosure components 155 can be fabricated using a multi-layered, laminate design. A particular laminate design that can be used to fabricate enclosure components 155 comprises a first structural layer 210, a foam panel layer 213, a second structural layer 215 and a protective layer 218, as shown in FIG. 7 and described further below.

Figure 7:
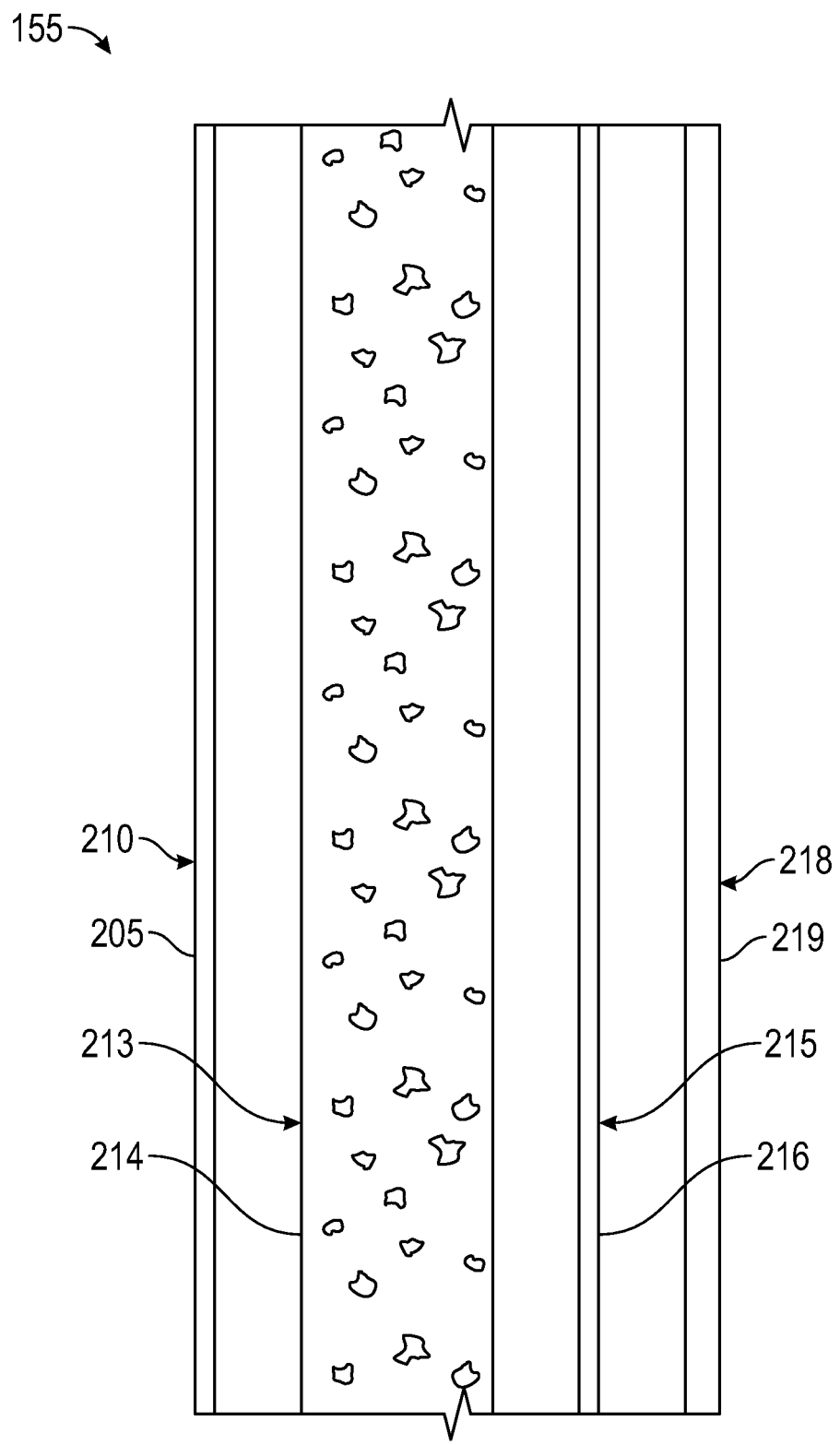
FIG. 7 is an exploded cross-sectional view of a multi-layered, laminate design for use in the enclosure components of the present inventions.

In particular, first structural layer 210 is provided in the embodiment of enclosure component 155 that is depicted in FIG. 7. First structural layer 210 in the embodiment shown comprises a sheet metal layer 205, which can be for example galvanized steel or aluminum. Sheet metal layer 205 is made from a plurality of generally planar rectangular metal sheets 206 positioned adjacent to each other to generally cover the full area of the intended enclosure component 155.

Referring again to FIG. 7, there is next provided in the depicted embodiment of enclosure component 155 a foam panel layer 213, comprising a plurality of generally planar rectangular foam panels 214 collectively presenting a first face 211 and a second opposing face 212. Foam panels 214 are made for example of expanded polystyrene (EPS) foam. A number of these foam panels 214 are positioned adjacent to each other and superposed first face-down on first structural layer 210 to generally cover the full area of the intended enclosure component 155. The foam panels 214 of foam panel layer 213 preferably are fastened to the metal sheets 206 of first structural layer 210 using a suitable adhesive, preferably a polyurethane-based construction adhesive. Foam panel layer 213 can include exterior edge reinforcement and interior edge reinforcement, as described further below.

In the embodiment of the enclosure component 155 depicted in FIG. 7, there is next provided a second structural layer 215, having a first face that is positioned on the second opposing face 212 of foam panels 214 (the face distal from first structural layer 210), and also having a second opposing face. Second structural layer 215 in the embodiment shown comprises a sheet metal layer 216, which can be for example galvanized steel or aluminum. Sheet metal layer 216 is made from a plurality of generally planar rectangular metal sheets 217 positioned adjacent to each other and superposed first face-down on the second opposing face of foam panel layer 213 to generally cover the full area of the intended enclosure component 155. The metal sheets 217 of second structural layer 215 preferably are fastened to foam panel layer 213 using a suitable adhesive, preferably a polyurethane-based construction adhesive.

In the embodiment of the enclosure component 155 depicted in FIG. 7, there is optionally next provided a protective layer 218, having a first face that is positioned on the second opposing face of second structural layer 215 (the face distal from foam panel layer 213), and also having a second opposing face. Optional protective layer 218 in the embodiment shown comprises a plurality of rectangular structural building panels 219 principally comprising an inorganic composition of relatively high strength, such as magnesium oxide (MgO). The structural building panels 219 are positioned adjacent to each other and superposed first face-down on the second opposing face of second structural layer 215 to generally cover the full area of the intended enclosure component 155. The building panels 219 of protective layer 218 preferably are fastened to second structural layer 215 using a suitable adhesive, preferably a polyurethane-based construction adhesive. Protective layer 218 can be used if desired to impart a degree of fire resistance to the enclosure component 155, as well as to provide a pleasing texture and/or feel.

Other embodiments of multi-layered, laminate designs that can be used to fabricate the enclosure components 155 of the present invention, are described in U.S. Nonprovisional patent application Ser. No. 16/786,130, entitled "Foldable Building Structures with Utility Channels and Laminate Enclosures," filed on Feb. 10, 2020, which has issued as U.S. Pat. No. 11,118,344. The contents of that U.S. Nonprovisional patent application Ser. No. 16/786,130, entitled "Foldable Building Structures with Utility Channels and Laminate Enclosures" and filed on Feb. 10, 2020 are incorporated by reference as if fully set forth herein, particularly including the multi-layered, laminate designs described for example at ¶¶ 0034-57 and depicted in FIGS. 4A-4D thereof.

B. Enclosure Component Exterior Edge Reinforcement

The exterior edges of each enclosure component 155 (i.e., the edges that define the perimeter of enclosure component 155) can be provided with exterior edge reinforcement, as desired. Exterior edge reinforcement generally comprises an elongate rigid member which can protect the foam panel material of foam panel layer 213 that would otherwise be exposed at the exterior edges of enclosure components 155. Exterior edge reinforcement can be fabricated from one or more of laminated strand lumber board, wooden board, C-channel extruded aluminum or steel, or the like, and is generally secured to the exterior edges of enclosure component 155 with fasteners, such as screw or nail fasteners, and/or adhesive.

C. Enclosure Component Partitioning

Enclosure components 155 in certain instances are partitioned into enclosure component portions to facilitate forming a compact shipping module 100. In those instances where an enclosure component 155 is partitioned into enclosure component portions, any exterior edge reinforcement on the exterior edges defining the perimeter of the enclosure component is segmented as necessary between or among the portions.

The enclosure component portions can be joined by hinge structures or mechanisms to permit the enclosure component portions to be "folded" and thereby contribute to forming a compact shipping module 100.

D. Enclosure Component Interior Edge Reinforcement

An enclosure component 155 partitioned into enclosure component portions will have interior edges. There will be two adjacent interior edges for each adjacent pair of enclosure component portions. Such interior edges can be provided with interior edge reinforcement. Similar to exterior edge reinforcement, such interior edge reinforcement generally comprises an elongate, rigid member which can protect the foam panel material of foam panel layer 213 which that would otherwise be exposed at the interior edges of enclosure components 155. Interior edge reinforcement can be fabricated from one or more of laminated strand lumber board, wooden board, C-channel extruded aluminum or steel, or the like, and is generally secured to the interior edges of enclosure component 155 with fasteners, such as screw or nail fasteners, and/or adhesive.

E. Enclosure Component Load Transfer

In the case of enclosure components 155, it is necessary to transfer the loads imposed on their surfaces to their exterior edges, where those loads can be transferred either to or through adjoining walls, or to the building foundation. For enclosure components 155 that are horizontally oriented when in use (floor component 300 and roof component 400), such loads include the weight of equipment, furniture and people borne by their surfaces, as well as vertical seismic loads. For enclosure components that are vertically oriented when in use (wall component 200), such loads include those arising from meteorological conditions (hurricanes, tornadoes, etc.) and human action (vehicle and other object impacts).

For this purpose, multi-layered, laminate designs as shown in FIG. 7 will function to transfer the loads described above. To add additional load transfer capability, structural members, such as beams and/or joists, can be utilized within the perimeter of the enclosure components 155, as is deemed appropriate to the specific design of structure 150 and the particular enclosure component 155, to assist in the transfer of loads to the exterior edges. Particular embodiments of such structural members, which also incorporate hinge structures, are described in U.S. Nonprovisional patent application Ser. No. 17/527,520 entitled "Folding Beam Systems", filed Nov. 16, 2021 and having the same inventors as this disclosure. The contents of that U.S. Nonprovisional patent application Ser. No. 17/527,520 entitled "Folding Beam Systems", filed Nov. 16, 2021 and having the same inventors as this disclosure, is incorporated by reference as if fully set forth herein, particularly the description of the hinged load transfer components set forth for example in ¶¶ 0074-0089 and 0104-0126 and in FIGS. 8A-13E and 15A-24A thereof, as well as the description of the associated end hinge assemblies set forth for example in ¶¶0090-0093 and 0127-0132 and in FIGS. 14A-14B, 24B and 25A-25D thereof.

Further design details of wall component 200, floor component 300, and roof component 400 are provided in the sections following.

Wall Component (200)

Typically, a structure 150 will utilize four wall components 200, with each wall component 200 corresponding to an entire wall of structure 150.

A. General Description

Wall component 200 has a generally rectangular perimeter. As shown in FIG. 1, wall components 200 have plural apertures, specifically a door aperture 202, which has a door frame and door assembly, and plural window apertures 204, each of which has a window frame and a window assembly.

The height and length of wall components 200 can vary in accordance with design preference, subject as desired to the dimensional restrictions applicable to transport, described above. In this disclosure, structure 150 is fashioned with all sides of equal length; accordingly, its first and second longitudinal edges 106 and 116, and its first and second transverse edges 108 and 110, are all of equal length. It should be understood however, that the inventions described herein are applicable to structures having other dimensions, such as where two opposing wall components 200 are longer than the other two opposing wall components 200.

As indicated above, wall components 200 of the present inventions can utilize a multi-layered, laminate design. In the embodiment depicted in FIGS. 1 through 6, wall component 200 utilizes the multi-layered, laminate design shown in FIG. 7 employing these particular elements: sheet metal layer 205 of first structural layer 210 is 24 gauge galvanized steel approximately 0.022-0.028 inch thick, the foam panels 214 of foam panel layer 213 are EPS foam approximately 5.68 inches thick, the sheet metal layer 216 of second structural layer 215 is 24 gauge galvanized steel approximately 0.022-0.028 inch thick, and the building panels 219 of protective layer 218 are MgO board approximately 0.25 inch (6 mm) thick.

The perimeter of each wall component 200 is generally provided with exterior edge reinforcement. As exemplified by wall component 200 shown in FIG. 6, the exterior edge reinforcement for wall component 200 is a floor plate 220 along the bottom horizontal edge, a ceiling plate 240 along the top horizontal edge and two end pieces 270 respectively fastened at each vertical edge of wall component 200. In the case of a wall component 200, exterior edge reinforcement provides regions for fastening like regions of abutting wall components 200, roof component 400 and floor component 300, in addition to protecting the exterior edges of foam panel material. In the embodiment shown in FIGS. 1 through 6, the exterior edge reinforcement for wall component 200 provided by floor plate 220, ceiling plate 240, and end pieces 270 is fabricated from laminated strand lumber board 5.625" deep and 1.5" thick.

B. Partitioned Wall Components

Referring to FIG. 2, structure 150 has two opposing wall components 200, where one of the two opposing wall components 200 comprises first wall portion 200s-1 and second wall portion 200s-2, and the other of the two opposing wall components 200 comprises third wall portion 200s-3 and fourth wall portion 200s-4. Each of wall portions 200s-1, 200s-2, 200s-3 and 200s-4 has a generally rectangular planar structure. As shown in FIG. 2, the interior vertical edge 192-1 of wall portion 200s-1 is proximate to a respective interior vertical edge 192-2 of wall portion 200s-2, and the interior vertical edge 194-3 of wall portion 200s-3 is proximate a respective interior vertical wall edge 194-4 of wall portion 200s-4. Interior edge reinforcement can be provided at any one or more of vertical edges 192-1, 192-2, 194-3 and 194-4. In the embodiment shown in FIGS. 1 through 6, the interior edge reinforcement provided at vertical edges 192-1, 192-2, 194-3 and 194-4 is fabricated from laminated strand lumber board 5.625" deep and 1.5" thick.

Referring again to FIG. 2, first wall portion 200s-1 is fixed in position on floor portion 300a proximate to first transverse edge 108, and third wall portion 200s-3 is fixed in position on floor portion 300a, opposite first wall portion 200s-1 and proximate to second transverse edge 110. First wall portion 200s-1 is joined to second wall portion 200s-2 with a hinge structure that permits wall portion 200s-2 to pivot about vertical axis 192 between a folded position and an unfolded position, and third wall portion 200s-3 is joined to fourth wall portion 200s-4 with a hinge structure to permit fourth wall portion 200s-4 to pivot about vertical axis 194 between a folded position and an unfolded position.

Notably, first wall portion 200s-1 is longer than third wall portion 200s-3 by a distance approximately equal to the thickness of wall component 200, and second wall portion 200s-2 is shorter than fourth wall portion 200s-4 by a distance approximately equal to the thickness of wall component 200. Furthermore, wall portion 200s-1 and wall portion 200s-3 are each shorter in length (the dimension in the transverse direction) than the dimension of floor portion 300a in the transverse direction. Dimensioning the lengths of wall portions 200s-1, 200s-2, 200s-3 and 200s-4 in this manner permits wall portions 200s-2 and 200s-4 to nest against each other in an overlapping relationship when in an inwardly folded position. In this regard, FIG. 2 depicts wall portions 200s-2 and 200s-4 both in their unfolded positions, where they are labelled 200s-2u and 200s4-u respectively, and FIG. 2 also depicts wall portions 200s-2 and 200s-4 both in their inwardly folded positions, where they are labelled 200s-2f and 200s4-f respectively. When wall portions 200s-2 and 200s-4 are in their inwardly folded positions (200s-2f and 200s-4f), they facilitate forming a compact shipping module. When wall portion 200s-2 is in its unfolded position (200s-2u), it forms with wall portion 200s-1 a wall component 200 proximate first transverse edge 108, and when wall portion 200s-4 is in its unfolded position (200s-4u), it forms with wall portion 200s-3 a wall component 200 proximate second transverse edge 110.

The hinge structures referenced above, for securing first wall portion 200s-1 to second wall portion 200s-2, and third wall portion 200s-3 to fourth wall portion 200s-4, can be surface mounted or recessed, and of a temporary or permanent nature. The provision of interior edge reinforcement, as described above, can provide a region for securing such hinge structures. Suitable hinge structures can be fabricated for example of ferrous or non-ferrous metal, plastic or leather material.

C. Unpartitioned Wall Components

As compared to the two wall components 200 proximate first and second transverse edges 108 and 110, which are partitioned into wall portions, the remaining two wall components 200 proximate first and second longitudinal edges 106 and 116 do not comprise plural wall portions, but rather each is a single piece structure. However, one of these wall components 200, which is sometimes denominated 200P in this disclosure, and which is located on floor portion 300b proximate first longitudinal edge 106, is pivotally secured to floor portion 300b by means of hinge structures to permit wall component 200P to pivot about horizontal axis 105 shown in FIG. 3 from a folded position to an unfolded position. Pivotally securing wall component 200P also facilitates forming a compact shipping module 100. The remaining wall component 200, sometimes denominated 200R in this disclosure, is rigidly secured on floor portion 300a proximate second longitudinal edge 116 and abutting the vertical edges of first wall portion 200s-1 and third wall portion 200s-3 proximate to second longitudinal edge 116, as shown in FIG. 2.

The hinge structures referenced above, for securing wall component 200P to floor portion 300b, can be surface mounted or recessed, and of a temporary or permanent nature. The provision of exterior edge reinforcement, as described above, can provide a region for securing such hinge structures. Suitable hinge structures can be fabricated for example of ferrous or non-ferrous metal, plastic or leather material.

Floor Component (300)

Typically, structure 150 will utilize one floor component 300; thus floor component 300 generally is the full floor of structure 150.

A. General Description

Figure 4:
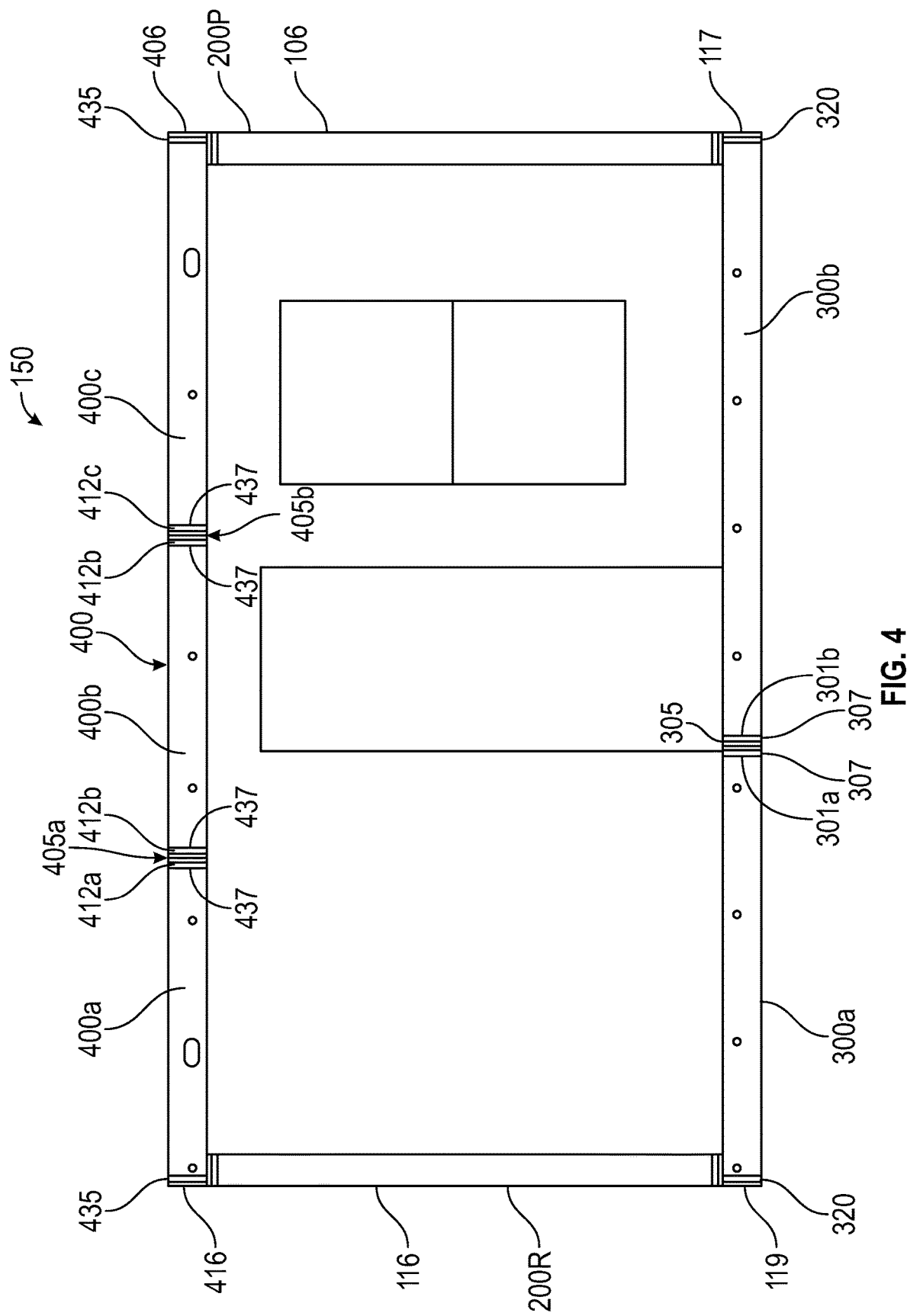
FIGS. 4 and 5 are partial cutaway views of a finished structure in accordance with the present inventions, depicting in greater detail aspects of the roof, wall and floor components.
Figure 5:
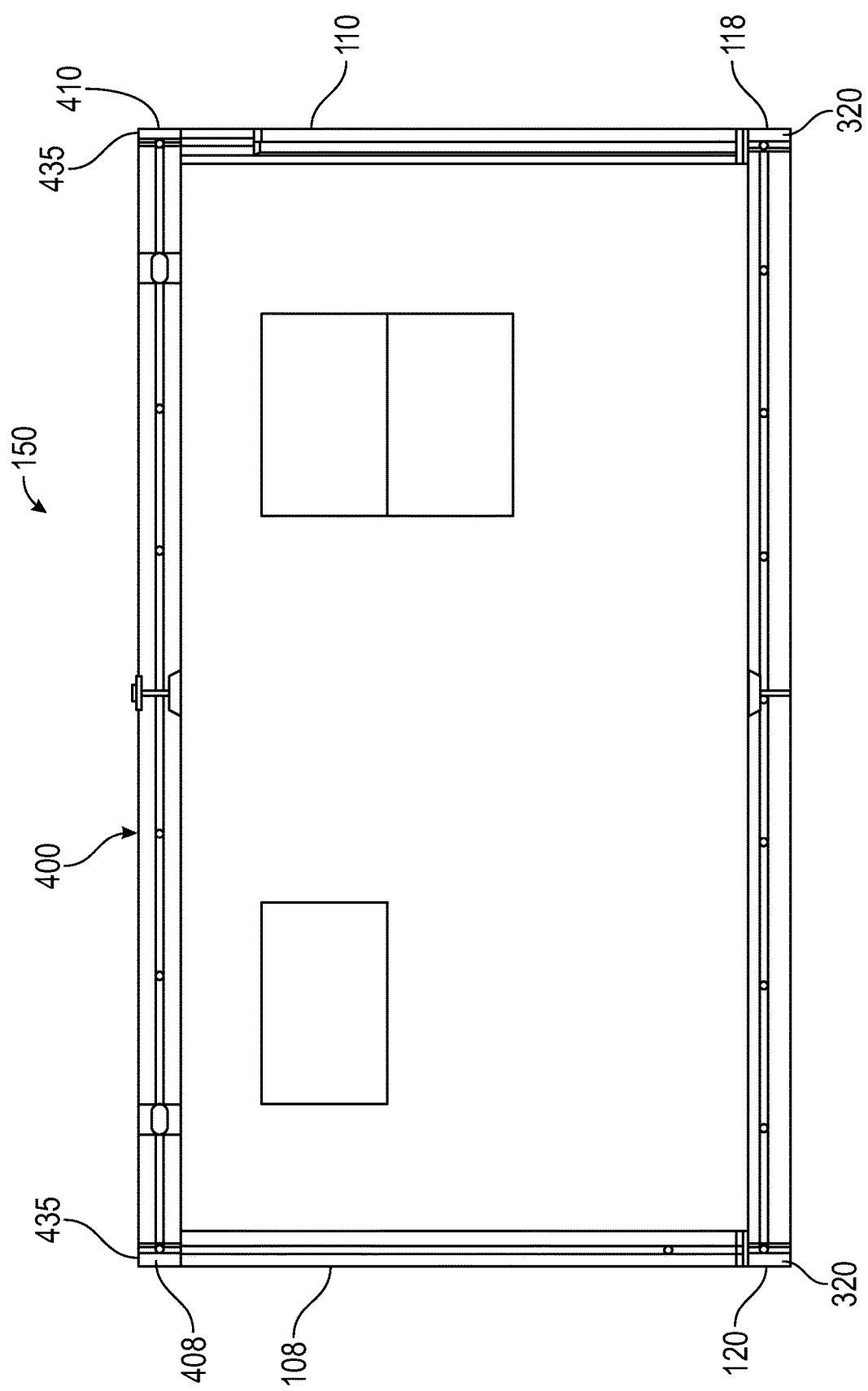
Figure 6:
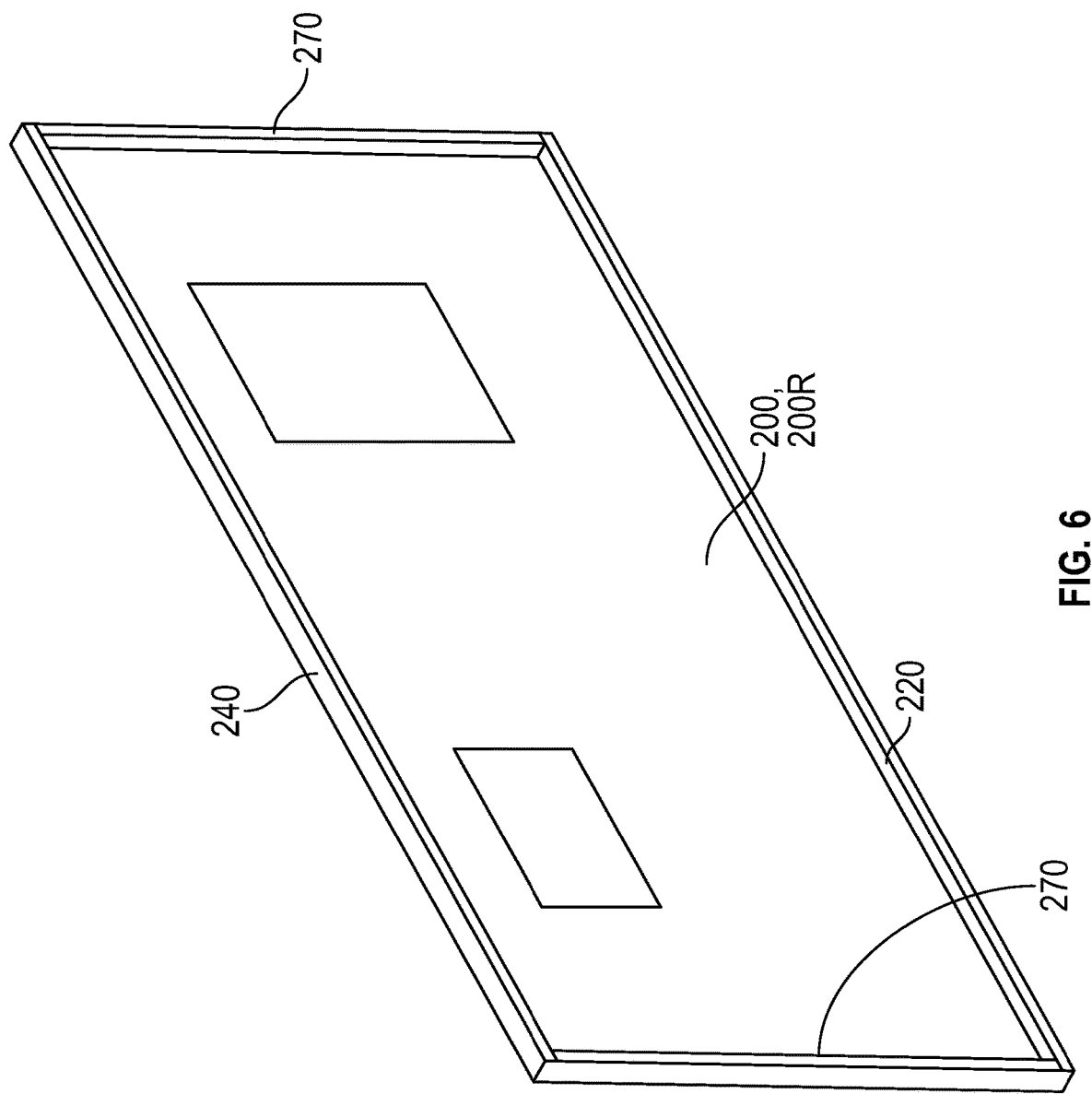
FIG. 6 is a schematic perspective view depicting the exterior edge reinforcement for a wall component in accordance with the present inventions.

Floor component 300 has a generally rectangular perimeter. FIGS. 4 and 5 depict floor component 300 in accordance with the present inventions. The perimeter of floor component 300 is defined by first longitudinal floor edge 117, first transverse floor edge 120, second longitudinal floor edge 119 and second transverse floor edge 118. In particular, (a) first longitudinal floor edge 117, (b) first transverse floor edge 120, (c) second longitudinal floor edge 119 and (d) second transverse floor edge 118 generally coincide with (i.e., underlie) (w) first longitudinal edge 106, (x) first transverse edge 108, (y) second longitudinal edge 116 and (z) second transverse edge 110, respectively, of structure 150.

The length and width of floor component 300 can vary in accordance with design preference. In the particular embodiment of structure 150 depicted in FIGS. 2, 4 and 5, floor component 300 is approximately 19 feet (5.79 m) by 19 feet (5.79 m).

Floor component 300 and its constituent elements are generally designed and dimensioned in thickness and in other respects to accommodate the particular loads to which floor component 300 may be subject. It is preferred that floor component 300 utilize a multi-layered, laminate design, such as that described in connection with FIG. 7. In the embodiment shown in FIGS. 4 and 5, the bottom-most surface of floor component 300 comprises sheet metal layer 205 of first structural layer 210, with sheet metal layer 205 being 24 gauge galvanized steel approximately 0.022-0.028 inch thick. Above sheet metal layer 205 there are provided foam panels 214 of foam panel layer 213. In the embodiment shown in FIGS. 4 and 5, foam panels 214 are EPS foam approximately 7.125 inches thick. Above foam panel layer 213 there is provided sheet metal layer 216 of second structural layer 215, with sheet metal layer 216 being 24 gauge galvanized steel approximately 0.022-0.028 inch thick. Above sheet metal layer 216 of second structural layer 215, there are provided building panels 219 of protective layer 218, with building panels 219 being MgO board approximately 0.25 inch (6 mm) thick.

The perimeter of each floor component 300 is generally provided with exterior edge reinforcement. As exterior edge reinforcement for the embodiments of floor component 300 shown in FIGS. 4 and 5, a first footing beam 320 (visible edge-on in FIG. 4) is positioned at the first longitudinal floor edge 117 of floor component 300, a second footing beam 320 (visible edge-on in FIG. 5) is positioned at the second transverse floor edge 118 of floor component 300, a third footing beam 320 (visible edge-on in FIG. 5) is positioned at the first transverse floor edge 120 of floor component 300, and a fourth footing beam 320 (visible edge-on in FIG. 4) is positioned at the second longitudinal floor edge 119 of floor component 300. In the case of floor component 300, the exterior edge reinforcement provided by footing beams 320 assists in resisting vertical loads and transferring such loads to any roof component 400 thereunder and then to underlying wall components 200, and/or to the foundation of the structure 150, in addition to protecting the edges of foam panel material of the foam panel layer 213. In the embodiment shown in FIGS. 1 through 6, the exterior edge reinforcement provided by footing beams 420 of floor component 300 is fabricated from laminated strand lumber board 7.125" deep and 1.5" thick.

B. Floor Partitioning

The floor component 300 is partitioned into floor portion 300a and floor portion 300b. FIG. 2 shows floor portions 300a and 300b in plan view, and FIG. 4 shows floor portions 300a and 300b in section view, edge-on.

Each of the floor portions 300a and 300b is a planar generally rectangular structure, with floor portion 300a adjoining floor portion 300b. Interior edge 301a of floor portion 300a abuts interior edge 301b of floor portion 300b, as shown in FIG. 4. As interior edge reinforcement, a reinforcing board 307 is positioned in floor portion 300a adjacent interior edge 301a, and a reinforcing board is positioned in floor portion 300b adjacent interior edge 301b. In the embodiment shown in FIGS. 1 through 6, the interior edge reinforcement provided by reinforcing boards 307 is laminated strand lumber board 7.125" deep and 1.5" thick.

Referring to structure 150 shown in FIGS. 2 and 4, floor portion 300a is fixed in position relative to first wall portion 200s-1, third wall portion 200s-3 and wall component 200s-R. Floor portion 300a is joined with hinge structures to floor portion 300b, so as to permit floor portion 300b to pivot through approximately ninety degrees (90°) of arc about a horizontal axis 305, located proximate the top surface of floor component 300, between a fully folded position, where floor portion 300b is vertically oriented as shown in FIG. 3, and a fully unfolded position, shown in FIGS. 2 and 4, where floor portion 300b is horizontally oriented and co-planar with floor portion 300a. Particular embodiments of suitable hinge structures for joining floor portion 300a to floor portion 300b are described below.

C. Hinged Vertical Load Transfer Components

Figure 8A:
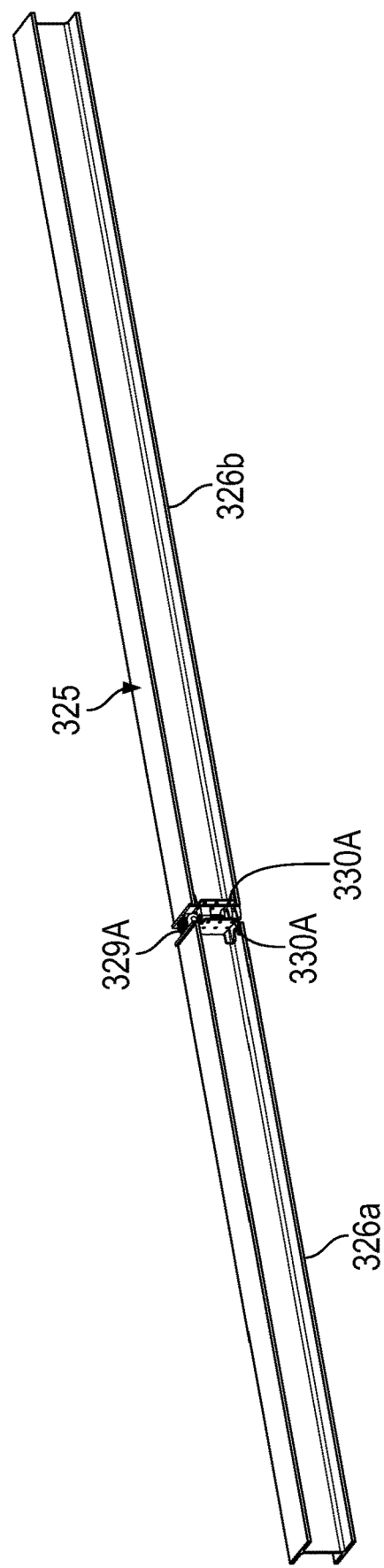
FIG. 8A is a perspective view of a foldable I-beam for a floor component in accordance with the present inventions, in the beam unfolded position.

FIG. 8A shows a beam assembly 325 that can be placed within floor component 300 to provide reinforcement in the direction along the beam and assist in transferring vertical loads borne by floor component 300 to its edges. Beam assembly 325 includes two I-beams 326a and 326b. I-beam 326a is positioned approximately in the middle of floor portion 300a, I-beam 326b is positioned approximately in the middle of floor portion 300b, and each of I-beams 326a and 326b is oriented in the transverse direction. A hinge assembly 329A joins I-beam 326a to I-beam 326b. The hinge assembly 329A permits beam assembly 325 to be folded to a beam folded position shown in FIG. 8B and unfolded to a beam unfolded position shown in FIG. 8A. Further, the hinge assembly 329A can be locked when beam assembly 325 is in the beam unfolded position, which transforms beam assembly 325 into a rigid structure that will reinforce floor component 300 in the direction perpendicular to its axis of folding.

Figure 8B:
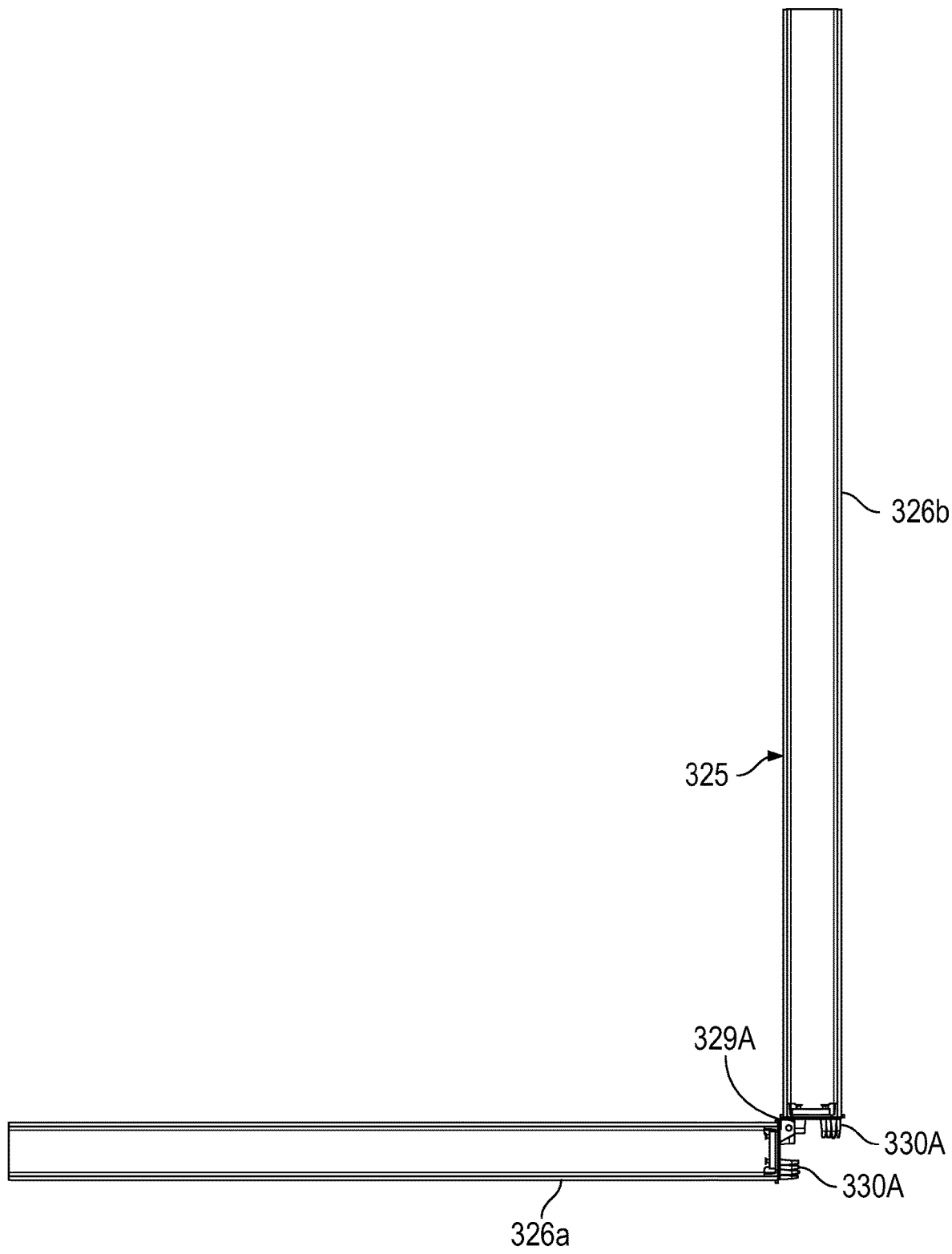
FIG. 8B is a side view of a foldable I-beam for a floor component in accordance with the present inventions, in the beam folded position.

Hinge assembly 329A comprises two identical hinge assembly portions 330A partnered together to form a pivoted junction, as shown in FIGS. 8A and 8B. A detailed description of the construction of hinge assembly 329A and its hinge assembly portions 330A is set forth in U.S. Nonprovisional patent application Ser. No. 17/527,520 entitled "Folding Beam Systems", filed Nov. 16, 2021 and having the same inventors as the subject application. The contents of that U.S. Nonprovisional patent application Ser. No. 17/527,520 entitled "Folding Beam Systems", filed Nov. 16, 2021 and having the same inventors as the subject application, is incorporated by reference as if fully set forth herein, particularly the description of the construction of hinge assembly 329A and its hinge assembly portions 330A set forth for example in ¶¶0075-0087 and in FIGS. 9-12 and 13C-13E thereof.

Figure 9A:
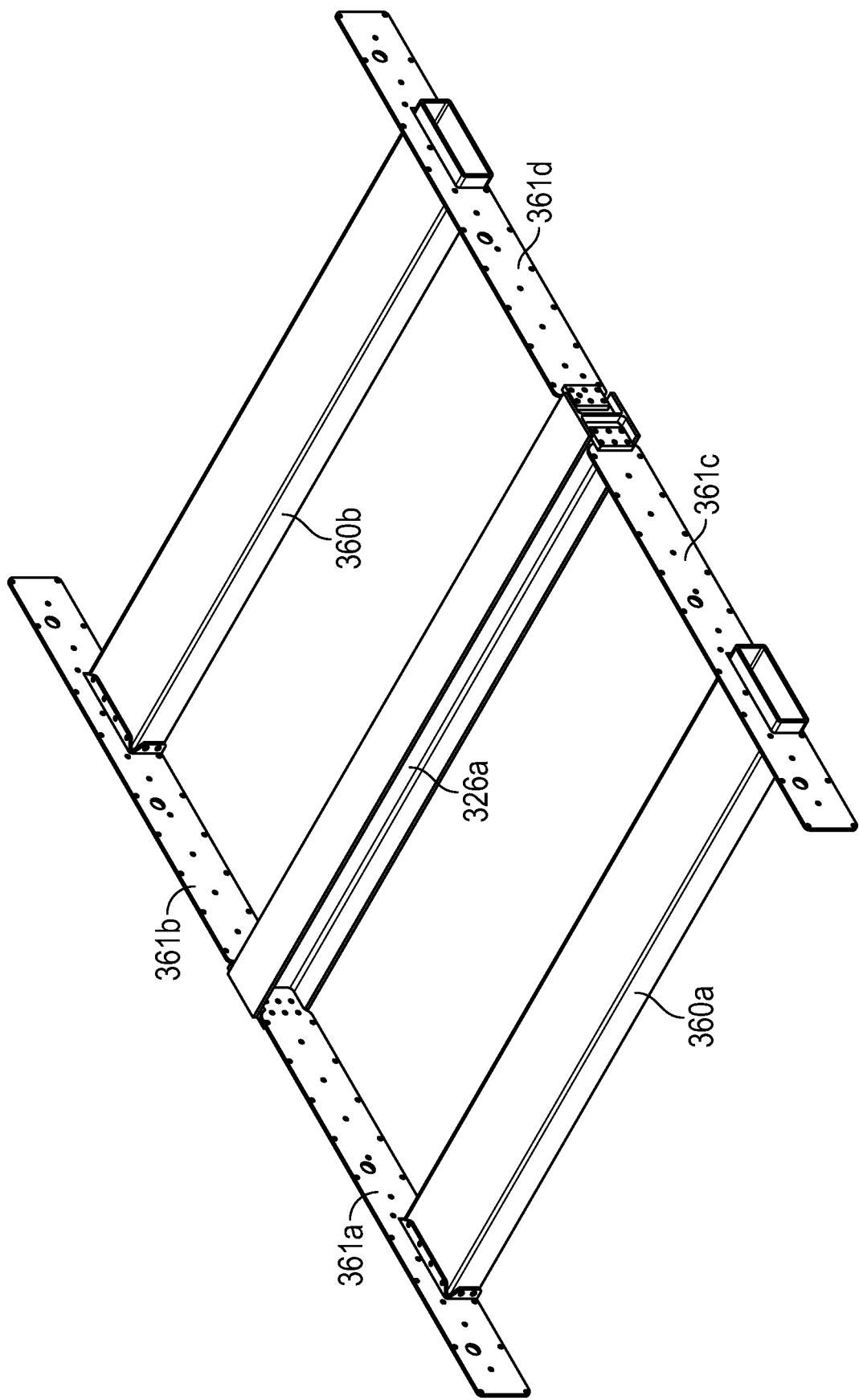
FIG. 9A is a schematic perspective view of a fork tube arrangement for a floor portion in accordance with the present inventions.
Figure 9B:
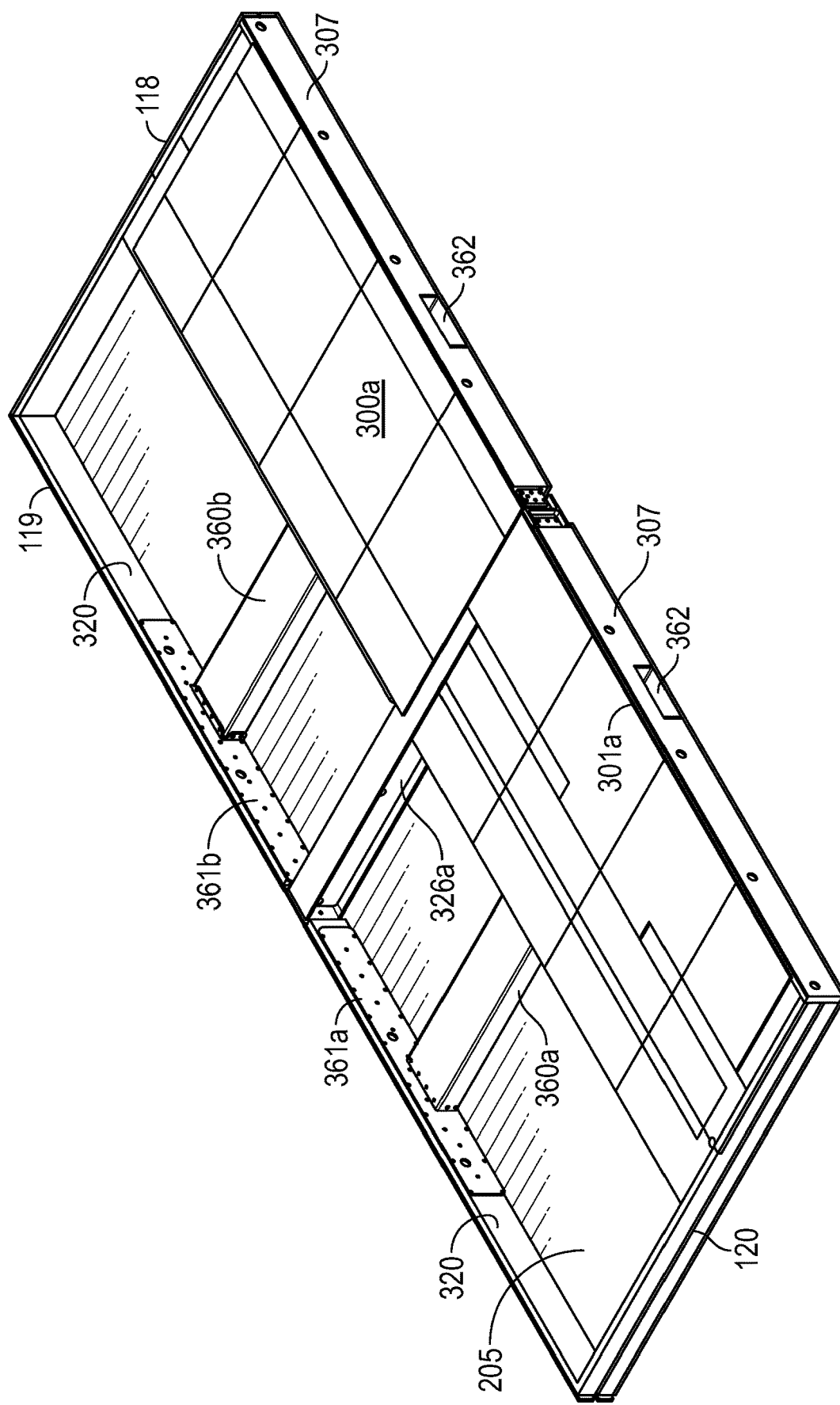
FIG. 9B is a schematic cut-away perspective view of a fork tube arrangement, positioned within a floor portion, in accordance with the present inventions.
Figure 9C:
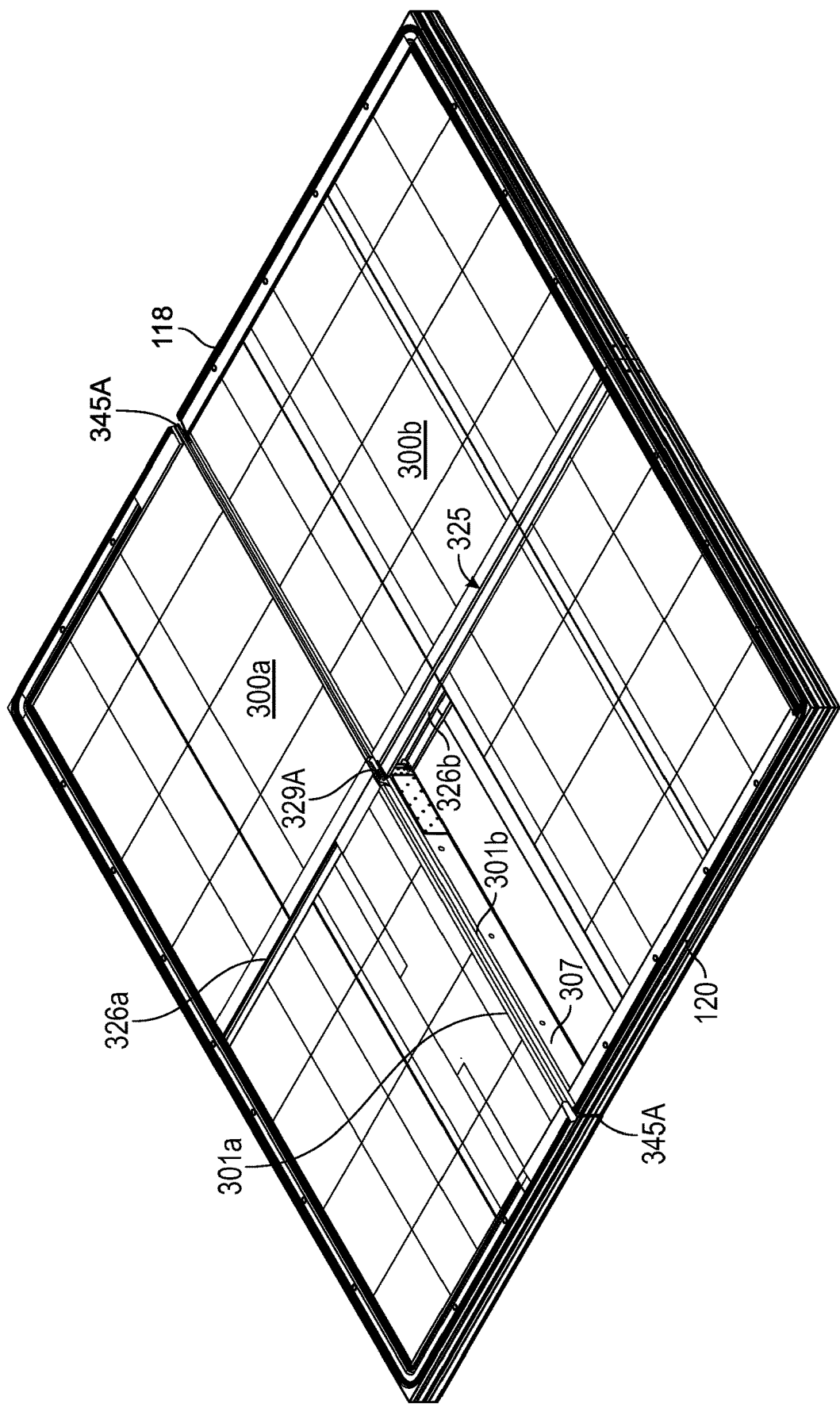
FIG. 9C is a schematic cut-away perspective view of a floor component in accordance with the present inventions.

In the embodiment of floor component 300 utilized in the structure 150 of FIGS. 1-5, I-beam assembly 325 is located at the mid-point between first transverse floor edge 120 and second transverse floor edge 118, and no hinge assemblies 329A are utilized elsewhere within floor component 300, such as proximate to first transverse floor edge 120 and second transverse floor edge 118. Therefore, to assist in smoothly rotating floor portion 300b, there is provided adjacent first transverse floor edge 120 a first floor end hinge assembly 345A joining floor portions 300a and 300b, and there is provided adjacent second transverse floor edge 118 a second floor end hinge assembly 345A joining floor portions 300a and 300b. The locations of both first and second floor end hinge assemblies 345A is indicated in FIG. 9C. Floor end hinge assembly 345A comprises two identical floor end hinge portions 350A (not specified in the figures). A description of the construction of floor end hinge assembly 345A and its floor end hinge portions 350A is set forth in U.S. Nonprovisional patent application Ser. No. 17/527,520 entitled "Folding Beam Systems", filed Nov. 16, 2021 and having the same inventors as the subject application. The contents of that U.S. Nonprovisional patent application Ser. No. 17/527,520 entitled "Folding Beam Systems", filed Nov. 16, 2021 and having the same inventors as the subject application, is incorporated by reference as if fully set forth herein, particularly the description of the construction of floor end hinge assembly 345A and its floor end hinge portions 350A set forth for example in ¶¶0090-0093 and in FIGS. 14A-14B thereof.

D. Integral Floor Lifting Structure

Optionally, a structure for facilitating the movement of shipping module 100 can be provided in floor portion 300a. In particular, FIG. 9A depicts two fork tubes, 360a and 360b. These fork tubes 360a, 360b are spaced-apart elongate members and oriented in the transverse direction within floor portion 300a as shown, for example, in FIG. 9B. Fork tubes 360a, 360b flank an I-beam 326a between them, which I-beam 326a assists in the transfer of vertical loads to the fourth footing beam 320 that is adjacent second longitudinal floor edge 119, as shown, for example, in FIG. 9B, and to the reinforcing board 307 that is positioned in floor portion 300a adjacent interior edge 301a as shown, for example, in FIG. 9C. Hinge assembly 329A assists in further transferring those vertical loads to I-beam 326b positioned in floor portion 300b, and then to second footing beam 320 adjacent first longitudinal floor edge 117. The specifics of I-beams 326a, 326B and hinge assembly 329A are disclosed in U.S. Provisional Patent Application No. 63/188,101, filed May 13, 2021, entitled "Folding Beam Systems" and having the same inventors as the subject application. The contents of that U.S. Provisional Patent Application No. 63/188,101, filed May 13, 2021, entitled "Folding Beam Systems" and having the same inventors as the subject application, are incorporated by reference as if fully set forth herein, particularly the descriptions of the beam and hinge assemblies set forth for example in ¶¶0073-0087 and in FIGS. 8A-13B thereof. Fork tubes 360a, 360b in the embodiment shown herein have a rectangular cross section and are made for example of steel. The specifics of I-beams 326a, 326B and hinge assembly 329A are also set forth in U.S. Nonprovisional patent application Ser. No. 17/527,520 entitled "Folding Beam Systems", filed Nov. 16, 2021 and having the same inventors as the subject application, as mentioned above. The contents of that U.S. Nonprovisional patent application Ser. No. 17/527,520 entitled "Folding Beam Systems", filed Nov. 16, 2021 and having the same inventors as the subject application, are likewise incorporated by reference as if fully set forth herein, particularly the description of I-beams 326a, 326B and hinge assembly 329A set forth for example in ¶¶ 0074-0089 and in FIGS. 8A-13E thereof FIG. 9B depicts the placement of fork tubes 360a, 360b within the structure of floor portion 300a. Each fork tube 360a, 360b rests on, or is defined in part by, sheet metal layer 205, and channels are provided in foam panels 214 (not shown in FIG. 9) to accommodate the fork tubes. Fork tubes 360a, and 360b are of sufficient length to span the distance between second longitudinal floor edge 119 and interior edge 301a of floor portion 300a, and thus present rectangular apertures 362 at each of these two edges. In this regard, cut-outs (not visible) are provided in the fourth footing beam 320 adjacent second longitudinal floor edge 119, and, as shown in FIG. 9B, in the reinforcing board 307 that is positioned in floor portion 300a adjacent interior edge 301a, to permit fork tubes 360a, 360b to pass through footing beam 320 and reinforcing board 307. Likewise, cut-outs (not visible) are provided in I-beam end cap 221 (e.g., shown in FIG. 10) positioned adjacent second longitudinal floor edge 119, and in I-beam interlock 251 (e.g., shown in FIGS. 14 and 21A) positioned adjacent interior edge 301a, to permit fork tubes 360a, 360b to pass through that I-beam end cap 221 and I-beam interlock 251.

Referring still to FIGS. 9A-B, there is provided a fork tube plate 361a positioned against fourth footing beam 320, and there is provided a fork tube plate 361b positioned against fourth footing beam 320. Fork tube plate 361a approximately spans the longitudinal distance between I-beam 326a and fork tube 360a, and extends beyond fork tube 360a in the longitudinal direction toward first transverse floor edge 120. Similarly, fork tube plate 361b approximately spans the longitudinal distance between I-beam 326a and fork tube 360b, and extends beyond fork tube 360b in the longitudinal direction toward second transverse floor edge 118.

In like manner, there is provided a fork tube plate 361c (visible in FIG. 9A), which is positioned against the reinforcing board 307 within floor portion 300a that is adjacent interior edge 301a, and there is provided a fork tube plate 361d (visible in FIG. 9A), which is positioned against the reinforcing board 307 within floor portion 300a that is adjacent interior edge 301a. Fork tube plate 361c approximately spans the longitudinal distance between I-beam 326a and fork tube 360a, and extends beyond fork tube 360a in the longitudinal direction toward first transverse floor edge 120. Similarly, fork tube plate 361d approximately spans the longitudinal distance between I-beam 326a and fork tube 360b, and extends beyond fork tube 360b in the longitudinal direction toward second transverse floor edge 118. Fork tube plates 361a, 361b, 361c and 361d in the embodiment shown herein are made for example of steel.

Fork tube plates 361a and 361b can be secured to fourth footing beam 320 with adhesive and/or fasteners such as screws, and fork tube plates 361c and 361d can be secured to the reinforcing board 307 within floor portion 300a which is adjacent interior edge 301a with adhesive and/or fasteners such as screws. In addition, fork tube plates 361a and 361c can be secured to fork tube 360a, and fork tube plates 361b and 361d can be secured to fork tube 360b, in each case utilizing for example fasteners or welding.

The employment of fork tubes 360a, 360b in the movement of shipping module 100 is described below.

Roof Component (400)

Typically, structure 150 will utilize one roof component 400; thus roof component 400 generally is the full roof of structure 150.

A. General Description

Roof component 400 has a generally rectangular perimeter. FIGS. 1, 4 and 5 depict roof component 400 in accordance with the present inventions. The perimeter of roof component 400 is defined by first longitudinal roof edge 406, first transverse roof edge 408, second longitudinal roof edge 416 and second transverse roof edge 410. In particular, (a) first longitudinal roof edge 406, (b) first transverse roof edge 408, (c) second longitudinal roof edge 416 and (d) second transverse roof edge 410 of roof component 400 generally coincide with (i.e., overlie) (w) first longitudinal edge 106, (x) first transverse edge 108, (y) second longitudinal edge 116 and (z) second transverse edge 110, respectively, of structure 150.

The length and width of roof component 400 can vary in accordance with design preference. In the particular embodiment of structure 150 depicted in FIGS. 1, 4 and 5, the length and width of roof component 400 approximates the length and width of floor component 300.

Roof component 400 and its constituent elements are generally designed and dimensioned in thickness and in other respects to accommodate the particular loads to which roof component 400 may be subject. It is preferred that roof component 400 utilize a multi-layered, laminate design, such as that described in connection with FIG. 7. In the embodiment shown in FIGS. 4 and 5, the top-most surface of roof component 400 comprises sheet metal layer 205 of first structural layer 210, with sheet metal layer 205 being 24 gauge galvanized steel approximately 0.022-0.028 inch thick. Below sheet metal layer 205 there are provided foam panels 214 of foam panel layer 213, with foam panels 214 in the embodiment shown in FIGS. 4 and 5 being EPS foam for example approximately 7.125 inches thick. Below foam panel layer 213 there is provided sheet metal layer 216 of second structural layer 215, with sheet metal layer 216 being 24 gauge galvanized steel approximately 0.022-0.028 inch thick. Below sheet metal layer 216 of second structural layer 215, there are provided building panels 219 of protective layer 218, with building panels 219 being MgO board approximately 0.25 inch (6 mm) thick.

The perimeter of roof component 400 is generally provided with exterior edge reinforcement. As exterior edge reinforcement for the embodiment of roof component 400 shown in FIGS. 4 and 5, a first shoulder beam 435 (visible edge-on in FIG. 4) is positioned at the first longitudinal roof edge 406 of roof component 400, a second shoulder beam 435 (visible edge-on in FIG. 5) is positioned at the first transverse roof edge 408 of roof component 400, a third shoulder beam 435 (visible edge-on in FIG. 5) is positioned at the second transverse roof edge 410 of roof component 400, and a fourth shoulder beam 435 (visible edge-on in FIG. 4) is positioned at the second longitudinal roof edge 416 of roof component 400. In addition to protecting the exterior edges of foam panel material, the exterior edge reinforcement provided by shoulder beams 435 assists in resisting vertical loads and transferring such loads to lower floors through underlying wall components 200 supporting roof component 400, and then to the foundation of the structure 150. Such exterior edge reinforcement can also provide a region for fastening like regions of abutting enclosure components 155 (underlying and any overlying). Shoulder beams 435 of roof component 400 can be fabricated from laminated strand lumber board 7.125" deep and 1.5" thick.

B. Roof Partitioning

The roof component 400 of structure 150 is partitioned into roof portions 400a, 400b and 400c. FIG. 1 shows roof portions 400a, 400b and 400c in perspective view, and FIG. 4 shows roof portions 400a, 400b and 400c in section view, edge-on.

Each of the roof portions 400a, 400b and 400c is a planar generally rectangular structure, with roof portion 400a adjoining roof portion 400b, and roof portion 400b adjoining roof portion 400c. Interior edge 412c of roof component 400c abuts a first interior edge 412b of roof component 400b, as shown in FIG. 4. For interior edge reinforcement, a reinforcing board 437 is positioned adjacent interior edge 412c, and a reinforcing board 437 is positioned against first interior edge 412b. Interior edge 412a of roof portion 400a abuts a second interior edge 412b of roof portion 400b, as shown in FIG. 4. For interior edge reinforcement, a reinforcing board 437 is positioned adjacent interior edge 412a, and a reinforcing board 437 is positioned against second interior edge 412b. In the embodiment shown in FIGS. 1 through 5, the interior edge reinforcement provided by reinforcing boards 437 of roof component 400 is laminated strand lumber board 7.125" deep and 1.5" thick.

In the shipping module 100 shown in FIG. 3, roof portions 400a, 400b and 400c preferably are accordion folded (stacked), with roof component 400b stacked on top of roof component 400a, and roof component 400c stacked on top of the roof component 400b. Referring to structure 150 shown in FIG. 4, roof portion 400a is fixed in position relative to first wall portion 200s-1, third wall portion 200s-3 and wall component 200R. Thus to realize the accordion folded configuration shown in FIG. 3 roof portion 400a is joined to roof portion 400b with hinge structures provided between interior edge 412a of roof portion 400a and second interior edge 412b of roof portion 400b. Such hinge structures are adapted to permit roof portion 400b to pivot through up to one hundred and eighty degrees (180°) of arc about a horizontal axis 405a, located proximate the top of roof component 400 and shown in FIG. 4, between the roof fully folded position shown in FIG. 3, where roof portion 400b lies stacked flat against roof portion 400a, and the fully unfolded position shown in FIG. 4. In turn, roof portion 400b is joined to roof portion 400c with hinge structures provided between first interior edge 412b of roof portion 400b and interior edge 412c of roof portion 400c. Such hinge structures are adapted to permit roof portion 400c to pivot through up to one hundred and eighty degrees (180°) of arc about a horizontal axis 405b, located proximate the bottom of roof component 400 and shown in FIG. 4, between the folded position shown in FIG. 3, where roof portion 400c lies stacked flat against roof portion 400b (when roof portion 400b is positioned to lie flat against roof portion 400a), and the fully unfolded position shown in FIG. 4.

Particular embodiments of structural members, which also incorporate hinge structures suitable for joining roof portion 400a to roof portion 400b, and for joining roof portion 400b to roof portion 400c, are described in in U.S. Nonprovisional patent application Ser. No. 17/527,520 entitled "Folding Beam Systems", filed Nov. 16, 2021 and having the same inventors as this disclosure. The contents of that U.S. Nonprovisional patent application Ser. No. 17/527,520 entitled "Folding Beam Systems", filed Nov. 16, 2021 and having the same inventors as this disclosure, is incorporated by reference as if fully set forth herein, particularly the description of the load transfer components set forth for example in ¶¶ 0104-0126 and in FIGS. 15A-24A thereof, as well as the description of the associated end hinge assemblies set forth for example in ¶¶ 0127-0132 and in FIGS. 24B and 25A-25D thereof.

Enclosure Component Sealing Systems

Structure 150 can utilize the enclosure component sealing systems described below to limit or prevent the ingress of rain water, noise and outside air into the interior of structure 150.

A. General Description

The enclosure component sealing systems for structure 150 utilize the sealing structures described below. Except for I-beam end cap 221, which functions to seal the edges of select enclosure components 155, the enclosure component sealing systems comprise in general terms two enclosure component sealing structures, paired in in pressing contact in different combinations, to seal the junctions between different regions of the enclosure components 155 found in structure 150. These junctions consist of either two interior edges of adjacent enclosure component portions, positioned edge-to-edge when structure 150 is unfolded, or an exterior edge of an enclosure component 155 which abuts an interior surface of another enclosure component 155. Where an enclosure component sealing structure is positioned on an interior or exterior edge of an enclosure component 155, there can respectively be provided interior edge reinforcement or exterior edge reinforcement between the sealing structure and the respective interior or exterior edge of the foam panel layer 213 in the case where the multi-layered, laminate design depicted in FIG. 7 is utilized (such that the enclosure component sealing structure is positioned proximate to the interior or exterior edge, as the case may be, of the foam panel layer 213). The specific enclosure component sealing structures described below are I-beam end cap 221; wall vertical interlock 245; wall end cap 246; I-beam interlock A 250; I-beam interlock B 251; floor top plate 252; roof bottom plate 255; floor top interlock 261; wall end interlock A 262; and wall end interlock B 263. Excepting I-beam end cap 221, each of the foregoing enclosure component sealing structures utilizes either two or more compression seals 230, or one shear seal 260, which are also described below. Exemplary placements of the enclosure component sealing structures described herein are found in Subsections B. through J. below and also in the Section below entitled "Enclosure Component Sealing Structure Exemplary Placements".

The current inventions include two closure boards, namely perimeter board 310 and roof skirt board 280. These closure boards, which are described below, are utilized in conjunction with I-beam end cap 221 to provide additional sealing, as well as to realize additional benefits.

B. I-Beam End Cap (221)

Figure 10:
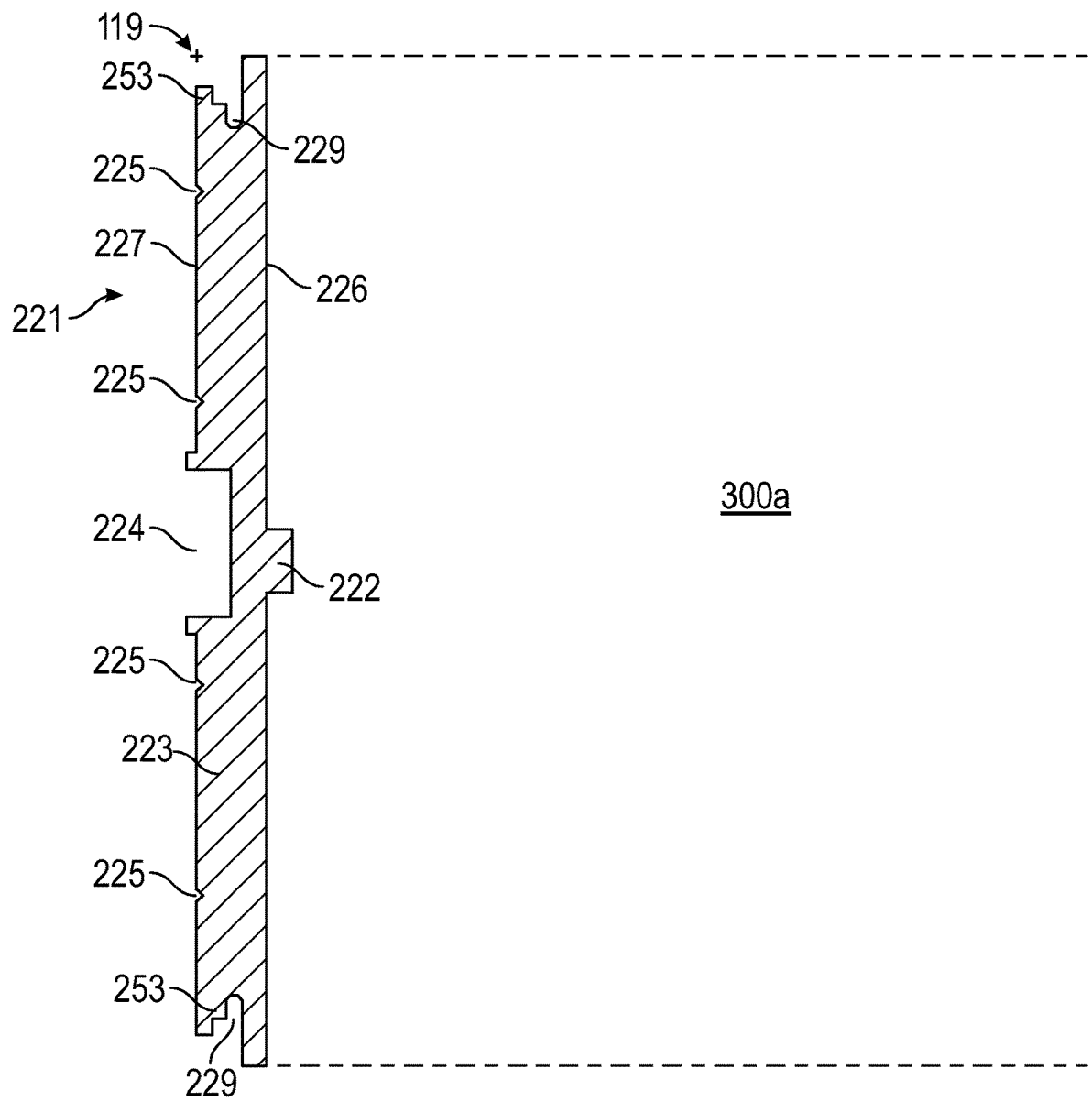
FIG. 10 is a schematic side view of an I-beam end cap in accordance with the present inventions.

I-beam end cap 221, shown in cross-section in FIG. 10, is a rigid elongate member that is fastened to the periphery of select enclosure components 155, preferably the exterior edges of floor component 300 and roof component 400. I-beam end cap 221 constitutes an edge seal that performs a sealing function against water ingress into and environmental exposure of the edge of the enclosure component 155 to which it is secured, and imparts impact resistance to that edge.

FIG. 10 shows an exemplary installation of I-beam end cap 221 secured to the edge of a schematic representation of floor portion 300a. In particular, I-beam end cap 221 has an elongate seal plate 223 with seal plate 223 having an elongate interior face 226 and an opposing elongate planar exterior face 227. I-beam end cap 221 has a length and width the same, or substantially the same, as the length and width of the exterior edge of floor portion 300a, so as to cover the entirety, or substantially the entirety, of the exterior edge of floor portion 300a.

At the mid-point of the interior face 226 of seal plate 223, there is provided an elongate key 222, which is rectangular in cross section (as shown in FIG. 10), and has a length the same, or substantially the same, as the length of I-beam end cap 221. Key 222 is received in a corresponding slot formed in the exterior edge reinforcement positioned on the exterior edge of the enclosure component 155 to which I-beam end cap 221 is secured. Thus for example, FIG. 9 depicts key 222 of an I-beam end cap 221 received in slot 422 of a shoulder beam 435 of roof portion 400a. Each of the top and bottom edges of I-beam end cap 221 define locating slots 229. In the case where the enclosure component 155 utilizes the enclosure component laminate design shown in FIG. 7, locating slots 229 receive the edge portions 207 of metal sheets 206 and 217 (of sheet metal layers 205 and 216 respectively), bent down at a ninety degree (90°) angle, as shown in FIG. 9.

Still referring to FIG. 10, the exterior face 227 of seal plate 223 of I-beam end cap 221 includes an elongate accessory slot 224, which is rectangular in cross section and has a length the same, or substantially the same, as the length of the exterior face 227 of I-beam end cap 221. The exterior face 227 further includes a plurality of elongate fastener locating grooves 225, each of which has a length the same, or substantially the same, as the length of seal plate 223. I-beam end cap 221 can be secured to an exterior edge of an enclosure component 155, such as the roof portion 400a shown in FIG. 9 and the floor portion 300a shown in FIG. 10, for example by adhesive applied to interior face 226, or by fasteners, such as screw or nail fasteners, spaced apart along the length of I-beam end cap 221 and driven through the exterior face 227, or by utilizing a combination of adhesive and fasteners. Locating grooves 225 assist in accurate positioning of such fasteners.

C. Compression Seal (230)

A number of the enclosure component sealing systems described herein and utilized in structure 150 include a compression seal system. An element of that compression seal system is a compression seal 230.

Figure 11A:
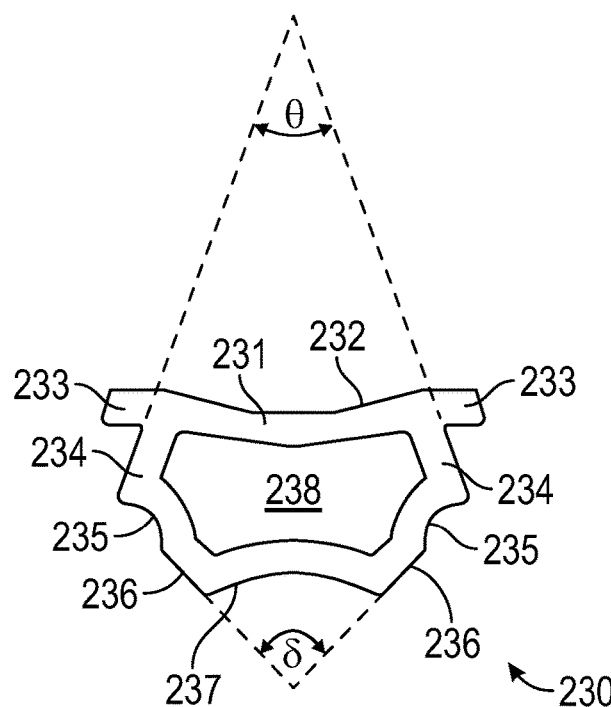
FIG. 11A is a section view of a compression seal in accordance with the present inventions.

Compression seal 230, which is shown in cross-section in FIG. 11A, is an elongate member having in cross-section an elongate base 231 with an elongate arched portion 232 that is flanked by two elongate winglets 233. At the intersection of the arched portion 232 of base 231 and each of the winglets 233, there are provided two opposed elongate seal walls 234, joined to and extending away from base 231 in a diverging relationship at a divergence angle θ, where θ<180°, for example θ<90° or in the range of 40°<θ<50°. It is most preferred that θ be the same, or nearly so, as the divergence angle c of the slot walls 244 described below. Thus as shown in FIG. 11A, the ends of the seal walls 234 distal from base 231 are further apart than the ends of the seal walls proximate to base 231.

At the ends of the seal walls 234 distal from base 231, each seal wall 234 is joined to an elongate arcuate buttress 235. The end of each arcuate buttress 235, distal from the seal wall 234 to which it is joined, is in turn joined to a respective planar elongate seal surface 236; thus there are two planar seal surfaces 236 in compression seal 230. The planar seal surfaces 236 extend away from the seal walls 234 in a converging relationship at a convergence angle δ, where δ<180°, for example 90°. Thus the ends of seal surfaces 236 distal from arcuate buttresses 235 are closer together than the ends of seal surfaces 236 proximate to arcuate buttresses 235. The ends of seal surfaces 236 distal from arcuate buttresses 235 are joined by an elongate seal closure 237. The base 231, seal walls 234, arcuate buttresses 235, seal surfaces 236 and seal closure 237 thereby define a hollow elongate seal chamber 238, as shown in FIG. 11A. Seal closure 237 is curved in shape toward seal chamber 238, such as to assume a cupped appearance.

Figure 11B:
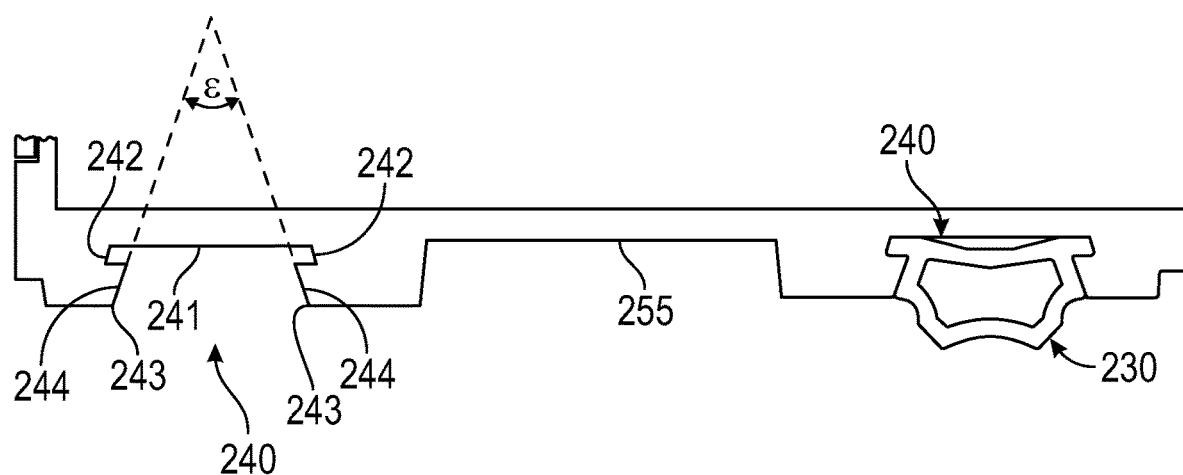
FIG. 11B is a side view of a roof bottom plate with a compression seal provided in one of its two seal slots in accordance with the present inventions.

Seal 230 is intended to be received in an elongate seal slot 240, shown for example in FIG. 11B. Slot 240 in general has a dovetail shape, with an elongate planar floor 241 flanked by two elongate lateral grooves 242, and with an elongate planar slot wall 244 abutting and extending from each groove 242 toward an elongate shoulder 243 at the surface of the slot 240. Thus there are two opposed shoulders 243 in seal slot 240. The planar slot walls 244 extend away from grooves 242 in a diverging relationship at a divergence angle ε, where ε<180° (for example ε<90° or in the range of 40°<ε<50°), such that the edges of slot walls 244 coincident with shoulders 243 are further apart than the edges of slot walls 244 abutting grooves 242. Compression seal 230 is dimensioned to snugly fit within slot 240, as shown in FIG. 11B, such that winglets 233 are received in grooves 242 and the arched portion 232 of base 231 is compressed sufficiently to provide a resilient force that urges winglets 233 into grooves 242 and causes seal 230 to be retained in its proper position in slot 240 during fabrication and following fabrication of the enclosure component 155.

When two enclosure components 155 on which are mounted two paired enclosure component sealing structures, one of which bears a compression seal 230, are appropriately positioned and pressed together, compression seal 230 will be squeezed against the planar exterior face 227 of the opposed seal plate 223, which causes seal closure 237 and arcuate buttresses 235 to be urged into seal chamber 238. This permits the two planar exterior faces 227 of the pressed-together seal plates 223 of the paired sealing structures to come into full contact. At the same time, arcuate buttresses 235 rotate down and seal surfaces 236 are urged into a generally coplanar relationship (with arcuate buttresses 238 functioning as hinges) with the opposing planar exterior face 227 pressing against it, to create two lines of sealing.

Compression seal 230 can be fabricated from a resilient material, such as rubber or plastic, for example polyurethane. Particular embodiments of enclosure component sealing structures utilizing the foregoing compression sealing system are described below.

D. Wall Vertical Interlock (245), Wall End Cap (246) Sealing System

Figure 12:
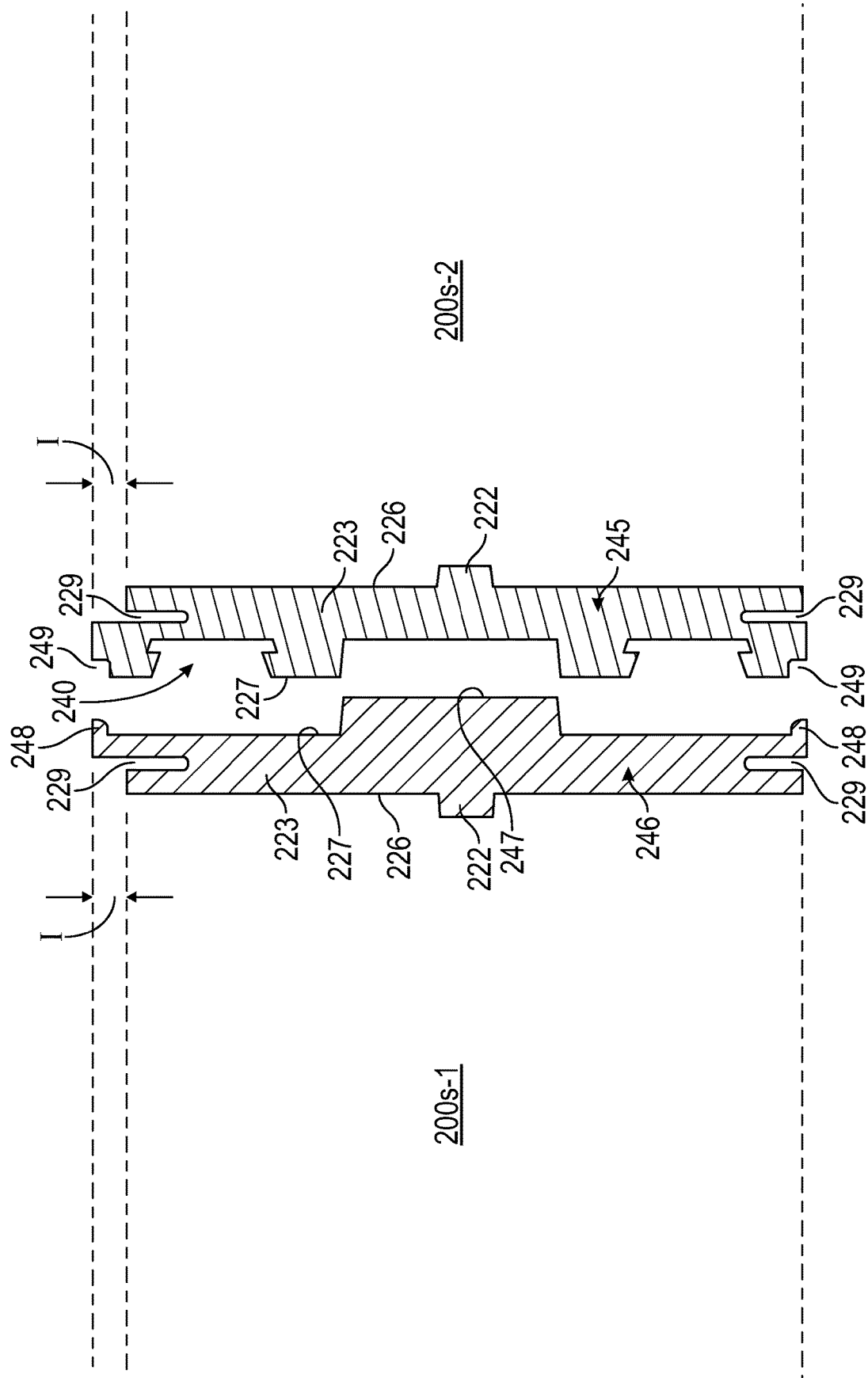
FIG. 12 is an exploded side view of the junction between a wall vertical interlock and a wall end cap in accordance with the present inventions.

FIG. 12 depicts in exploded form the junction between a wall vertical interlock 245 and a wall end cap 246. The particular junction is shown for illustrative purposes between wall portion 200s-1 and 200s-2, with wall vertical interlock 245 positioned on the interior vertical edge of wall portion 200s-2 (interior vertical edge 192-2 shown in FIG. 2) and wall end cap 246 positioned on the interior vertical edge of wall portion 200s-1 (interior vertical edge 192-1 shown in FIG. 2). In structure 150, wall vertical interlock 245 and wall end cap 246 shown in FIG. 12 are vertically-oriented.

In particular, wall vertical interlock 245 is a rigid elongate member that has an elongate seal plate 223 with an elongate interior face 226 and an opposing elongate planar exterior face 227. The exterior face 227 preferably is hard and smooth to provide a good sealing surface. Seal plate 223 has a length and width the same, or substantially the same, as the length and width of the interior edge of wall portion 200s-2, so as to cover the entirety, or substantially the entirety, of that interior edge of wall portion 200s-2.

As shown in FIG. 12, at the mid-point of the interior face 226 of wall vertical interlock 245 there is provided an elongate key 222, which is rectangular in cross section has a length the same, or substantially the same, as the length of seal plate 223. Key 222 is received in a corresponding elongate slot formed in the interior edge reinforcement positioned on the interior vertical edge of wall portion 200s-2, to which wall vertical interlock 245 is secured. Each of the top and bottom edges of wall vertical interlock 245 define elongate locating slots 229 for receiving the edge portions of sheet metal layers 205 and 216, when bent down at a ninety degree (90°) angle. In addition, the edge of one of the slots 229 abutting the interior face 226 of wall vertical interlock 245 is terminated an inset distance "I" from the opposing edge of that slot, where I is the thickness of the protective layer 218, such as magnesium oxide (MgO) board.

Still referring to FIG. 12, at the mid-point of the exterior face 227 of seal plate 223 of wall vertical interlock 245 there is provided an elongate interlock slot 228, which is rectangular in cross-section and has a length the same, or substantially the same, as the length of the exterior face 227 of wall vertical interlock 245. Two elongate seal slots 240 are defined on the exterior face 227 of wall vertical interlock 245, one above interlock slot 228 and the other below interlock slot 228, as shown in FIG. 12. Each slot 240 has a length the same, or substantially the same, as the length of wall vertical interlock 245.

Wall vertical interlock 245 can be secured to the vertical edge of wall portion 200s-2 shown in FIG. 12 for example by adhesive applied to interior face 226, or by fasteners, such as screw or nail fasteners, spaced apart along the length of wall vertical interlock 245 and driven through the exterior face 227, or by utilizing a combination of adhesive and fasteners.

FIG. 12 additionally depicts a wall end cap 246. Wall end cap 246 shown in FIG. 12 is a rigid elongate member that is defined by an elongate seal plate 223 having an elongate interior face 226 and an opposing elongate planar exterior face 227. The exterior face 227 preferably is hard and smooth to provide a good sealing surface. Seal plate 223 has a length and width the same, or substantially the same, as the length and width of the exterior edge of wall portion 200s-1, so as to cover the entirety, or substantially the entirety, of the vertical edge of wall portion 200s-1 shown in in FIG. 12.

At the mid-point of the interior face 226 of wall end cap 246 show in in FIG. 12 there is provided an elongate key 222, which is rectangular in cross-section and has a length the same, or substantially the same, as the length of seal plate 223. Key 222 of wall end cap 246 is received in a corresponding elongate slot formed in the interior edge reinforcement, positioned on the interior vertical edge of wall portion 200s-1, to which wall end cap 246 is secured. Each of the top and bottom edges of wall end cap 246 define elongate locating slots 229 for receiving the edge portions of sheet metal layers 205 and 216, when bent down at a ninety degree (90°) angle. In addition, the edge of one of the slots 229 abutting the interior face 226 of wall end cap 246 is terminated an inset distance "I" from the opposing edge of that slot, where I is the thickness of the protective layer 218, such as magnesium oxide (MgO) board.

Wall end cap 246 can be secured to the vertical edge of wall portion 200s-1 shown in FIG. 12 for example by adhesive applied to interior face 226, or by fasteners, such as screw or nail fasteners, spaced apart along the length of wall end cap 246 and driven through the exterior face 227, or by utilizing a combination of adhesive and fasteners.

In FIG. 12, wall vertical interlock 245 mates with wall end cap 246. For this purpose, at the mid-point of the exterior face 227 of seal plate 223 of wall end cap 246 there is provided an elongate interlock key 247, which is rectangular in cross-section and has a length the same, or substantially the same, as the length of the exterior face 227 of wall end cap 246. Interlock key 247 mates with interlock slot 228 when wall vertical interlock 245 and wall end cap 246 are pressed together. Additionally, the two edges of wall end cap 246 are provided with elongate coupling ridges 248 which mate with elongate coupling insets 249 located at the edges of wall vertical interlock 245. Coupling ridges 248 and coupling insets 249 can have the same, or approximately the same, lengths as wall end cap 246 and wall vertical interlock 245 respectively.

Prior to mating wall vertical interlock 245 with wall end cap 246, a compression seal 230 is placed in each of the two seal slots 240 of wall vertical interlock 245, with each seal 230 having the same, or approximately the same, length as the slot 240 in which it is inserted. When wall vertical interlock 245 with wall end cap 246 are pressed together in a mating relationship, the two compression seals 230 are deformed in the manner described previously to provide four lines of sealing between wall vertical interlock 245 and wall end cap 246.

E. I-Beam Interlock A (250), I-Beam Interlock B (251) Sealing System

Figure 14:
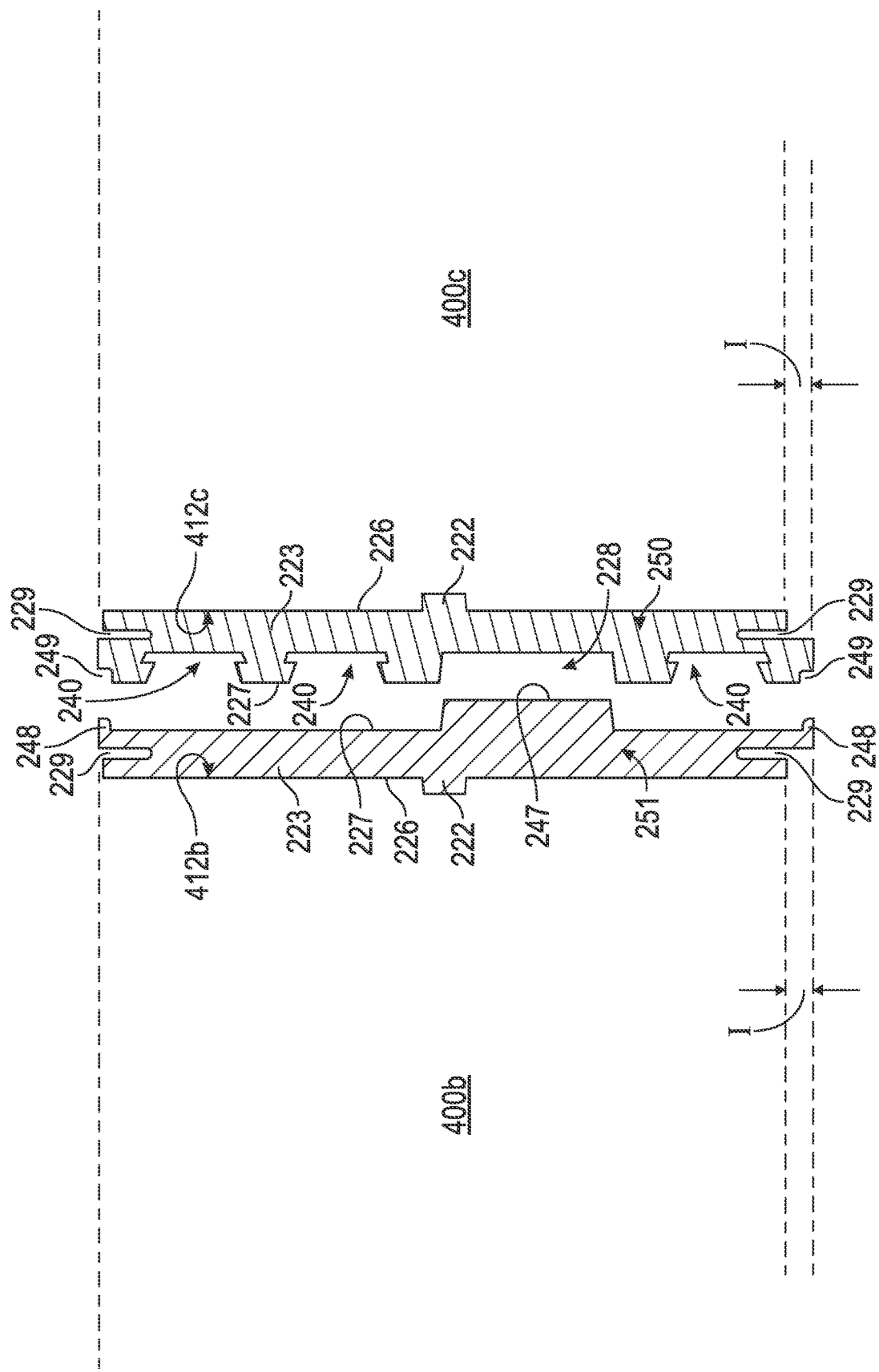
FIG. 14 is an exploded side view of the junction between an I-beam interlock A and an I-beam interlock B in accordance with the present inventions.

FIG. 14 depicts in exploded form the junction between an I-beam interlock A 250 and an I-beam interlock B 251, each shown in cross-section. The particular junction is shown for illustrative purposes between roof portion 400b and roof portion 400c, with I-beam interlock A 250 positioned on the interior edge 412c of roof portion 400c, and with I-beam interlock B 251 positioned on first interior edge 412b of roof portion 400b. In structure 150, I-beam interlock A 250 and I-beam interlock B 251 shown in FIG. 14 are horizontally oriented.

In particular, I-beam interlock A 250 is a rigid elongate member that is defined by an elongate seal plate 223 having an elongate interior face 226 and an opposing elongate planar exterior face 227. The exterior face 227 preferably is hard and smooth to provide a good sealing surface. Seal plate 223 has a length and width the same, or substantially the same, as the length and width of the interior edge 412c of roof portion 400c shown in FIG. 14, so as to cover the entirety, or substantially the entirety, of that interior edge.

As shown in FIG. 14, at the mid-point of the interior face 226 of I-beam interlock A 250 there is provided an elongate key 222, which has a rectangular cross-section and a length the same, or substantially the same, as the length of I-beam interlock A 250. Key 222 is received in a corresponding elongate slot formed in the interior edge reinforcement positioned on the horizontal edge of roof portion 400c, to which I-beam interlock A 250 is secured. Each of the top and bottom edges of I-beam interlock A 250 define elongate locating slots 229 for receiving the edge portions of sheet metal layers 205 and 216, bent down at a ninety degree (90°) angle. In addition, the edge of one of the slots 229 abutting the interior face 226 of I-beam interlock A 250 is terminated an inset distance "I" from the opposing edge of that slot, where I is the thickness of the protective layer 218, such as magnesium oxide (MgO) board.

Still referring to FIG. 14, in the lower half of the exterior face 227 of seal plate 223 of I-beam interlock A 250 there is provided an elongate interlock slot 228, which has a rectangular cross-section and a length the same, or substantially the same, as the length of the exterior face 227 of I-beam interlock A 250. Three elongate seal slots 240 are defined on the exterior face 227 of I-beam interlock A 250, two above interlock slot 228 and one below interlock slot 228, as shown in FIG. 14. Each seal slot 240 has a length the same, or substantially the same, as the length of I-beam interlock A 250.

I-beam interlock A 250 can be secured to the interior edge 412c of roof portion 400c shown in FIG. 14 for example by adhesive applied to interior face 226, or by fasteners, such as screw or nail fasteners, spaced apart along the length of I-beam interlock A 250 and driven through the exterior face 227, or by utilizing a combination of adhesive and fasteners.

FIG. 14 additionally depicts an I-beam interlock B 251. I-beam interlock B 251 is a rigid elongate member that is defined by an elongate seal plate 223 having an elongate interior face 226 and an opposing elongate planar exterior face 227. The exterior face 227 preferably is hard and smooth to provide a good sealing surface. Seal plate 223 has a length and width the same, or substantially the same, as the length and width of the first interior edge 412b of roof portion 400b, so as to cover the entirety, or substantially the entirety, of that interior edge.

At the mid-point of the interior face 226 of I-beam interlock B 251 shown in in FIG. 14 there is provided an elongate key 222, which has a rectangular cross-section and a length the same, or substantially the same, as the length of I-beam interlock B 251. Key 222 of I-beam interlock B 251 is received in a corresponding elongate slot formed in the exterior edge reinforcement positioned on first interior edge 412b of roof portion 400b, to which I-beam interlock B 251 is secured. Each of the top and bottom edges of I-beam interlock B 251 define elongate locating slots 229 for receiving the edge portions of sheet metal layers 205 and 216, bent down at a ninety degree (90°) angle. In addition, the edge of one of the slots 229 abutting the interior face 226 of wall end cap 246 is terminated an inset distance "I" from the opposing edge of that slot, where I is the thickness of the protective layer 218, such as magnesium oxide (MgO) board.

I-beam interlock B 251 can be secured to the first interior edge 412b of roof portion 400b for example by adhesive applied to interior face 226, or by fasteners, such as screw or nail fasteners, spaced apart along the length of I-beam interlock B 251 and driven through the exterior face 227, or by utilizing a combination of adhesive and fasteners.

In FIG. 14, I-beam interlock A 250 mates with I-beam interlock B 251. For this purpose, in the lower half of the exterior face 227 of seal plate 223 of I-beam interlock B 251 there is provided an elongate interlock key 247, which has a rectangular cross-section and a length the same, or substantially the same, as the length of I-beam interlock B 251. Interlock key 247 mates with interlock slot 228 when I-beam interlock A 250 and I-beam interlock B 251 are pressed together. Additionally, the exterior edges of I-beam interlock B 251 are provided with elongate coupling ridges 248 which mate with elongate coupling insets 249 located at the exterior edges of I-beam interlock A 250. Coupling ridges 248 and coupling insets 249 can have the same, or approximately the same, lengths as I-beam interlock A 250 and I-beam interlock B 251 respectively.

Prior to mating I-beam interlock A 250 with I-beam interlock B 251, a compression seal 230 is placed in each of the three seal slots 240 of I-beam interlock A 250, with each seal 230 having the same, or approximately the same, length as the slot 240 in which it is inserted. When I-beam interlock A 250 and I-beam interlock B 251 are pressed together in a mating relationship, the three compression seals 230 are deformed in the manner described previously to provide six lines of sealing between I-beam interlock A 250 and I-beam interlock B 251.

F. Floor Top Plate (252), Wall End Cap (246) Sealing System

Figure 15:
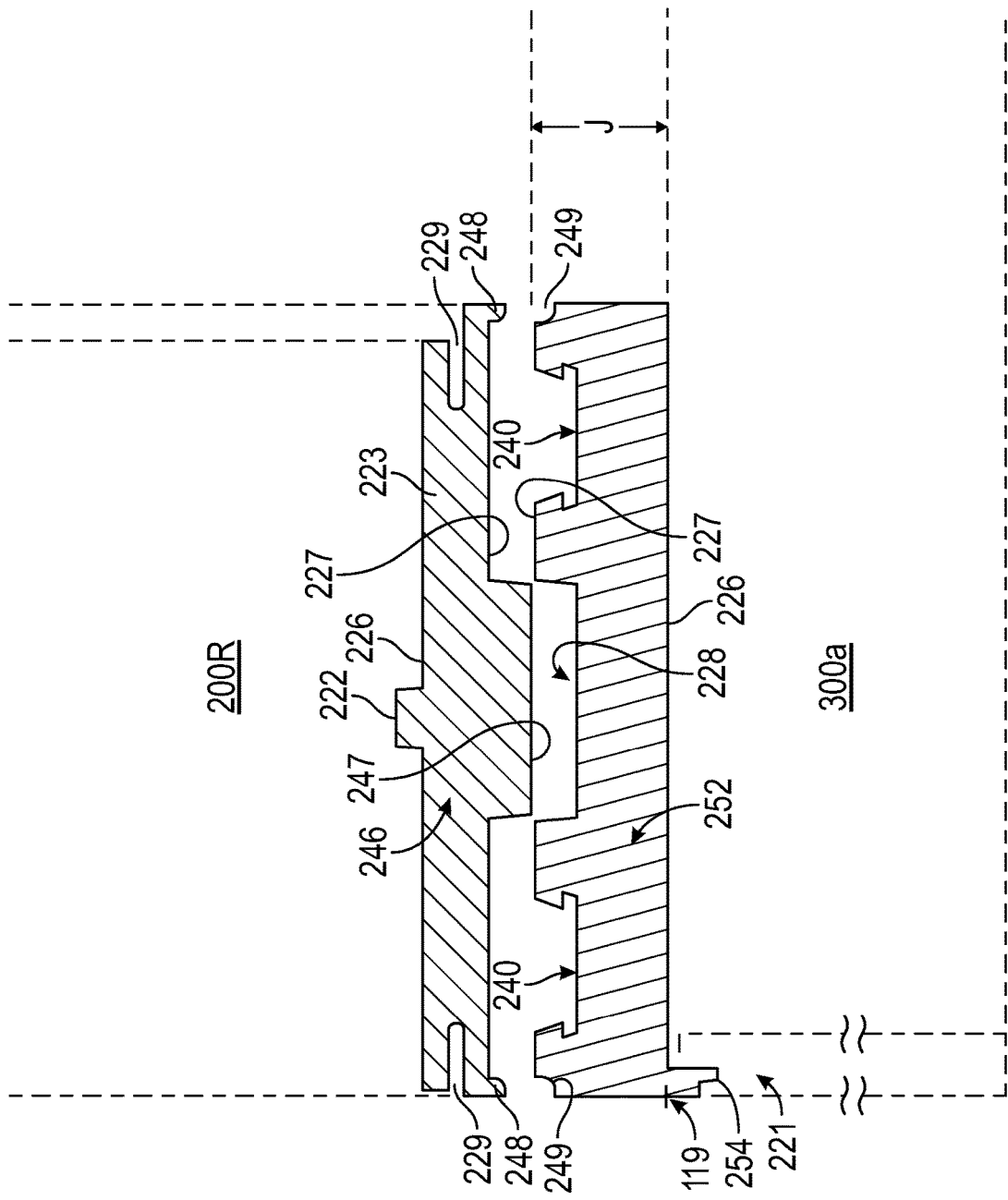
FIG. 15 is an exploded side view of the junction between a floor top plate and a wall end cap in accordance with the present inventions.

FIG. 15 depicts in exploded form the junction between a floor top plate 252 and a wall end cap 246, each shown in cross-section. The particular junction is shown for illustrative purposes between wall component 200R and floor portion 300a, with floor top plate 252 positioned along the upper surface of floor portion 300a adjacent second longitudinal floor edge 119, and with wall end cap 246 positioned on the bottom edge of wall component 200R. In structure 150, wall 200R shown in FIG. 15 is vertically oriented and floor portion 300a is horizontally oriented.

In particular, floor top plate 252 in FIG. 15 is a rigid elongate member that has an elongate seal plate 223 with an elongate interior face 226 and an opposing elongate planar exterior face 227. The exterior face 227 preferably is hard and smooth to provide a good sealing surface. Seal plate 223 has a length the same, or substantially the same, as the length of second longitudinal floor edge 119, so as to cover the top edge of floor portion 300a proximate to second longitudinal floor edge 119. Seal plate 223 of floor top plate 252 has a width the same, or substantially the same, as the width of wall component 200R. The floor top plate 252 preferably has a thickness "J" sufficient to accommodate the thickness of any protective layer 218 and/or flooring used to surface floor portion 300a, such as stone, wood or carpeting.

As shown in FIG. 15, at the exterior edge of the interior face 226 of floor top plate 252, proximate to second longitudinal floor edge 119, there is provided a series of elongate stepped locating ridges 254. These stepped locating ridges, which have a length the same, or substantially the same, as the length of floor top plate 252, mesh with the corresponding stepped locating ridges 253 shown on I-beam end cap 221 depicted in FIG. 10 and with dashed lines in FIG. 15.

Still referring to FIG. 15, at the mid-point of the exterior face 227 of seal plate 223 of floor top plate 252 there is provided an elongate interlock slot 228, which has a rectangular cross-section and a length the same, or substantially the same, as the length of floor top plate 252. Two elongate seal slots 240 are defined on the exterior face 227 of floor top plate 252, one on each side of interlock slot 228, as shown in FIG. 15. Each slot 240 has a length the same, or substantially the same, as the length of floor top plate 252.

Floor top plate 252 can be secured to the top edge of floor portion 300a proximate to second longitudinal floor edge 119 shown in FIG. 15 for example by adhesive applied to interior face 226, or by fasteners, such as screw or nail fasteners, spaced apart along the length of floor top plate 252 and driven through the exterior face 227, or by utilizing a combination of adhesive and fasteners.

FIG. 15 additionally depicts a wall end cap 246 positioned along the bottom edge of wall component 200R. The design of wall end cap 246 was previously described in connection with FIG. 12. The seal plate 223 of wall end cap 246 shown in FIG. 15 has a length and width the same, or substantially the same, as the length and width of the bottom edge of wall component 200R, so as to cover the entirety, or substantially the entirety, of the bottom edge of wall component 200R shown in in FIG. 15.

Wall end cap 246 can be secured to the bottom edge of wall component 200R shown in FIG. 15 for example by adhesive applied to interior face 226, or by fasteners, such as screw or nail fasteners, spaced apart along the length of wall end cap 246 and driven through the exterior face 227, or by utilizing a combination of adhesive and fasteners.

In FIG. 15, floor top plate 252 mates with wall end cap 246. For this purpose, the interlock key 247 of wall end cap 246 is provided with a length the same, or substantially the same, as the length of the exterior face 227 of floor top plate 252. That interlock key 247 mates with the interlock slot 228 of floor top plate 252 when floor top plate 252 and wall end cap 246 are pressed together, with the elongate coupling ridges 248 of wall end cap 246 mating with the elongate coupling insets 249 of floor top plate 252. Coupling ridges 248 and coupling insets 249 can have the same, or approximately the same, lengths as wall end cap 246 and floor top plate 252 respectively.

Prior to mating wall end cap 246 and floor top plate 252, a compression seal 230 is placed in each of the two seal slots 240 of floor top plate 252, with each seal 230 having the same, or approximately the same, length as the seal slot 240 in which it is inserted. When wall vertical interlock 245 and wall end cap 246 are pressed together in a mating relationship, the two compression seals 230 are deformed in the manner described previously to provide four lines of sealing between wall end cap 246 and floor top plate 252.

G. Roof Bottom Plate (255), Wall End Cap (246) Sealing System

Figure 13:
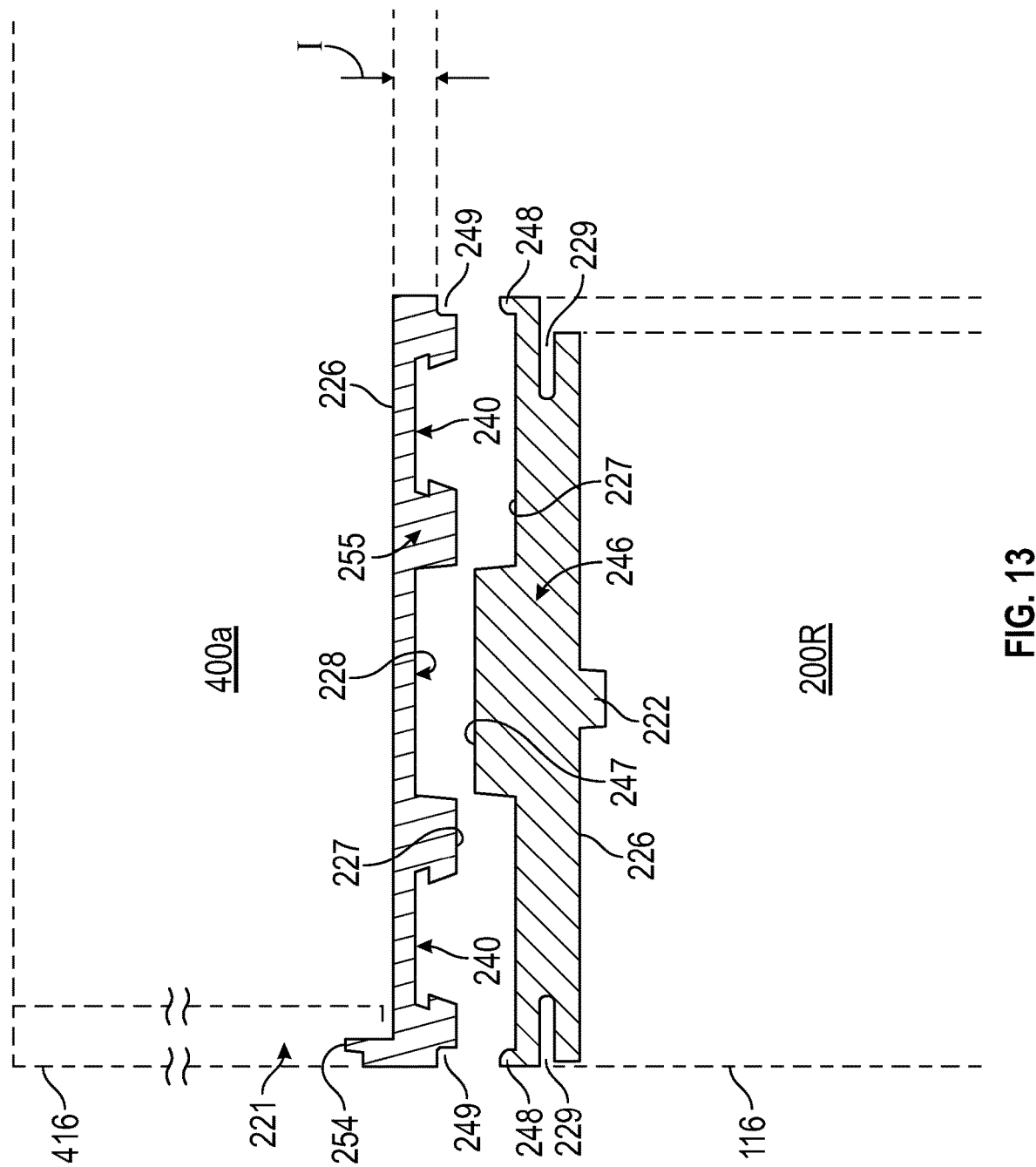
FIG. 13 is an exploded side view of the junction between a roof bottom plate and a wall end cap in accordance with the present inventions.

FIG. 13 depicts in exploded form the junction between a roof bottom plate 255 and a wall end cap 246, each shown in cross-section. The particular junction shown for illustrative purposes is between wall component 200R and roof portion 400a, with roof bottom plate 255 positioned along the lower face of roof portion 400a adjacent second longitudinal roof edge 416, and wall end cap 246 positioned on the top edge of wall component 200R. In structure 150, wall component 200R in FIG. 13 is vertically oriented and roof portion 400a is horizontally oriented.

The design of roof bottom plate 255 shown in FIG. 13 is substantially the same as floor top plate 252 shown in FIG. 15, except that roof bottom plate 255 is thinner because it need not accommodate the thickness of any flooring; for example, roof bottom plate 255 can have a thickness "I", equal to the thickness of an abutting protective layer 218, such as MgO board. Roof bottom plate 255 in FIG. 13 is a rigid elongate member that has an elongate seal plate 223 with an elongate planar interior face 226 and an opposing elongate planar exterior face 227. The exterior face 227 preferably is hard and smooth to provide a good sealing surface. Seal plate 223 of roof bottom plate 255 has a length the same, or substantially the same, as the length of second longitudinal roof edge 416, so as to cover the bottom edge of roof portion 400a proximate to second longitudinal roof edge 416. Seal plate 223 of roof bottom plate 255 has a width the same, or substantially the same, as the width of wall component 200R.

As shown in FIG. 13, at the exterior edge of the interior face 226 of roof bottom plate 255, proximate to second longitudinal roof edge 416, there is provided a series of elongate stepped locating ridges 254. These stepped locating ridges, which have a length the same, or substantially the same, as the length of roof bottom plate 255, mesh with the corresponding stepped locating ridges 253 of wall end cap 221 depicted in FIG. 10 and with dashed lines in FIG. 13, and positioned at the exterior edge of roof portion 400a.

Still referring to FIG. 13, at the mid-point of the exterior face 227 of seal plate 223 of roof bottom plate 255 there is provided an elongate interlock slot 228, which has a rectangular cross-section and a length the same, or substantially the same, as the length of roof bottom plate 255. There are two elongate seal slots 240 defined on the exterior face 227 of roof bottom plate 255, one on each side of interlock slot 228, as shown in FIG. 13. Each seal slot 240 has a length the same, or substantially the same, as the length of roof bottom plate 255.

Roof bottom plate 255 can be secured to the bottom face of roof portion 400a shown in FIG. 13 for example by adhesive applied to interior face 226, or by fasteners, such as screw or nail fasteners, spaced apart along the length of roof bottom plate 255 and driven through the exterior face 227, or by utilizing a combination of adhesive and fasteners.

FIG. 13 additionally depicts a wall end cap 246 positioned along the top edge of wall component 200R. The design of wall end cap 246 was previously described in connection with FIG. 12. The seal plate 223 of wall end cap 246 shown in FIG. 13 has a length and width the same, or substantially the same, as the length and width of the top edge of wall component 200R, so as to cover the entirety, or substantially the entirety, of the top edge of wall component 200R. Wall end cap 246 can be fastened to that top edge for example by adhesive applied to its interior face 226, or by fasteners, such as screw or nail fasteners, spaced apart along the length of wall end cap 246 and driven through its exterior face 227, or by utilizing a combination of adhesive and fasteners.

In FIG. 13, roof bottom plate 255 mates with wall end cap 246. For this purpose, the interlock key 247 of wall end cap 246 is provided with a length the same, or substantially the same, as the length of roof bottom plate 255. That interlock key 247 mates with the interlock slot 228 of roof bottom plate 255 when roof bottom plate 255 and wall end cap 246 are pressed together, with the elongate coupling ridges 248 of wall end cap 246 mating with elongate coupling insets 249 of roof bottom plate 255. Coupling ridges 248 and coupling insets 249 can be the same, or approximately the same, as the lengths of wall end cap 246 and roof bottom plate 255 respectively.

Prior to mating wall end cap 246 and roof bottom plate 255, a compression seal 230 is placed in each of the two seal slots 240 of roof bottom plate 255, with each seal 230 having the same, or approximately the same, length as the slot 240 in which it is inserted. When roof bottom plate 255 and wall end cap 246 are pressed together in a mating relationship, the two compression seals 230 are deformed in the manner described previously to provide four lines of sealing between roof bottom plate 255 and wall end cap 246.

H. Shear Seal (260)

A number of the enclosure component sealing systems described herein and utilized in structure 150 include a shear seal system. An element of that shear seal system is a shear seal 260.

Figure 16A:
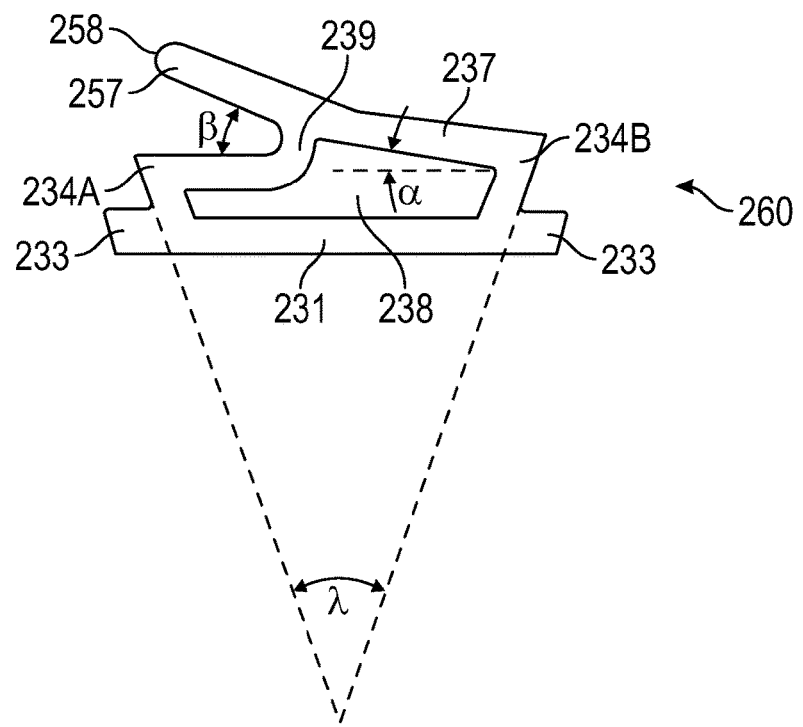
FIG. 16A is a section view of a shear seal in accordance with the present inventions.

Shear seal 260, which is shown in cross-section in FIG. 16A, is an elongate member having a planar elongate base 231 flanked by two elongate winglets 233. At the intersection of base 231 and each of the winglets 233, there is provided two opposed elongate seal walls 234 (individually referred to as seal walls 234A, 234B), joined to and extending away from base 231 in a diverging relationship at a divergence angle $\lambda$ where $\lambda<180°$, for example $\lambda<90°$ or in the range of $40°<\lambda<50°$. It is most preferred that $\lambda$ be the same, or nearly so, as the divergence angle c of the slot walls 244 shown in FIG. 11B. Thus as shown in FIG. 16A, the ends of the seal walls 234 distal from base 231 are further apart than the ends of the seal walls 234 proximate to base 231.

At the end of seal wall 234B distal from base 231, seal wall 234B is joined to an elongate seal closure 237, a planar surface oriented at an upward angle $\alpha$ (relative to the planar orientation of base 231) away from seal wall 234B in a direction toward an elongate seal support 239, described below, with $\alpha<90°$. A planar cantilevered seal surface 257 is joined to the edge of seal closure 237 that is distal from seal wall 234B, as shown in FIG. 16A.

At the end of seal wall 234A distal from base 231, seal wall 234A is joined to the elongate seal support 239. Proximate to seal wall 234A, seal support 239 comprises an elongate planar region oriented parallel to base 231. Distal from seal wall 234A, seal support 239 comprises an elongate arcuate buttress region. The edge of the arcuate buttress region of seal support 239, which is distal from seal wall 234A, joins cantilevered seal surface 257 proximate to the junction of cantilevered seal surface 257 and seal closure 237 to define a hollow seal chamber 238. Planar cantilevered seal surface 257 is oriented at an upward angle $\beta$ away from the junction of arcuate buttress 235 and seal closure 237 and terminates at a free end 258, with $\beta<90°$, for example $\beta>\alpha$.

Figure 16B:
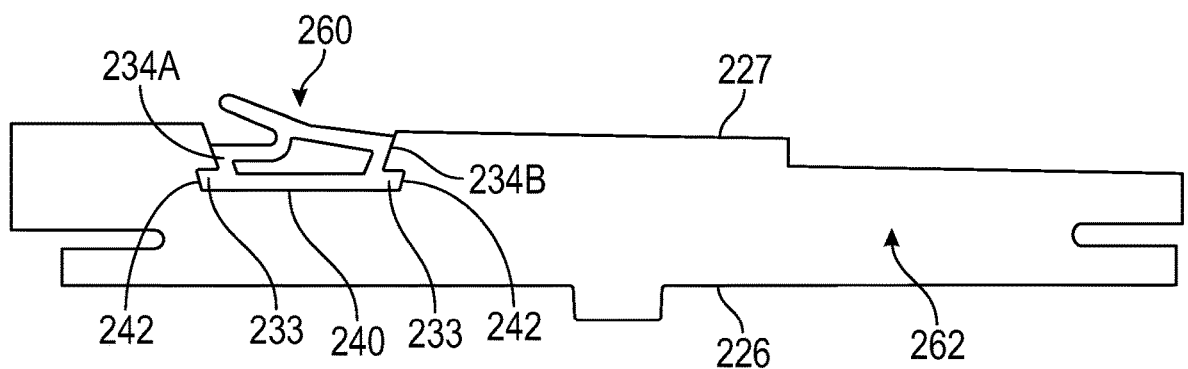
FIG. 16B is a side view of a wall end interlock with a shear seal provided in its seal slot in accordance with the present inventions.

Shear seal 260 is intended to be received in an elongate seal slot 240, shown for example in FIG. 16B, which has the same geometry as the seal slots 40 utilized to receive compression seals 230. Shear seal 260 is dimensioned to snugly fit within slot 240, such that winglets 233 of seal 260 are received in grooves 242 of slot 240. An exemplary placement of a shear seal 260 is depicted in FIG. 16B, which shows a shear seal 260 placed within the slot 240 of a wall end interlock A 262, described further below. As can be seen, when shear seal 260 is properly positioned in slot 240, both seal wall 234A and seal wall 234B terminate below the level of exterior face 227 of wall end interlock A 262, with seal wall 234A (underlying planar cantilevered seal surface 257) terminating below the level at which seal wall 234B terminates.

Shear seal 260 is preferably utilized where two enclosure components 155 are laterally moved during unfolding, one over the other. In such an instance, the two enclosure components 155 are provided with paired enclosure component sealing structures, with one enclosure component sealing structure mounted on one of the enclosure components 155 (such as on an exterior edge), and the other enclosure component sealing structure mounted on the other of the enclosure component structures 155 (such as on an interior face). Each of the paired enclosure component sealing structures has a shear seal 260, with the two shear seals 260 being oppositely oriented; that is to say, the cantilevered seal surface 257 of each is oriented away from the cantilevered seal surface 257 of the other, and each is oriented in the direction of relative movement. Thus in the case of each of the two shear seals 260, the lateral movement of one enclosure component 155, relative to the other, is in the direction from seal wall 234B toward seal wall 234A. This lateral movement flattens the cantilevered seal surface 257, as well as the seal closure 237, and squeezes down each shear seal 260, such that its seal closure 237 and seal support 239 are urged into seal chamber 238. This permits the opposing planar exterior faces 227 of each of the two enclosure component sealing structures to come into full contact. At the same time, the cantilevered seal surface 257 and seal closure 237 of each shear seal 260 are urged into a generally coplanar relationship, with the planar exterior face 227 of the opposing enclosure component seal structure pressing against them, to create an elongate area of sealing.

Shear seal 260 can be fabricated from a resilient material, such as rubber or plastic, for example polyurethane. Particular embodiments of enclosure component sealing structures utilizing the foregoing compression sealing system are described below.

I. Wall End Interlock A (262), Floor Top Interlock (261) Sealing System

Figure 17:
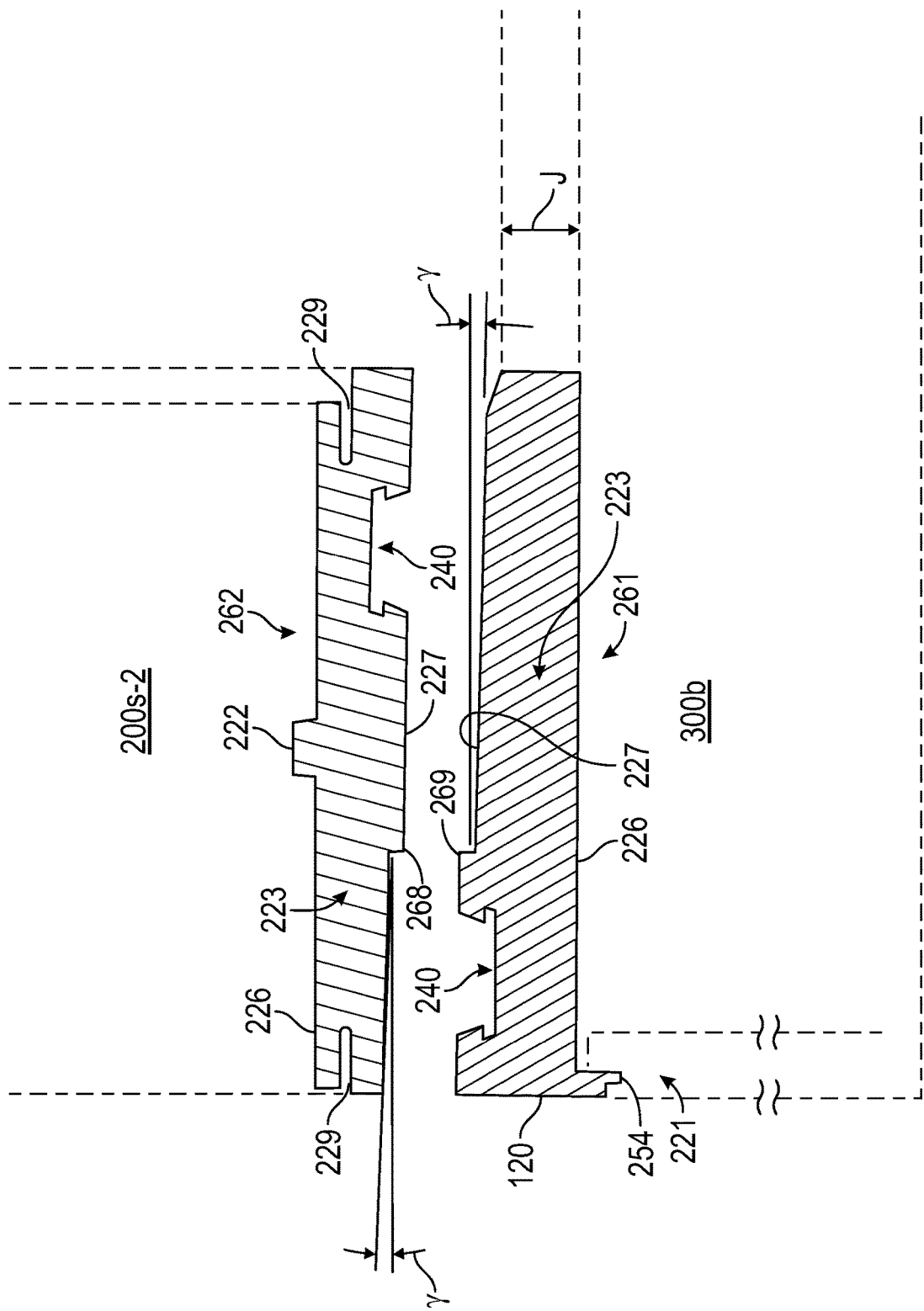
FIG. 17 is an exploded side view of the junction between a floor top interlock and a wall end interlock A in accordance with the present inventions.

FIG. 17 depicts in exploded form the junction between a floor top interlock 261 and a wall end interlock A 262, each shown in cross-section. The particular junction is shown for illustrative purposes between wall portion 200s-2 and floor portion 300b, with floor top interlock 261 positioned along the upper face of floor portion 300b adjacent first transverse floor edge 120, and with wall end interlock A 262 positioned on the bottom edge of wall portion 200s-2. In structure 150, wall portion 200s-2 in FIG. 17 is vertically oriented and floor portion 300b is horizontally oriented.

In particular, floor top interlock 261 shown in FIG. 17 is a rigid elongate member that has an elongate seal plate 223 with an interior face 226 and an opposing planar exterior face 227. The exterior face 227 preferably is hard and smooth to provide a good sealing surface. Seal plate 223 has a length the same, or substantially the same, as the dimension of floor portion 300b coinciding with first transverse floor edge 120, so as to cover the top edge of floor portion 300b proximate to first transverse floor edge 120. Seal plate 223 of floor top interlock 261 has a width the same, or substantially the same, as the width of wall portion 200s-2. The floor top interlock 261 preferably has a thickness "J" at its interior edge, as shown in FIG. 17, sufficient to accommodate the thickness of any protective layer 218 and/or flooring used to surface floor portion 300b, such as stone, wood or carpeting.

As shown in FIG. 17, at the exterior edge of the interior face 226 of floor top interlock 261, adjacent first transverse floor edge 120, there is provided a series of elongate stepped locating ridges 254. These stepped locating ridges 254, which have a length the same, or substantially the same, as the length of floor top interlock 261, mesh with the corresponding stepped locating ridges 253. shown on the wall end cap 221 depicted in FIG. 10. Such a wall end cap 221 is located at the exterior edge of wall portion 300b, as indicated in FIG. 17 by dashed lines.

Still referring to FIG. 17, an elongate seal slot 240 is defined on the exterior face 227 of floor top interlock 261, proximate to the exterior edge of floor portion 300b (such exterior edge coincides with first transverse floor edge 120). Seal slot 240 has a length the same, or substantially the same, as the length of floor top interlock 261.

Floor top interlock 261 can be secured to the top edge of floor portion 300b at first transverse floor edge 120 shown in FIG. 17 for example by adhesive applied to interior face 226, or by fasteners, such as screw or nail fasteners, spaced apart along the length of floor top interlock 261 and driven through the exterior face 227, or by utilizing a combination of adhesive and fasteners.

Wall end interlock A 262, also shown in FIG. 17, is a rigid elongate member that has an elongate seal plate 223 with an interior face 226 and an opposing exterior face 227. The exterior face 227 preferably is hard and smooth to provide a good sealing surface. The seal plate 223 of wall end interlock A 262 has a length and width the same, or substantially the same, as the length and width of the bottom edge of wall portion 200s-2, so as to cover the entirety, or substantially the entirety, of the bottom edge of wall portion 200s-2, as shown in in FIG. 17.

At the mid-point of the interior face 226 of seal plate 223 of wall end interlock A 262, there is provided an elongate key 222, which has a rectangular cross section and a length the same, or substantially the same, as the length of wall end interlock A 262. Key 222 is received in a corresponding elongate slot formed in the exterior edge reinforcement positioned on the bottom edge of the wall portion 200s-2 to which wall end interlock A 262 is secured.

Again referring to FIG. 17, an elongate seal slot 240 is defined on the exterior face 227 of wall end interlock A 262, toward the interior edge of wall end interlock A 262 (distal from first transverse floor edge 120). This seal slot 240 has a length the same, or substantially the same, as the length of wall end interlock A 262. Additionally, each of the interior and exterior edges of wall end interlock A 262 define locating slots 229. In the case where the enclosure component 155, in this case wall portion 200s-2, utilizes the enclosure component laminate design shown in FIG. 7, locating slots 229 receive the edge portions of sheet metal layers 205 and 216, bent down at a ninety degree (90°) angle.

Wall end interlock A 262 can be fastened to the bottom edge of wall portion 200s-2 for example by adhesive applied to its interior face 226, or by fasteners, such as screw or nail fasteners, spaced apart along the length of wall end interlock A 262 and driven through its exterior face 227, or by utilizing a combination of adhesive and fasteners.

In FIG. 17, floor top interlock 261 mates with wall end interlock A 262. Prior to mating, a shear seal 260 is placed in the seal slot 240 of floor top interlock 261, and a shear seal 260 is placed in the seal slot 240 of wall end interlock A 262. The shear seals 260 placed in the seals slots 240 of floor top interlock 261 and wall end interlock A 262 each has the same, or approximately the same, length as the slot 240 in which it is inserted.

Mating of floor top interlock 261 with wall end interlock A 262 occurs by the bottom edge of wall portion 200s-2 moving over the top surface of floor portion 300b, from a folded position to an unfolded position. Thus in the arrangement shown in FIG. 17, such mating will correspond to a movement of wall portion 200s-2 from the right-hand side of the figure toward the left, with wall end interlock A 262 sliding over floor top interlock 261 until the fully unfolded position is reached. In that fully unfolded position, the shear seal 260 in floor top interlock 261, and particularly its seal surface 257, will be in pressing contact with the exterior face 227 of wall end interlock A 262; and the shear seal 260 in wall end interlock A 262, and particularly its seal surface 257, will be in pressing contact with the exterior face 227 of floor top interlock 261. Consistent with this movement, the shear seal 260 placed in seal slot 240 of floor top interlock 261 is preferably oriented so that the free end 258 of its cantilevered seal surface 257 is directed toward the exterior edge of floor top interlock 261 (toward first transverse floor edge 120), and the shear seal 260 placed in the seal slot 240 of wall end interlock A 262 is preferably oriented so that the free end 258 of its cantilevered seal surface 257 is directed toward the interior edge of wall end interlock A 262 (away from first transverse floor edge 120).

To facilitate mating, it is preferred that planar exterior face 227 of floor top interlock 261 not be parallel to the interior face 226 of floor top interlock 261, or to the top face of wall portion 300b, but rather be inclined downward, in the direction moving away from first transverse floor edge 120 at an angle $\gamma$, as shown in FIG. 17. Likewise, it is preferred that planar exterior face 227 of wall end interlock A 262 be inclined upward, in the direction moving toward first transverse floor edge 120, at the same angle γ, as shown in FIG. 17. Accordingly, when bottom edge of wall portion 200s-2 moves over the top surface of floor portion 300b, from a folded position to an unfolded position, the shear seals 260 located in slots 240 of floor top interlock 261 and wall end interlock A 262 will be compressed by the sliding movement of wall end interlock A 262 to provide two elongate sealing areas between floor portion 300b and wall portion 200s-2. Also to facilitate mating, there is shown in FIG. 17 a step-down 268 on the exterior face 227 of wall end interlock A 262. Step-down 268 is an abrupt reduction in the thickness of wall end interlock A 262, in the direction moving from the inside edge of wall end interlock A 262 toward the outside edge of wall end interlock A 262, which outside edge in the case of the junction depicted in FIG. 17 is proximate first transverse floor edge 120 when wall portion 200s-2 is in the fully unfolded position. Step-down 268 is located between the slot 240 and the outside edge of wall end interlock A 262. There is also shown in FIG. 17 a corresponding step-up 269 on the exterior face 227 of floor top interlock 261. Step-up 269 is an abrupt increase in the thickness of floor top interlock 261, in the direction moving from the inside edge of floor top interlock 261 toward the outside edge of floor top interlock 261, which outside edge in the case of the junction depicted in FIG. 17 is proximate first transverse floor edge 120 when floor portion 300b is in the fully unfolded position. Step-up 269 is located between the slot 240 and the inside edge of floor top interlock 261 (distal from first transverse floor edge 120). Step-down 268 and step-up 269 are appropriately located to act as a "stop" and insure correct alignment of wall end interlock A 262 with floor top interlock 261 as wall end interlock A 262 slides over floor top interlock 261.

J. Wall End Interlock B (263), Wall End Interlock A (262) Sealing System

Figure 18:
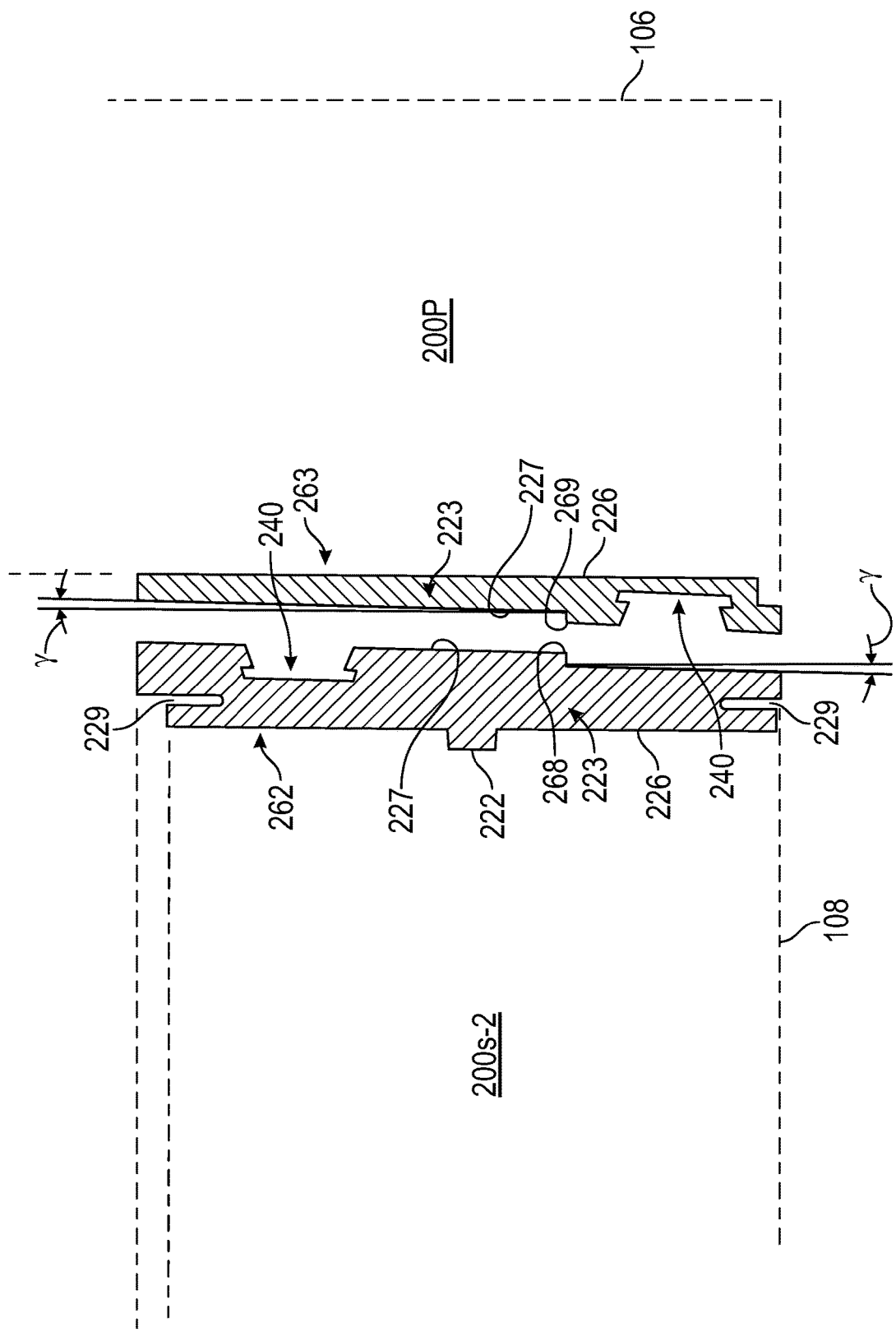
FIG. 18 is an exploded side view of the junction between a wall end interlock B and a wall end interlock A in accordance with the present inventions.

FIG. 18 depicts in exploded form the junction between a wall end interlock B 263 and a wall end interlock A 262, each shown in cross-section. The particular junction is shown for illustrative purposes between wall portion 200s-2 and wall component 200P, with wall end interlock B 263 positioned on the interior edge of wall component 200P proximate first transverse edge 108 and wall end interlock A 262 positioned on the vertical edge of wall portion 200s-2 proximate first longitudinal edge 106. In structure 150, wall portion 200s-2 depicted in FIG. 18 is vertically oriented and wall component 200P is vertically oriented.

In particular, wall end interlock B 263 in FIG. 18 is an elongate member that has an elongate seal plate 223 with an elongate interior face 226 and an opposing elongate planar exterior face 227. The exterior face 227 preferably is hard and smooth to provide a good sealing surface. Seal plate 223 has a length the same, or substantially the same, as the height of wall component 200P when unfolded, so as to cover the interior edge of wall component 200P proximate to first transverse edge 108. Seal plate 223 of wall end interlock B 263 has a width the same, or substantially the same, as the width of wall portion 200s-2. In general terms, the design of wall end interlock B 263 is substantially the same as floor top interlock 261 depicted in FIG. 17, except wall end interlock B 263 is thinner because it need not accommodate any flooring; for example, wall end interlock B 263 can have a thickness "T" (not shown in FIG. 18) at its interior edge equal to the thickness of an abutting protective layer 218, such as MgO board.

Still referring to FIG. 18, an elongate seal slot 240 is defined on the exterior face 227 of wall end interlock B 263, proximate the interior edge of wall component 200P positioned adjacent to first longitudinal edge 106. Seal slot 240 has a length the same, or substantially the same, as the length of wall end interlock B 263.

Wall end interlock B 263 can be secured to the interior edge of wall component 200P as shown in FIG. 18 for example by adhesive applied to interior face 226, or by fasteners, such as screw or nail fasteners, spaced apart along the length of wall end interlock B 263 and driven through the exterior face 227, or by utilizing a combination of adhesive and fasteners.

FIG. 18 additionally shows a wall end interlock A 262 positioned along the depicted vertical edge of wall portion 200s-2. The design of wall end interlock A 262 was previously disclosed in connection with FIG. 17. The seal plate 223 of the wall end interlock A 262 shown in FIG. 18 has a length and width the same, or substantially the same, as the length and width of the depicted vertical edge of wall portion 200s-2, so as to cover the entirety, or substantially the entirety, of that vertical edge of wall portion 200s-2, as shown in in FIG. 18. The elongate rectangular key 222 of wall end interlock A 262 shown in FIG. 18 has a length the same, or substantially the same, as the length of that wall end interlock A 262. Key 222 is received in a corresponding elongate slot formed in the exterior edge reinforcement positioned on the vertical edge of the wall portion 200s-2 to which wall end interlock A 262 is secured. The seal slot 240 of wall end interlock A 262 shown in FIG. 18 has a length the same, or substantially the same, as the length of that wall end interlock A 262. In the case where the enclosure component 155, in this case wall portion 200s-2, utilizes the enclosure component laminate design shown in FIG. 7, the locating slots 229 of wall end interlock A 262 shown in FIG. 18 receive the edge portions of sheet metal layers 205 and 216, bent down at a ninety degree (90°) angle.

Wall end interlock A 262 can be secured to the vertical edge of wall portion 200s-2 shown in FIG. 18 for example by adhesive applied to its interior face 226, or by fasteners, such as screw or nail fasteners, spaced apart along the length of wall end interlock A 262 and driven through its exterior face 227, or by utilizing a combination of adhesive and fasteners.

In FIG. 18, wall end interlock A 262 mates with a wall end interlock B 263. Prior to mating, a shear seal 260 is placed in the seal slot 240 of wall end interlock A 262, and a shear seal 260 is placed in the seal slot 240 of wall end interlock B 263. Each of the shear seals 260 placed in the seals slots 240 of wall end interlock A 262 and a wall end interlock B 263 has the same, or approximately the same, length as the slot 240 in which it is inserted.

Mating of wall end interlock A 262 and a wall end interlock B 263 occurs by the vertical edge of wall portion 200s-2 depicted in FIG. 18 swinging toward and across the interior surface of wall component 200P, as wall portion 200s-2 moves from a folded position to an unfolded position. Thus in the arrangement shown in FIG. 18, such mating will correspond to a movement of wall portion 200s-2 from the top of the figure toward the bottom, with wall end interlock A 262 sliding across wall end interlock B 263 until the fully unfolded position is reached. In that fully unfolded position, the shear seal 260 in wall end interlock A 262, and particularly its seal surface 257, will be in pressing contact with the exterior face 227 of wall end interlock B 263; and the shear seal 260 in wall end interlock B 263, and particularly its seal surface 257, will be in pressing contact with the exterior face 227 of wall end interlock A 262. Consistent with this movement, the shear seal 260 placed in seal slot 240 of floor top interlock B 263 is preferably oriented so that the free end 258 of its cantilevered seal surface 257 is directed toward the exterior edge of wall end interlock B 263 (toward first transverse edge 108), and the shear seal 260 placed in the seal slot 240 of wall end interlock A 262 is preferably oriented so that the free end 258 of its cantilevered seal surface 257 is directed toward the interior edge of wall end interlock A 262 (away from first transverse edge 108).

To facilitate mating, it is preferred that planar exterior face 227 of wall end interlock B 263 not be parallel to the interior face 226 of wall end interlock B or to the interior face of wall component 200P, but rather be inclined at an angle γ, as shown in FIG. 17, so that seal plate 223 of wall end interlock B 263 becomes progressively thinner moving away from first transverse edge 108. Likewise, it is preferred that planar exterior face 227 of wall end interlock A 262 be inclined at the same angle γ, as shown in FIG. 17, so that seal plate 223 of wall end interlock A 262 becomes progressively thicker moving away from first transverse edge 108. Accordingly, when vertical edge of wall portion 200s-2 swings toward and across the interior surface of wall component 200P, from a folded position to an unfolded position, the shear seals 260 located in slots 240 of floor end interlock A 262 and wall end interlock B 263 will be compressed by the sliding movement of wall end interlock A 262 to provide two elongate sealing areas between wall component 200P and wall portion 200s-2. Also to facilitate mating, as previously described a step-down 268 is provided on the exterior face 227 of wall end interlock A 262. Step-down 268 is an abrupt reduction in the thickness of wall end interlock A 262, in the direction moving from the inside edge of wall end interlock A 262 toward the outside edge of wall end interlock A 262, which outside edge in the case of the junction depicted in FIG. 18 is proximate first transverse edge 108 when wall portion 200s-2 is in the fully unfolded position. Step-down 268 is positioned between the slot 240 and the outside edge of wall end interlock A 262 (proximate transverse edge 108), as depicted in FIG. 18. Also as depicted in FIG. 18, a corresponding step-up 269 is provided on the exterior face 227 of wall end interlock B 263. Step-up 269 is an abrupt increase in thickness of wall end interlock B 263, in the direction moving from the inside edge of wall end interlock B 263 toward the outside edge of wall end interlock B 263, which outside edge in the case of the junction depicted in FIG. 18 is proximate first transverse edge 108. Step-up 269 is positioned between the slot 240 and the inside edge of wall end interlock B 263 (distal from first transverse edge 108). Step-down 268 and step-up 269 are appropriately located to act as a "stop" and insure correct alignment of wall end interlock A 262 with wall end interlock B 263 as wall end interlock A 262 slides across wall end interlock B 263.

K. Closure Boards

The two closure boards of these inventions, namely perimeter board 310 and roof skirt board 280, are described below.

Perimeter Board (310). The exterior edges of floor component 300, or portions thereof, are optionally provided with a perimeter board 310.

Figure 19A:
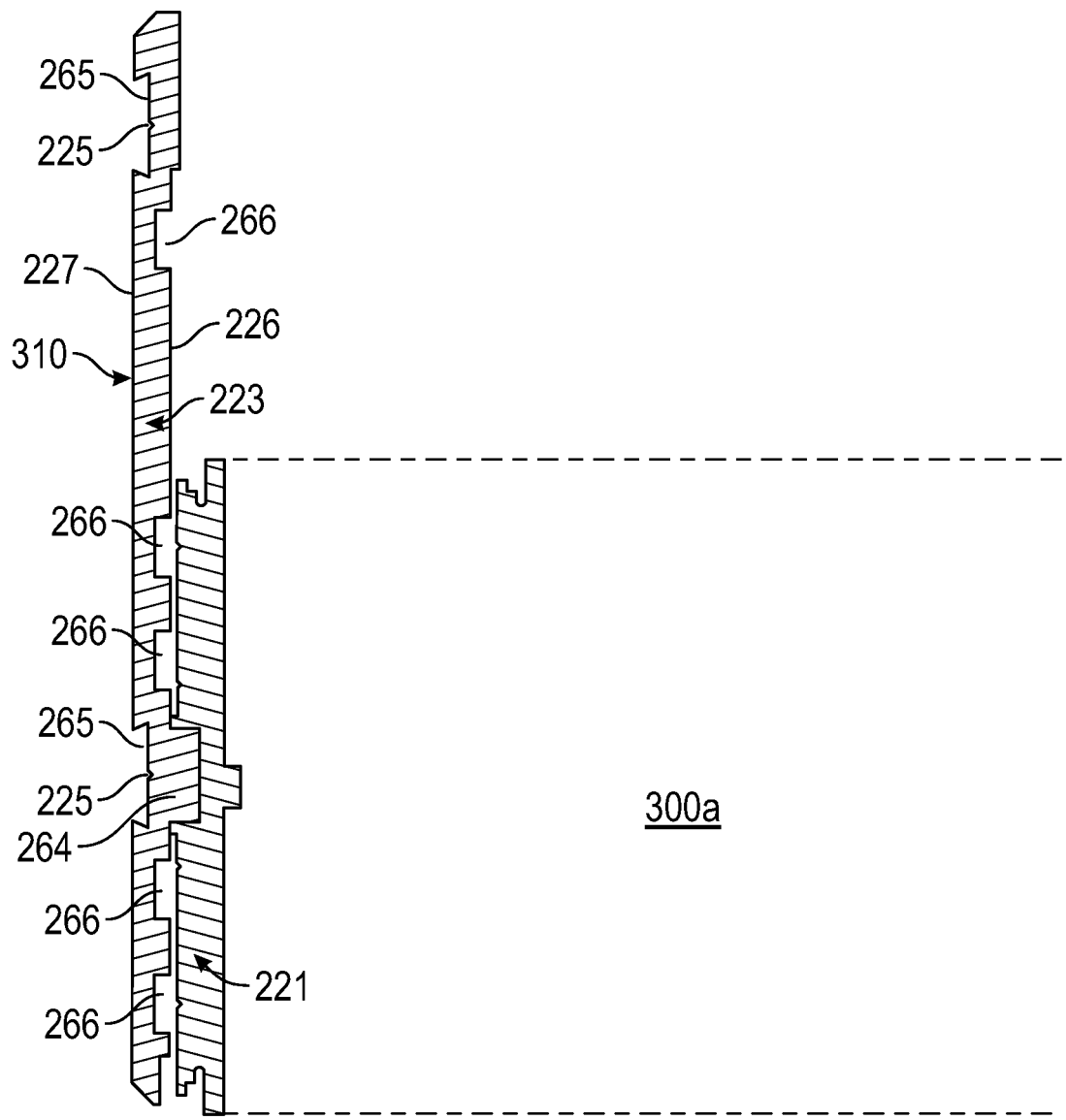
FIG. 19A is a side view of the junction between a perimeter board and an I-beam end cap in accordance with the present inventions.

FIG. 19A depicts in cross section an exemplary positioning of perimeter board 310. In particular, perimeter board 310 is designed to be positioned against an I-beam end cap 221, in this instance the I-beam end cap 221 located on an exterior edge of floor portion 300a. Perimeter board 310 includes an elongate seal plate 223 with an interior face 226 and an opposing exterior face 227. Perimeter board 310 has such length as is desired, such as to span the entirety of the exterior edge of floor portion 300a. As shown in FIG. 19A, the width of perimeter board 310 can be sufficient to capture the thickness of the floor component 300a, or floor portion thereof against which it is positioned, plus a portion of the abutting wall component 200 or wall component portion.

The interior face 226 of perimeter board 310 includes an elongate locating key 264, which is rectangular in cross section and dimensioned to be received in accessory slot 224 of I-beam end cap 221. Locating key 264 can be the same length as the perimeter board 310, or can comprise space apart discrete segments. The interior face 226 of perimeter board 310 in FIG. 19A also includes a plurality of elongate clearance slots 266, rectangular in cross section in the embodiment shown, and having a length the same as, or substantially the same as, the length of perimeter board 310. Clearance slots 266 are preferably located so as to be positioned over locating grooves 225 of I-beam end cap 221 when locating key 264 is received in accessory slot 224. When so located, clearance slots 266 provide space for fastener heads driven into locating grooves 225 of I-beam end cap 221 so that perimeter board 310 can be snugly positioned against I-beam end cap 221.

The exterior face 227 of perimeter board 310 depicted in FIG. 19A includes two elongate fastener slots 265, each of which has a dovetail shape in cross section in the embodiment shown, and a length the same as, or substantially the same as, the length of perimeter board 310. A locating groove 225 is provided in each fastener slot 265, so as to facilitate the accurate positioning of nails or other fasteners utilized to secure perimeter board 310 to abutting components.

Figure 19B:
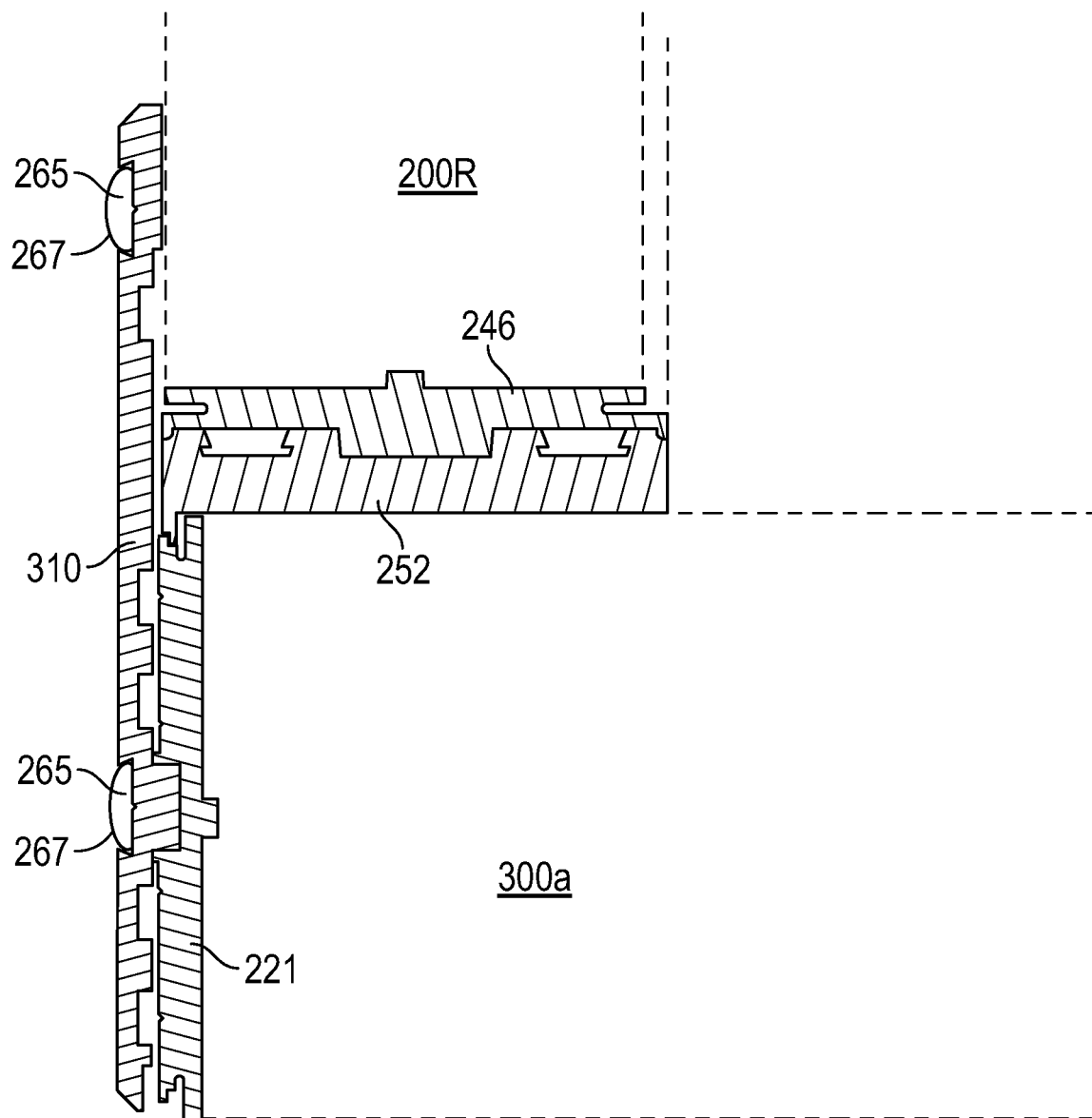
FIG. 19B is a depiction of the positioning of an I-beam end cap, a floor top plate, a wall end cap and a perimeter board in accordance with the present inventions.

FIG. 19B depicts in cross section the positioning of I-beam end cap 221, floor top plate 252, wall end cap 246 and perimeter board 310 relative to each other at a junction between wall component 200R and floor portion 300a. As can be seen, perimeter board 310 masks this junction from external view to achieve a more attractive appearance, as well as providing an additional barrier against the ingress of soil, dust, rain and the like. A resilient strip 267, such as those shown in FIG. 19B, can be snapped into each of the fastener slots 265 to cover any nail or fastener heads exposed in those slots.

Roof Skirt Board. The exterior edges of roof component 400, or portions thereof, are optionally provided with a roof skirt board 280.

Figure 20:
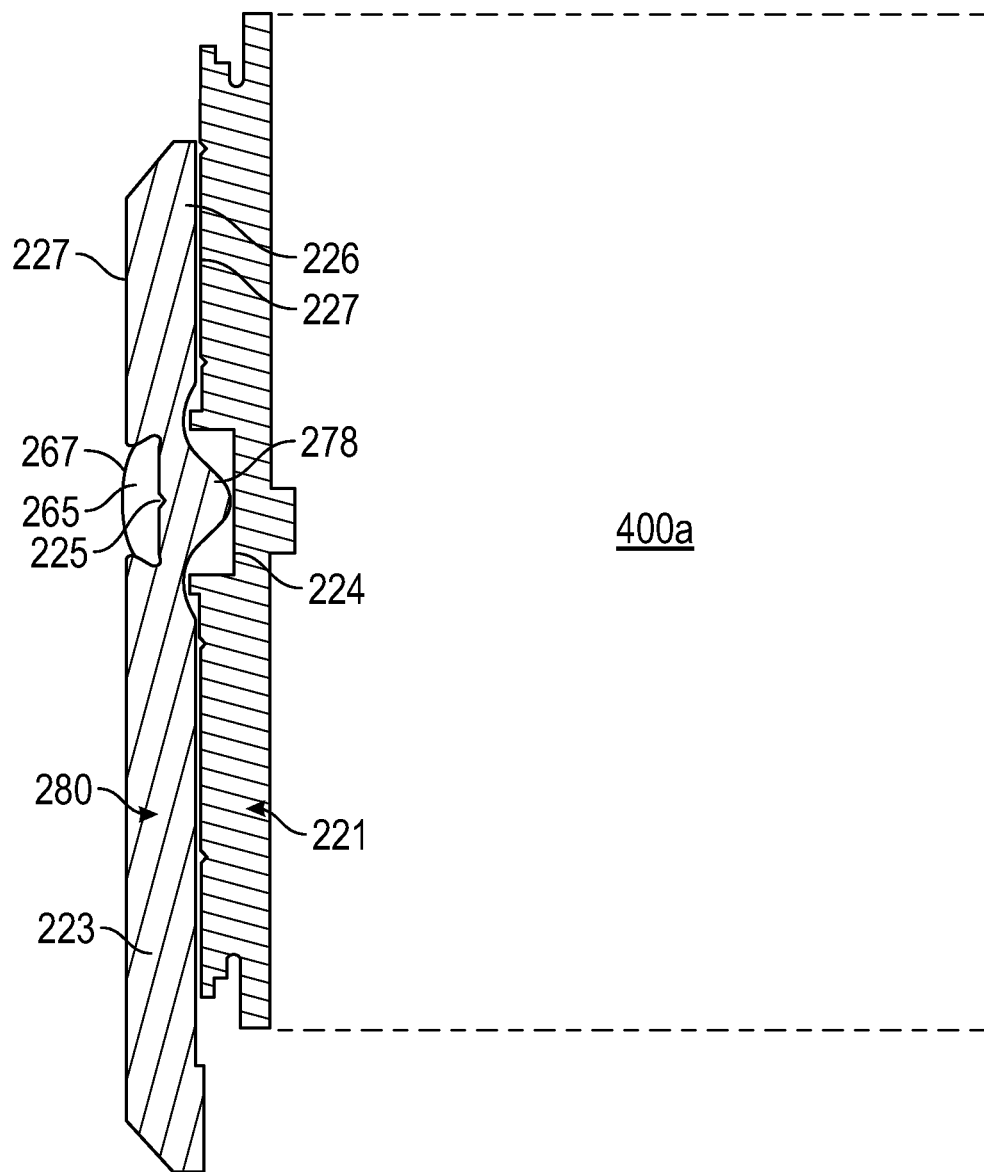
FIG. 20 is a side view of the junction between a roof skirt board and an I-beam end lock in accordance with the present inventions.

FIG. 20 depicts in cross section an exemplary positioning of roof skirt board 280. In particular, roof skirt board 280 is designed to be positioned against an I-beam end cap 221, in this instance the I-beam end cap 221 located on an exterior edge of roof portion 400a. Roof skirt board 280 includes an elongate seal plate 223 with an interior face 226 and an opposing exterior face 227. Roof skirt board 280 has such length as is desired, such as to span the entirety of the exterior edge of roof portion 400a. As shown in FIG. 20, the width of roof skirt board 280 can be sufficient to capture the thickness of the roof component 400, or portion thereof against which it is positioned, plus a portion of the abutting wall component 200 or wall portion.

The interior face 226 of roof skirt board 280 includes an elongate cinch key 278, which is preferably serpentine in cross section and dimensioned to be received in accessory slot 224 of I-beam end cap 221. Cinch key 278 can be the same length as the perimeter board 310, or can comprise space apart discrete segments. In turn, the exterior face 227 of roof skirt board 280 includes an elongate fastener slot 265 positioned over cinch key 278. Fastener slot 265 has a dovetail shape in cross section in the embodiment shown, and a length the same as, or substantially the same as, the length of roof skirt board 280. An elongate locating groove 225 is provided in the fastener slot 265 of roof skirt board 280, and provides a visual indication of where to place fasteners during construction.

Roof skirt board 280 facilitates the securing of roofing material, such as thermoplastic polyolefin membrane, to wall components 200. After fully unfolding the roof portions, such roofing material is optionally used to cover the top of roof component 400. The roofing material extending beyond roof component 400 is then folded down to extend between exterior face 227 of I-beam end cap 221 of roof portion 400*a* shown in FIG. 20 and interior face 226 of roof skirt board 280. After the roofing material is so positioned, nails or other fasteners are driven at spaced intervals along locating groove 225, to press roof skirt board 280 against the roofing material and secure the roofing material in place between roof skirt board 280 and I-beam end cap 221. Cinch key 278, if provided with a serpentine or like cross section, provides additional area, so as to better capture the roofing material. An elongate resilient strip 267, such as the one shown in FIG. 20, can be snapped into fastener slot 265 to cover any nail or fastener heads exposed in this slot.

Enclosure Component Sealing Structure Materials

The enclosure component sealing structures described herein can be fabricated from a number of materials, such as wood, aluminum, plastics and the like. It is preferred to fabricate the enclosure component sealing structures from foamed polyvinyl chloride (PVC), particularly Celuka foamed PVC. This material provides a strong, impact and crack-resistant lightweight material with a hard attractive exterior, which, in addition to contributing a sealing function, additionally contributes to the structural rigidity of the enclosure components 155.

Enclosure Component Sealing Structure Exemplary Placements

Figure 21A:
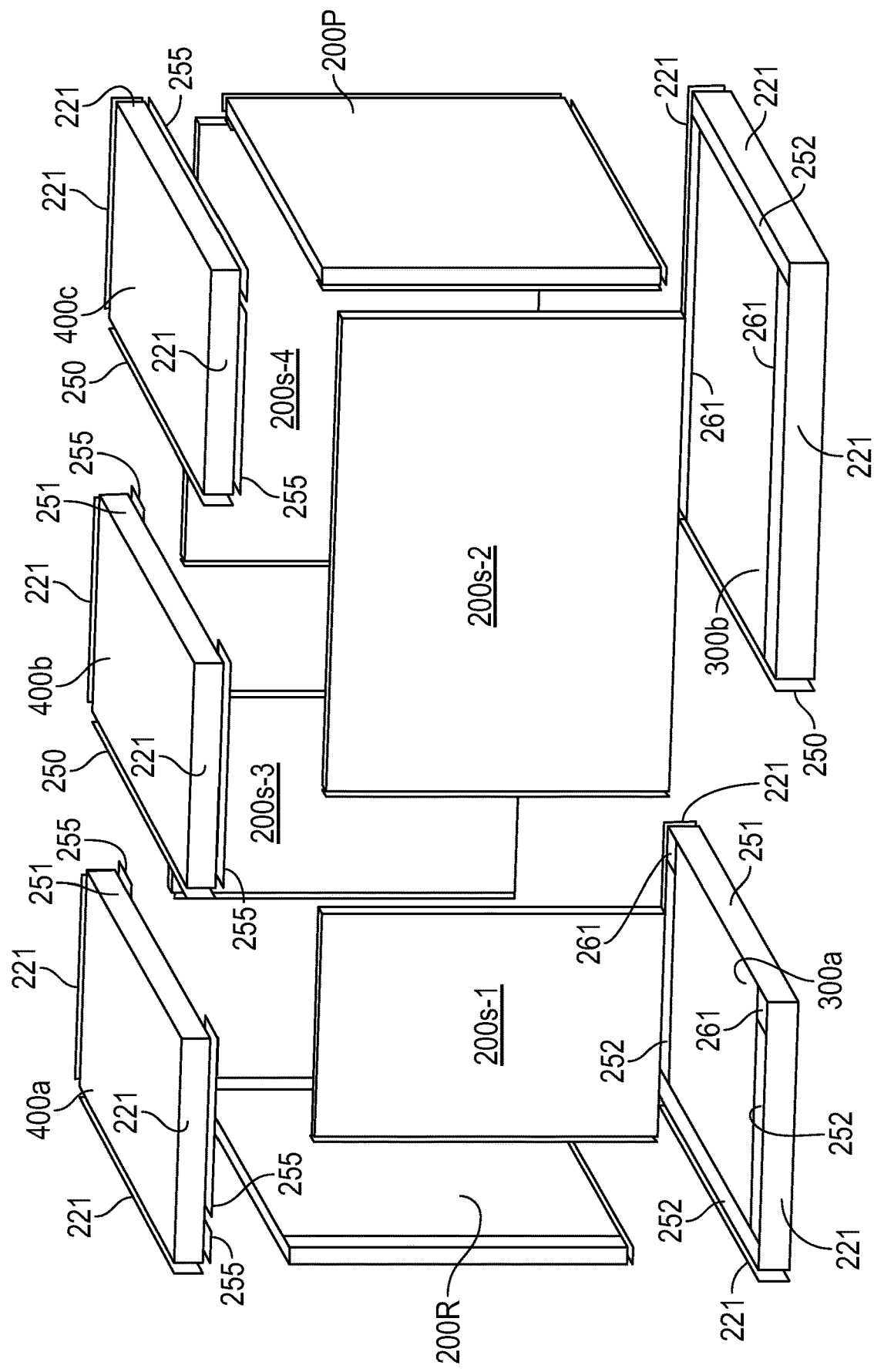
FIG. 21A is an exploded perspective view of a finished structure in accordance with the present inventions, depicting suitable locations for the sealing systems of the present inventions on the horizontally positioned enclosure components.
Figure 21B:
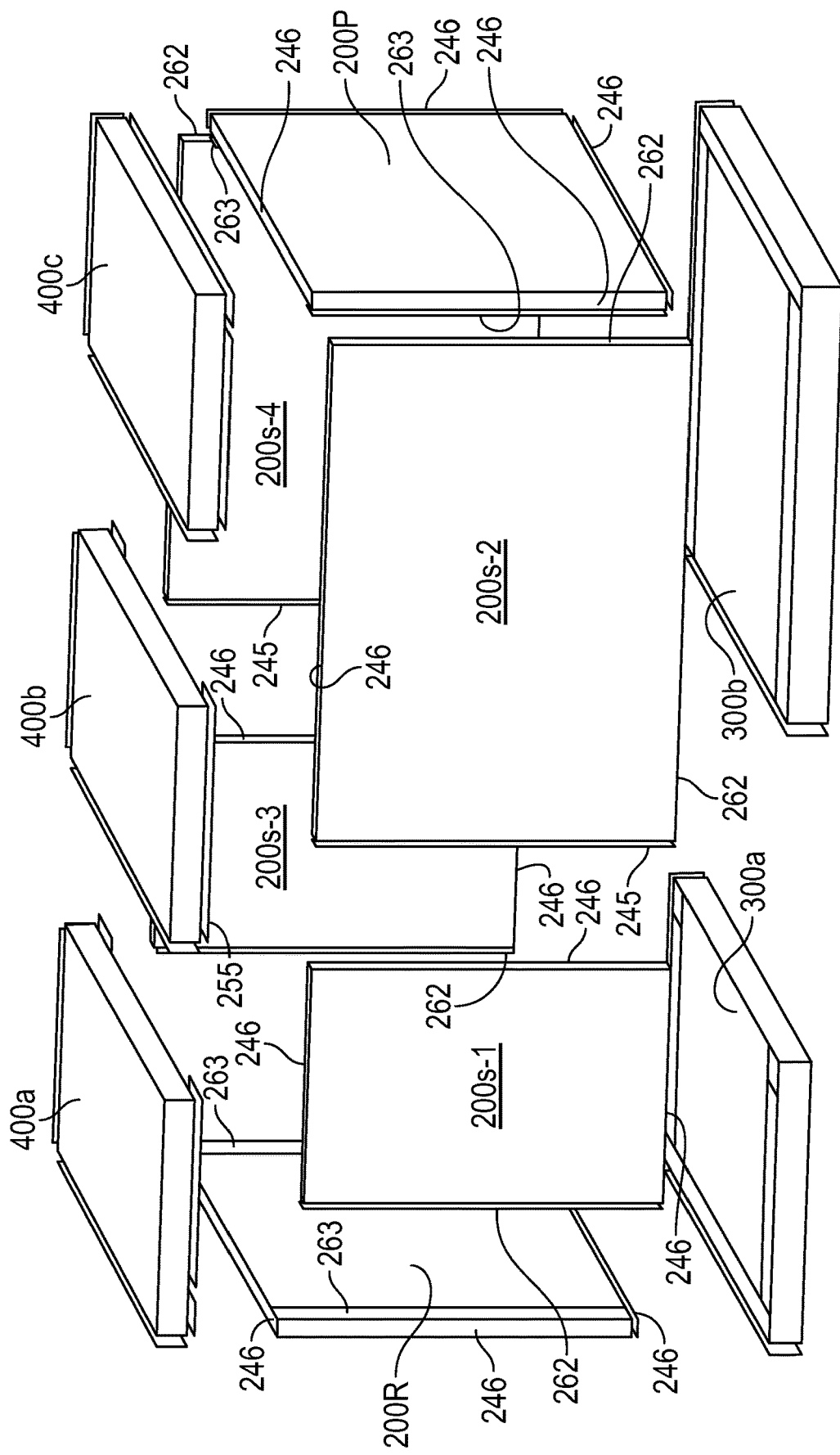
FIG. 21B is an exploded perspective view of a finished structure in accordance with the present inventions, depicting correspondingly suitable locations for the sealing systems of the present inventions on the vertically positioned enclosure components.

The exploded views in FIGS. 21A and 21B of structure 150 depicted in FIG. 1 provide exemplary placements of the enclosure component sealing structures described herein. For illustrative purposes to better understand some of these exemplary placements, certain of the enclosure component sealing structures shown in FIGS. 21A and 21B are shown slightly separated from the enclosure component 155 to which they are fastened.

Referring to FIG. 21A, I-beam end caps 221 can be utilized to seal the horizontal exterior edges of floor portion 300*a* (three placements), floor portion 300*b* (three placements), roof portion 300*a* (three placements), roof portion 300*b* (two placements) and roof portion 300*c* (three placements). Further, as shown in FIG. 21B and in detail in FIG. 12, the hinged junction between wall portion 200*s*-1 and 200*s*-2 can be sealed by positioning a wall end cap 246 on the vertical edge of wall portion 200*s*-1 and a wall vertical interlock 245 on the vertical edge of wall portion 200*s*-2. Likewise, the hinged vertical junction between wall portion 200*s*-3 and 200*s*-4 can be sealed as shown in FIG. 21B by positioning a wall end cap 246 on the hinged vertical edge of wall portion 200*s*-3 and a wall vertical interlock 245 on the hinged vertical edge of wall portion 200*s*-4.

In addition, as shown in FIGS. 21A and 21B, and in detail in FIG. 13, the horizontal junction between wall component 200R and roof portion 400*a* can be sealed by positioning a roof bottom plate 255 on the bottom face of roof portion 400*a* overlying wall component 200R and by positioning a wall end cap 246 on the horizontal edge of wall component 200R, which supports roof portion 400*a*. A like seal arrangement can be used to seal the horizontal junctions between roof portions 400*a*, 400*b* and 400*c*, and wall portions 200*s*-1 through 200*s*-4 (unfolded roof portion 400*b* will rest on unfolded wall portion 200*s*-2 and also on a section of wall portion 200*s*-1, as can be appreciated from FIG. 3), as well as to seal the horizontal junction between roof portion 400*c* and wall component 200P. The two vertical exterior edges of wall component 200R can each be sealed by positioning on each of them a wall end cap 246.

In a comparable manner, as shown in FIGS. 21A, 21B and in detail in FIG. 15, the horizontal junction between wall component 200R and floor portion 300*a* can be sealed by positioning a wall end cap 246 on the horizontal edge of wall component 200R resting on floor portion 300*a* and by positioning on the top face of floor portion 300*a* underlying wall component 200R a floor top plate 252. A like seal arrangement can be used to seal the horizontal junctions between floor portion 300*b* and wall component 200P, and between floor portion 300*a* and wall portions 200*s*-1 and 200*s*-3, up to the point where wall portion 200*s*-1 meets wall portion 200*s*-2, and up to the point where wall portion 200*s*-3 meets wall portion 200*s*-4. The two vertical exterior edges of wall component 200P can be sealed by positioning on each of them a wall end cap 246.

Furthermore, the hinged horizontal junction between roof portion 400*b* and roof portion 400*c*, as shown in FIG. 21A and in detail in FIG. 14, can be sealed by positioning an I-beam interlock A 250 on interior edge 412*c* of roof portion 400*c*, and an I-beam interlock B 251 on first interior edge 412*b* of roof portion 400*b*. Similarly, the hinged horizontal junction between roof portion 400*a* and roof portion 400*b* shown in FIG. 21A can be sealed by positioning an I-beam interlock A 250 on second interior edge 412*b* of roof portion 400*b*, and an I-beam interlock B 251 on interior edge 412*a* of roof portion 400*a*. In like manner, the hinged horizontal junction between floor portion 300*a* and floor portion 300*b* can be sealed by positioning an I-beam interlock A 250 on the interior edge 301*b* of floor portion 300*b* and an I-beam interlock B 251 on the interior edge 301*a* of floor portion 300*a*.

Referring now to FIGS. 21A, 21B and in detail to FIG. 17, the horizontal junction between wall portion 200*s*-2 and floor portions 300*a* and 300*b* can be sealed by positioning a wall end interlock A 262 on the bottom edge of wall portion 200*s*-2 and a floor top interlock 261 on the regions of the upper face of floor portions 300*a* and 300*b* underlying wall portion 200*s*-2 when wall portion 200*s*-2 is in its fully unfolded position. The horizontal junction between wall portion 200*s*-4 and floor portions 300*a* and 300*b* when wall portion 200*s*-4 in its fully unfolded position can be sealed similarly.

Finally, referring to FIG. 21B and in detail to FIG. 18, the vertical junction between wall portion 200*s*-2 and wall component 200P can be sealed by positioning a wall end interlock A 262 on the vertical edge of wall portion 200*s*-2 that is adjacent to wall component 200P when both wall portion 200*s*-2 and wall component 200P are in their fully unfolded positons, and by positioning a wall end interlock B 263 on the region of the interior face of wall component 200P that is adjacent wall portion 200*s*-2 when both wall portion 200s-2 and wall component 200P are in their fully unfolded positions. The vertical junction between wall portion 200s-4 and wall component 200P can be sealed in like manner.

Enclosure Component Manufacture

For enclosure components 155 utilizing the multi-layered, laminate design disclosed herein in reference to FIG. 7, the metal sheets 206 and 217 that can be used to form first structural layer 210 and second structural layer 215 respectively can be entirely flat and juxtaposed in a simple abutting relationship. Optionally, metal sheets 206 and 217 can be provided with edge structures that facilitate placement of sheets and panels during manufacture.

Particular edge structure designs for metal sheets 206 and 217 are described in U.S. Nonprovisional patent application Ser. No. 17/504,883 entitled "Sheet/Panel Design for Enclosure Component Manufacture," having the same inventors as the inventions described herein and filed on Oct. 19, 2021. The contents of U.S. Nonprovisional patent application Ser. No. 17/504,883 entitled "Sheet/Panel Design for Enclosure Component Manufacture," having the same inventors as the inventions described herein and filed on Oct. 19, 2021, are incorporated by reference as if fully set forth herein, particularly including the exterior and interior edge structure designs described for example at ¶¶ 00187-00205 and 00212 and in FIGS. 8, 9A-9C, 23A-23J and 24A-24B thereof.

A facility suitable for the manufacture of enclosure components 155, as well as exemplary manufacturing steps, are also described in U.S. Nonprovisional patent application Ser. No. 17/504,883 entitled "Sheet/Panel Design for Enclosure Component Manufacture," having the same inventors as the inventions described herein and filed on Oct. 19, 2021. The contents of U.S. Nonprovisional patent application Ser. No. 17/504,883 entitled "Sheet/Panel Design for Enclosure Component Manufacture," having the same inventors as the inventions described herein and filed on Oct. 19, 2021, are incorporated by reference as if fully set forth herein, particularly including the facility suitable for manufacturing the enclosure components 155 of the present invention, as well as exemplary manufacturing steps, described for example at ¶¶ 00178-00186 and 00206-00222, and in FIGS. 22, 23A-23J and 24A-24B.

Enclosure Component Relationships and Assembly for Transport

For ease of transport and maximum design flexibility, it is preferred that there be a specific dimensional relationship among enclosure components 155.

FIG. 2 shows a top schematic view of structure 150 shown in FIG. 1, and includes a geometrical orthogonal grid for clarity of explaining the preferred dimensional relationships among its enclosure components 155. The basic length used for dimensioning is indicated as "E" in FIG. 2; the orthogonal grid overlaid in FIG. 2 is 8 E long and 8 E wide; notably, the entire structure 150, including perimeter boards 310, preferably is bounded by this 8 E by 8 E orthogonal grid.

Roof portions 400a, 400b and 400c each can be identically dimensioned in the transverse direction. Alternatively, referring to FIG. 3, roof portion 400c (which is stacked upon roof portions 400a and 400b when roof portions 400b, 400c are fully folded) can be dimensioned to be larger than either of roof portion 400a and roof portion 400b in the transverse direction for example, by ten to fifteen percent, or by at least the aggregate thickness of roof components 400a and 400b. This transverse direction dimensional increase is to reduce the chances of binding during the unfolding of roof portions 400b, 400c. In addition, as described in U.S. Nonprovisional patent application Ser. No. 16/786,315, entitled "Equipment and Methods for Erecting a Transportable Foldable Building Structure," and filed on Feb. 10, 2020, friction-reducing components can be used to facilitate unfolding roof component 400, such as by positioning a first wheel caster at the leading edge of roof portion 400c proximate to the corner of roof portion 400c that is supported by wall portion 200s-2 as roof portion 400c is deployed, and by positioning a second similar wheel caster at the leading edge of roof portion 400c proximate to the corner of roof portion 400c that is supported by wall portion 200s-4 as roof portion 400c is deployed. In such a case, roof portion 400c can be dimensioned larger than either of roof portions 400a and 400b in the transverse direction by at least the aggregate thickness of roof components 400a and 400b, less the length of the first or second wheel caster.

In FIG. 2, the four wall components 200 are each approximately 8 E long, and each of roof portions 400a and 400b is approximately 8 E long and 2.5 E wide. Roof portion 400c is approximately 8 E long and 2.9 E wide. In FIGS. 2 and 3, each of floor components 300a and 300b is 8H long; whereas floor component 300a is just over 3 E wide and floor component 300b is just under 5 E wide.

The shipping module 100 shown edge-on in FIG. 3 includes a fixed space portion 102 defined by roof component 400a, floor component 300a, wall component 200R, wall portion 200s-1 and wall portion 200s-3. As shown in FIG. 2, fourth wall portion 200s-4 is folded inward and positioned generally against fixed space portion 102, and second wall portion 200s-2 is folded inward and positioned generally against fourth wall portion 200s-4 (wall portions 200s-2 and 200s-4 are respectively identified in FIG. 2 as portions 200s-2f and 200s-4f when so folded and positioned). The three roof components 400a, 400b and 400c are shown unfolded in FIG. 1 and shown folded (stacked) in FIG. 3, with roof component 400b stacked on top of roof component 400a, and roof component 400c stacked on top of the roof component 400b. Wall component 200P, shown in FIGS. 2 and 3, is pivotally secured to floor portion 300b at the location of axis 105, and is vertically positioned against the outside of wall portions 200s-2 and 200s-4. In turn, floor portion 300b is vertically positioned proximate fixed space portion 102, with wall component 200P pending from floor portion 300b between floor portion 300b and wall portions 200s-2 and 200s-4.

Sizing the enclosure components 155 of structure 150 according to the dimensional relationships disclosed above yields a compact shipping module 100, as can be seen from the figures. Thus shipping module 100 depicted in FIG. 3, when dimensioned according to the relationships disclosed herein using an "E" dimension (see FIG. 2) of approximately 28.625 inches (72.7 cm), and when its components are stacked and positioned as shown in FIG. 3, has an overall length of approximately 19 feet (5.79 m), an overall width of approximately 8.5 feet (2.59 meters) and an overall height of approximately 12.7 feet (3.87 meters). These overall dimensions are less than a typical shipping container.

It is preferred that the fixed space portion 102 be in a relatively finished state prior to positioning (folding) together of all other wall, roof and floor portions as described above. In the embodiment shown in FIGS. 1 and 2, wall components 200 are fitted during manufacture and prior to shipment with all necessary door and window assemblies, with the enclosure components 155 being prewired, and fixed space portion 102 is fitted during manufacture with all mechanical and other functionality that structure 150 will require, such as kitchens, bathrooms, closets and other interior partitions, storage areas, corridors, etc. An interior design for fixed space portion 102 is described in U.S. Nonprovisional application Ser. No. 17/587,051, entitled "Wall Component Appurtenances," filed on Jan. 28, 2022 and having the same inventors as this disclosure. The contents of that U.S. Nonprovisional patent application Ser. No. 17/587,051, entitled "Wall Component Appurtenances," filed on Jan. 28, 2022 and having the same inventors as this disclosure are incorporated by reference as if fully set forth herein, particularly including the interior design details for fixed space portion 102 described for example at ¶¶ 0082-85 and depicted in FIGS. 11A-11C thereof. Carrying out the foregoing steps prior to shipment permits the builder, in effect, to erect a largely finished structure 150 simply by "unfolding" (deploying) the positioned components of shipping module 100.

Each of the wall, floor and roof components 200, 300 and 400, and/or the portions thereof, can be sheathed in protective film 177 during fabrication and prior to forming the shipping module 100. Alternatively or in addition, the entire shipping module 100 can be sheathed in a protective film. Such protective films can remain in place until after the shipping module 100 is at the construction site, and then removed as required to facilitate enclosure component deployment and finishing.

Shipping Module Transport

The shipping module 100 is shipped to the building site by appropriate transport means. One such transport means is disclosed in U.S. Pat. No. 11,007,921, issued May 18, 2021; the contents of which are incorporated by reference as if fully set forth herein, particularly as found at paragraphs 0020-0035 and in FIGS. 1A-2D thereof. As an alternative transport means, shipping module 100 can be shipped to the building site by means of a conventional truck trailer or a low bed trailer (also referred to as a lowboy trailer), and in the case of over-the-water shipments, by ship.

The movement of shipping module 100 is facilitated by the presence of fork tubes 360a, 360b in floor portion 300a. For example, a shipping module can be moved from factory to a transport means using an appropriately-sized forklift, with the forks of the forklift being inserted into fork tubes 360a, 360b. As another example, straps pending from a reach stacker or a ship-to-shore crane, typically used to move intermodal containers, can be passed by ground personnel through fork tubes 360a, 360b and then appropriately secured, to permit movement of the shipping module 100. Addition of perimeter board 310 can be deferred until after shipping module 100 is delivered to its desired location. Alternatively, perimeter board 310 can be provided with cut-outs so as to permit straps or forks to have access to fork tubes 360a, 360b, which cut-outs optionally can be covered and/or filled once access to fork tubes 360a, 360b is no longer needed.

Structure Deployment and Finishing

At the building site, shipping module 100 is positioned over its desired location, such as over a prepared foundation; for example, a poured concrete slab, a poured concrete or cinder block foundation, sleeper beams or concrete posts or columns. This can be accomplished by using a crane, either to lift shipping module 100 from its transport and move it to the desired location, or by positioning the transport means over the desired location, lifting shipping module 100, then moving the transport means from the desired location, and then lowering shipping module 100 to a rest state at the desired location. Particularly suitable equipment and techniques for facilitating the positioning of a shipping module 100 at the desired location are disclosed in U.S. Nonprovisional patent application Ser. No. 16/786,315, entitled "Equipment and Methods for Erecting a Transportable Foldable Building Structure," and filed on Feb. 10, 2020. The contents of that U.S. Nonprovisional patent application Ser. No. 16/786,315, entitled "Equipment and Methods for Erecting a Transportable Foldable Building Structure," and filed on Feb. 10, 2020, are incorporated by reference as if fully set forth herein, particularly including the equipment and techniques described for example at ¶¶ 00126-00128 and in connection with FIGS. 11A and 11B thereof.

Following positioning of shipping module 100 at the building site, the appropriate portions of wall, floor and roof components 200, 300 and 400 are "unfolded" (i.e., deployed) to yield structure 150. Unfolding occurs in the following sequence: (1) floor portion 300b is pivotally rotated about horizontal axis 305 (shown in FIGS. 3 and 4) to an unfolded position, (2) wall component 200P is pivotally rotated about horizontal axis 105 (shown in FIG. 3 behind perimeter board 312) to an unfolded position, (3) wall portions 200s-2 and 200s-4 are pivotally rotated about vertical axes 192 and 194 (shown in FIG. 2) respectively to unfolded positions, and (4) roof portions 400b and 400c are pivotally rotated about horizontal axes 405a and 405b (shown in FIGS. 3 and 4) respectively to unfolded positions.

A mobile crane can be used to assist in the deployment of certain of the enclosure components 155, specifically roof portions 400b and 400c, floor portion 300b, as well as the wall component 200P pivotally secured to floor portion 300b. Alternatively, particularly suitable equipment and techniques for facilitating the deployment of enclosure components 155 are disclosed in U.S. Nonprovisional patent application Ser. No. 16/786,315, entitled "Equipment and Methods for Erecting a Transportable Foldable Building Structure," and filed on Feb. 10, 2020. The contents of that U.S. Nonprovisional patent application Ser. No. 16/786,315, entitled "Equipment and Methods for Erecting a Transportable Foldable Building Structure," and filed on Feb. 10, 2020, are incorporated by reference as if fully set forth herein, particularly including the equipment and techniques described for example at ¶¶ 00132-00145 and depicted in FIGS. 12A-14B thereof.

After unfolding, the enclosure components 155 are secured together to finish the structure 150 that is shown in FIG. 1. Perimeter board 312 and roof skirt board 280 provide structures for securing wall, floor and roof components in their deployed positions. In addition, certain appurtenances can be fitted to wall components 200 to facilitate fastening them to floor component 300, as well as to improve the interior appearance and speed fabrication. Further details regarding these appurtenances are described in U.S. Nonprovisional patent application Ser. No. 17/587,051, entitled "Wall Component Appurtenances," filed on Jan. 28, 2022 and having the same inventors as this disclosure. The contents of that U.S. Nonprovisional patent application Ser. No. 17/587,051, entitled "Wall Component Appurtenances," filed on Jan. 28, 2022 and having the same inventors as this disclosure are incorporated by reference as if fully set forth herein, particularly including the first and second appurtenance designs described for example at ¶¶ 0047-61 and depicted in FIGS. 8A-10C thereof.

If any temporary hinge structures have been utilized, then these temporary hinge structures can be removed if desired and the enclosure components 155 can be secured together. During or after unfolding and securing of the enclosure components 155, any remaining finishing operations are performed, such as addition of roofing material, and making hook-ups to electrical, fresh water and sewer lines to complete structure 150, as relevant here.

Building Configuration Options

Any number of structures 150 can be positioned together at the desired site, to yield a multitude of different structural configurations. Interior staircases for such multi-story structures can be provided during manufacture in fixed space portion 102, together with insertion of an appropriate access aperture in roof component 400, or can be added after erection. Likewise, a pitched roof and other architectural additions can be delivered separately from shipping module 100 or fabricated on-site, and positioned onto roof component 400 of structure 150.

Figure 22:
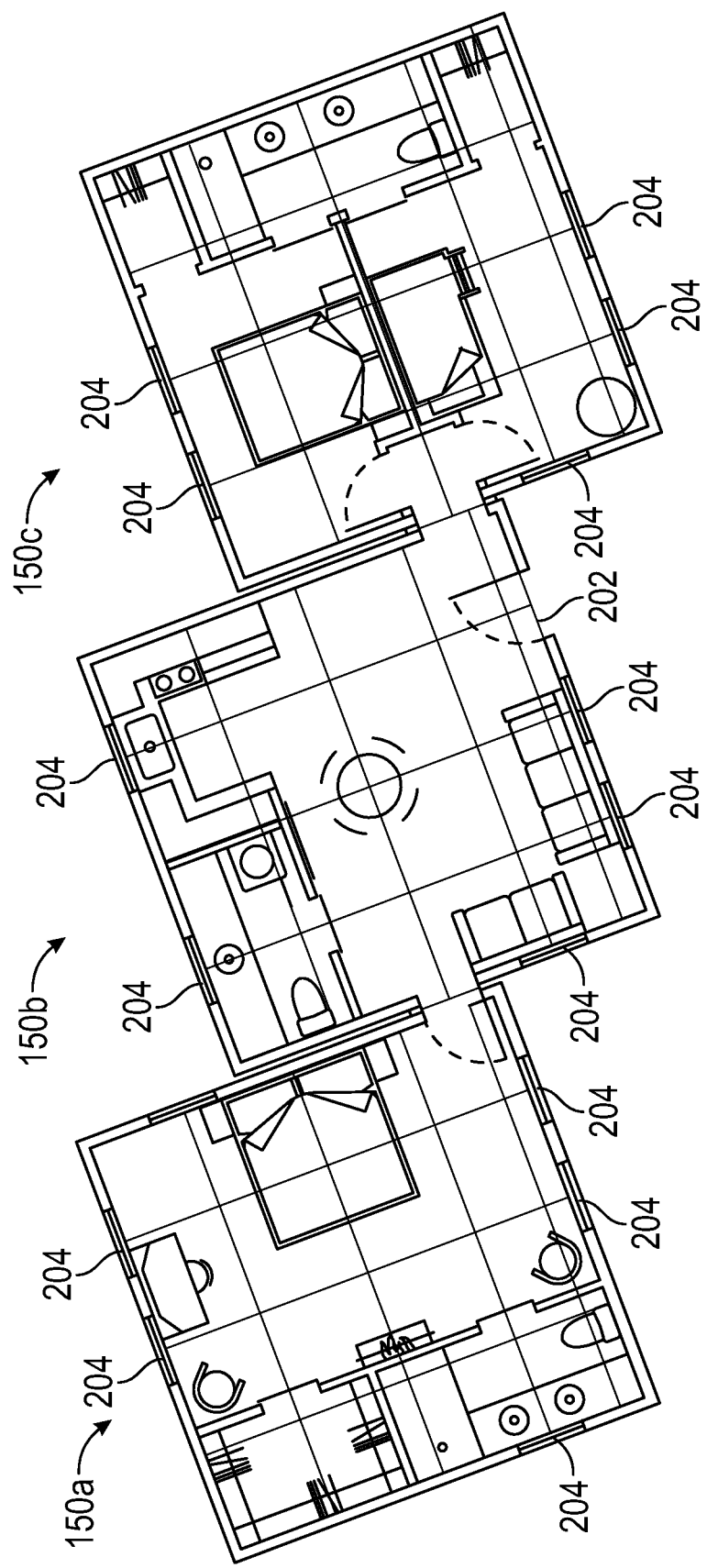
FIG. 22 depicts the layout of a three room structure fabricated in accordance with the present inventions.

For example, two or more structures 150 can be erected so that a wall component 200 of one structure is placed adjacent a wall component 200 of the other structure. The builder can then cut apertures in those juxtaposed regions to connect the two structures, either in the factory or on-site, in accordance with the marketer's or purchaser's choices. As one example, FIG. 22 depicts the floor plan of three structures 150, namely 150a, 150b and 150c, arranged side-by-side to yield one housing unit with three rooms. In such a case, the perimeter boards 310 of the adjoining structures 150 can abut each other, thereby providing a space between the adjoining structures 150 through which utility lines can be passed.

Figure 23:
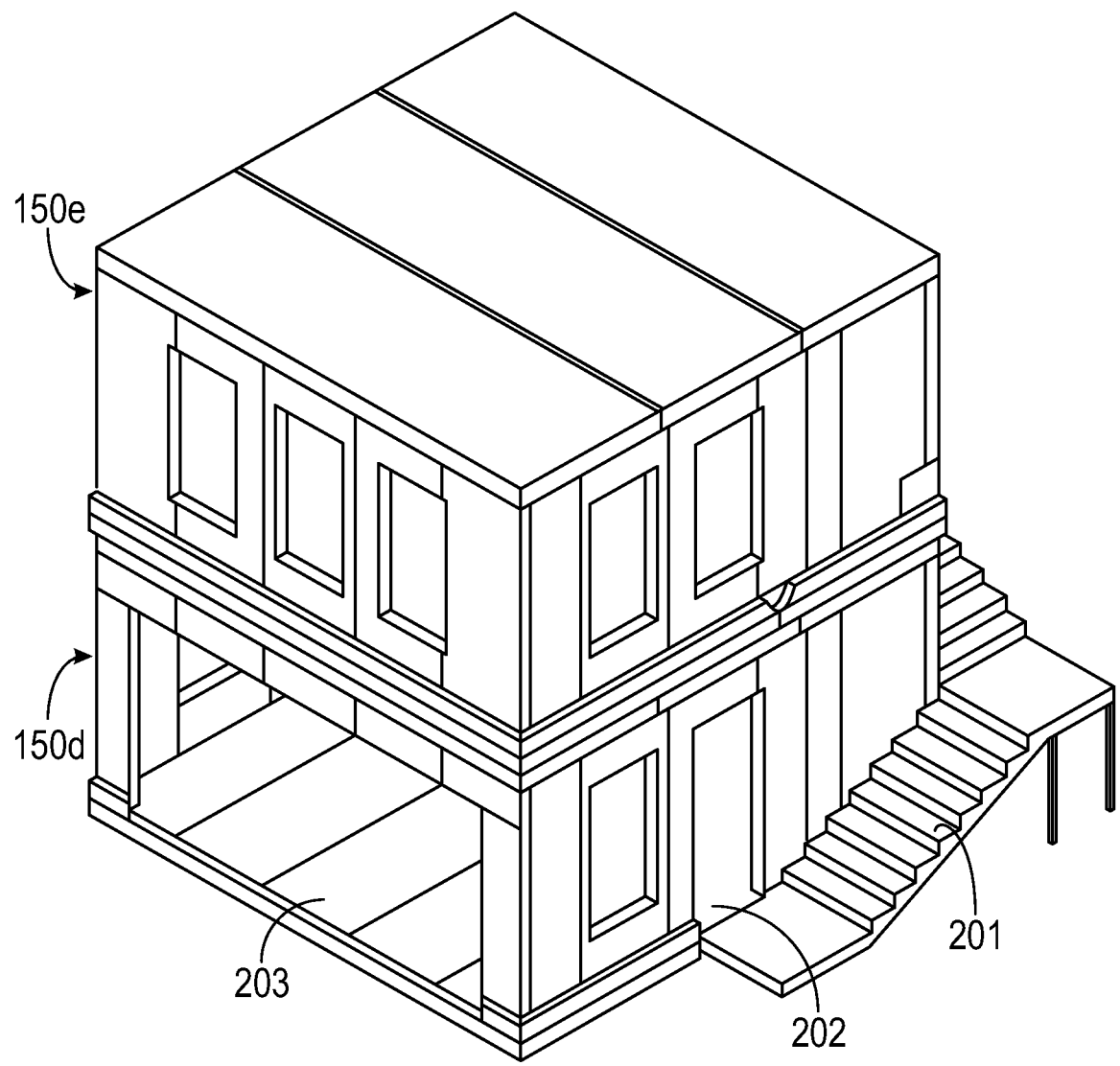
FIG. 23 is a perspective view of a two story structure fabricated in accordance with the present inventions.

Structures 150 can also be stacked, one on top of the other, to create multi-story structures. FIG. 23 depicts a structure 150e positioned on top of a structure 150d to yield a two story structure. Thus as shown in FIG. 23, there is provided a garage aperture 203 in addition to door aperture 202 on the first level, as well as a door aperture 202 (not visible) on the second level, which is accessed via exterior stairway 201.

Figure 24:
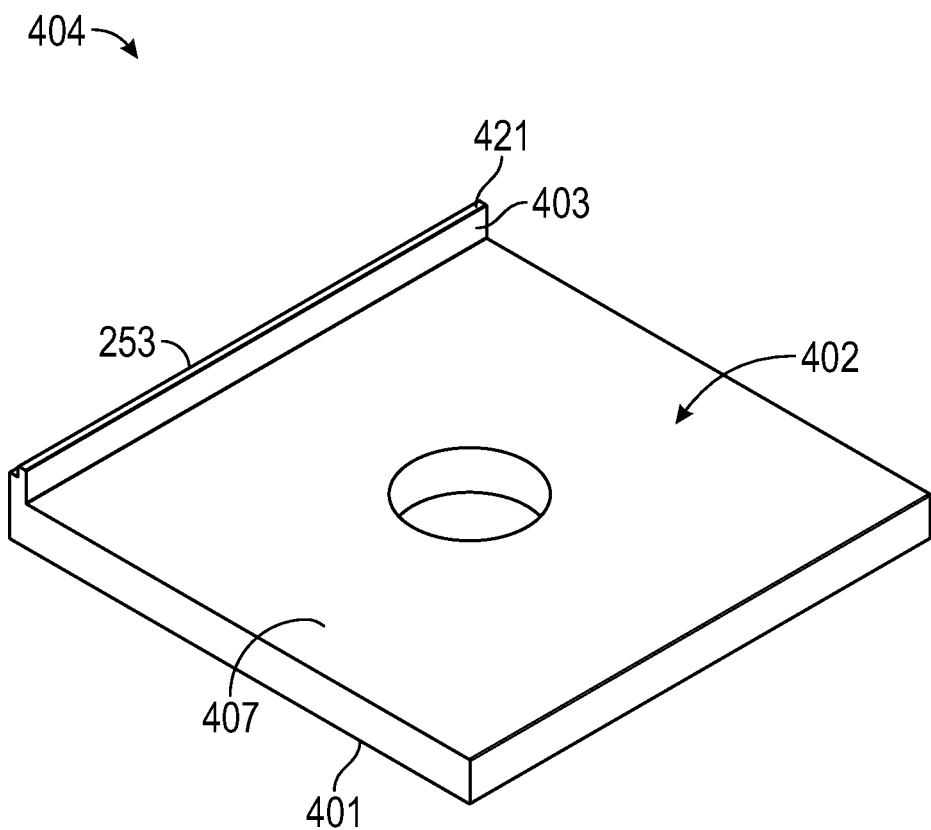
FIG. 24 is a perspective view of an exemplary spacer plate in accordance with the present inventions.

In the case of stacking structures 150, such as structure 150e shown in FIG. 23 stacked on top of structure 150d, spacer plates 404 can be used to separate the floor component 300 of the structure 150e from the roof component 400 of the structure 150d. FIG. 24 shows an embodiment of a spacer plate 404, which comprises a planar base 402 having an interior face 407, an opposed exterior face 401 (not visible in FIG. 24), and a thickness. There is a lip 403 extending away from the interior face 407 of base 402 in a perpendicular direction. The edge 421 of lip 403 distal from interior face 407 is provided with a set of stepped locating ridges 253. The geometry of these ridges 253 is such as to be able to mesh with the corresponding stepped locating ridges 253 shown of I-beam end cap 221.

In use, spacer plates 404 can be provided on the bottom surface of the floor component 300 of the upper structure 150 (structure 150e in FIG. 23), positioned along the first and second longitudinal floor edges 117 and 119, and along the first and second transverse floor edges 120 and 118. Spacer plates 404 can also be provided on the top surface of the roof component 400 of the lower structure 150 (structure 150d in FIG. 23), positioned along the first and second longitudinal roof edges 406 and 416, and along the first transverse and second transverse roof edges 408 and 410.

Figure 25:
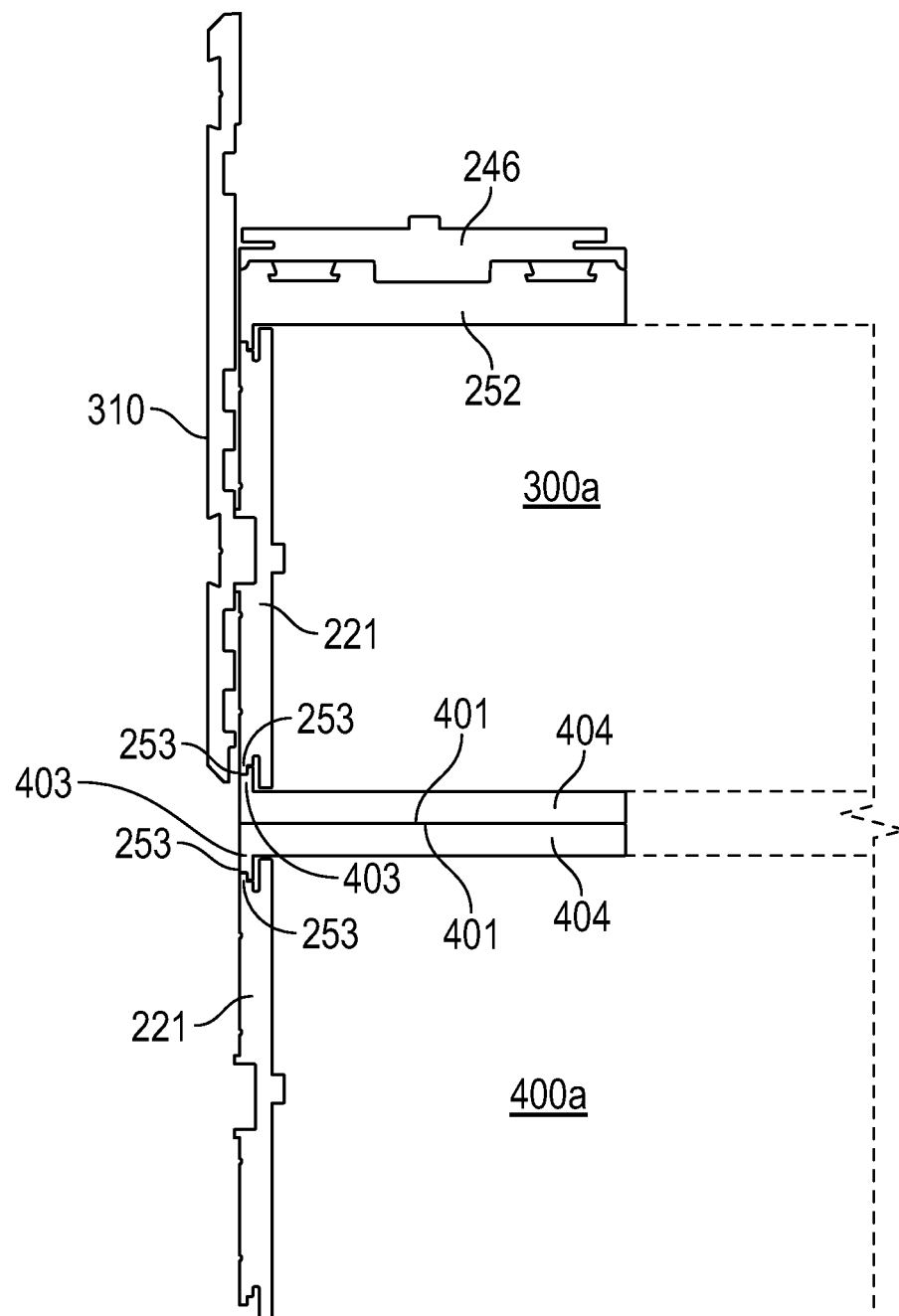
FIG. 25 is a side view depicting the arrangement of spacer plates in connection with two stacked structures.

The spacer plates 404 associated with the upper structure 150 can be positioned to overlie the spacer plates 404 associated with the lower structure 150. When the spacer plates 404 are employed in such a manner, the spacer plates 404 associated with the upper structure 150 support the weight and loads of the upper structure 150, and transfer that weight and loads to lower structure 150 through the spacer plates 404 associated with lower structure 150. As shown in FIG. 25, the locating ridges 253 on spacer plates 404 engage the corresponding locating ridges 253 on the I-beam end caps 221 of floor component 300 (shown for floor portion 300a) and roof component 400 (shown for roof portion 400a).

Although depicted at having a relative square shape in FIG. 24, spacer plate 404 can be made elongate, or can be provided with a length the same, or substantially the same, as the length of the roof or floor edges at which they are positioned, as preferred. Where the length of spacer plate 404 is less than the length of the roof or floor edges at which they are positioned, a plurality of spacer plates can be provided in segments along those edges, again in accordance with preference. Such spacer plates 404 provide an air barrier between the levels of the multi-story structure. Spacer plates 404 can be made for example from acrylonitrile butadiene styrene plastic or extruded polyvinyl chloride plastic.

As necessary, means can be utilized to secure stacked structures 150 each to the other, such as by use of steel reinforcing plates fastened at spaced-apart locations to join an overlying floor component 300 to an underlying roof component 400.

This disclosure should be understood to include (as illustrative and not limiting) the subject matter set forth in the following numbered clauses:

Clause 1. A folded building structure transportable to a desired site at which the building structure is to be erected, comprising:

(a) a fixed space portion including a planar rectangular first floor portion having first and second longitudinal floor edges, first and second transverse floor edges and a thickness, the first floor portion comprising across the thickness (i) a first structural layer having a first face and an opposing second face; (ii) a foam panel layer having a first face and an opposing second face, the first face of the foam panel layer being bonded to the opposing second face of the first structural layer; (iii) a second structural layer having a first face and an opposing second face, the first face of the second structural layer being bonded to the opposing second face of the foam panel layer; and (iv) a first edge reinforcement proximate the first longitudinal floor edge, and a second edge reinforcement proximate the second longitudinal floor edge;

(b) the first floor portion having between the first structural layer and the second structural layer (i) a first fork tube oriented in a transverse direction and spanning the distance from the first longitudinal floor edge to the second longitudinal floor edge so as to define a first aperture in the first longitudinal floor edge and a second aperture in the second longitudinal floor edge, (ii) a planar elongate longitudinally-oriented first fork tube plate secured to the first edge reinforcement and to the first fork tube; and (iv) a planar elongate longitudinally-oriented second fork tube plate secured to the second edge reinforcement and to the first fork tube.

Clause 2. The folded building structure of clause 1, wherein the first floor portion additionally has between the first structural layer and the second structural layer (ii) a second fork tube oriented in a transverse direction, spaced apart from the first fork tube and spanning the distance from the first longitudinal floor edge to the second longitudinal floor edge so as to define a third aperture in the first longitudinal floor edge and a fourth aperture in the second longitudinal floor edge, (ii) a planar elongate longitudinally-oriented third fork tube plate secured to the first edge reinforcement and to the second fork tube; and (iv) a planar elongate longitudinally-oriented fourth fork tube plate secured to the second edge reinforcement and to the first fork tube.

Clause 3. The folded building structure of clause 2, wherein the first fork tube plate extends beyond the first fork tube along the first edge reinforcement in a direction away from the second fork tube, and the third fork tube plate extends beyond the second fork tube along the first edge reinforcement in an opposite direction away from the first fork tube.

Clause 4. The folded building structure of clause 2, wherein the second fork tube plate extends beyond the first fork tube along the second edge reinforcement in a direction away from the second fork tube, and the fourth fork tube plate extends beyond the second fork tube along the second edge reinforcement in an opposite direction away from the first fork tube.

Clause 5. The folded building structure of any one of clause 1, 2, 3 or 4, wherein the first structural layer of the floor portion is a metal sheet layer.

Clause 6. The folded building structure of any one of clause 2, 3, 4 or 5, wherein the first and second fork tubes are rectangular in cross section.

Clause 7. The folded building structure of any one of clause 2, 3, 4, 5 or 6, wherein the first and second fork tubes are in contact with the first structural layer.

Clause 8. The folded building structure of any one of clauses 1-7, further comprising:
(d) a planar rectangular second floor portion having third and fourth longitudinal floor edges, third and fourth transverse floor edges and a thickness, the second floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; and (iii) a second structural layer having a first face and an opposing second face, the first face of the second structural layer being bonded to the opposing second face of the foam panel layer; and
(f) means for pivotally connecting floor portion to the second floor portion to permit the second floor portion to angularly rotate, about a horizontal axis proximate the second and third longitudinal floor edges, from a second floor portion folded position angularly oriented relative to the first floor portion to a second floor portion unfolded position coplanar with the first floor portion.

Clause 9. A folded building structure transportable to a desired site at which the building structure is to be erected, comprising:
(a) a fixed space portion including a planar rectangular first floor portion having first and second longitudinal floor edges, first and second transverse floor edges and a thickness, the first floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; (iii) a second structural layer having a first face and an opposing second face, the first face of the second structural layer being bonded to the opposing second face of the foam panel layer;
(iv) a first edge reinforcement proximate the first longitudinal floor edge, and a second edge reinforcement proximate the second longitudinal floor edge;
(b) a first beam reinforcing the laminate construction and oriented in a transverse direction, with a first end positioned proximate the first longitudinal floor edge and a second end positioned proximate the second longitudinal floor edge;
(c) the first floor portion having between the first structural layer and the second structural layer (i) a first fork tube oriented in the transverse direction and spaced-apart to a first side of the first beam, the first fork tube spanning the distance from the first longitudinal edge to the second longitudinal edge so as to define a first aperture in the first longitudinal floor edge and a second aperture in the second longitudinal floor edge, (ii) a planar elongate longitudinally-oriented first fork tube plate positioned against and secured to the first edge reinforcement and to the first fork tube, and having a longitudinal length spanning the distance between the first fork tube and the first beam; and (iv) a planar elongate longitudinally-oriented second fork tube plate positioned against and secured to the second edge reinforcement and to the first fork tube, and having a longitudinal length spanning the distance between the first fork tube and the first beam.

Clause 10. The folded building structure of clause 9, wherein the first floor portion additionally has between the first structural layer and the second structural layer (ii) a second fork tube oriented in a transverse direction, and spaced-apart to a second side of the first beam opposite the first side, the second fork tube spanning the distance from the first longitudinal edge to the second longitudinal edge so as to define a third aperture in the first longitudinal floor edge and a fourth aperture in the second longitudinal floor edge, (ii) a planar elongate longitudinally-oriented third fork tube plate secured to the first edge reinforcement and to the second fork tube, and having a longitudinal length spanning the distance between the second fork tube and the first beam; and (iv) a planar elongate longitudinally-oriented fourth fork tube plate secured to the second edge reinforcement and to the first fork tube, and having a longitudinal length spanning the distance between the second fork tube and the first beam.

Clause 11. The folded building structure of clause 10, wherein the first fork tube plate extends beyond the first fork tube along the first edge reinforcement in a direction away from the first beam, and the third fork tube plate extends beyond the second fork tube along the first edge reinforcement in an opposite direction away from the first beam.

Clause 12. The folded building structure of either of clause 10 or clause 11, wherein the second fork tube plate extends beyond the first fork tube along the second edge reinforcement in a direction away from the first beam, and the fourth fork tube plate extends beyond the second fork tube along the second edge reinforcement in an opposite direction away from the first beam.

Clause 13. The folded building structure of any one of clause 9, 10, 11 or 12, wherein the first structural layer of the floor portion is a metal sheet layer.

Clause 14. The folded building structure of any one of clause 10, 11, 12 or 13, wherein the first and second fork tubes are rectangular in cross section.

Clause 15. The folded building structure of clause 14, wherein the first and second fork tubes are in contact with the first structural layer.

Clause 16. The folded building structure of any one of clause 9, 10, 11, 12, 13 or 14, further comprising:

(d) a planar rectangular second floor portion having third and fourth longitudinal floor edges, third and fourth transverse floor edges and a thickness, the second floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; and (iii) a second structural layer having a first face and an opposing second face, the first face of the second structural layer being bonded to the opposing second face of the foam panel layer;

(e) a second beam reinforcing the laminate construction of the second floor portion and oriented in a transverse direction, with a third end positioned proximate the third longitudinal floor edge and a fourth end positioned proximate the fourth longitudinal floor edge; and (f) the third end of the second beam pivotally connected to the second end of the first beam to permit the second floor portion to angularly rotate, about a horizontal axis proximate the second and third longitudinal floor edges, from a second floor portion folded position angularly oriented relative to the first floor portion to a second floor portion unfolded position coplanar with the first floor portion.

Clause 17. The folded building structure of any one of clauses 2-4, 6-7 and 10-16, wherein the second fork tube is a metal.

Clause 18. The folded building structure of any one of clauses 2-4, 6-7 and 10-17, wherein each of the third and fourth fork tube plates is a metal.

Clause 19. The folded building structure of any one of clauses 1-18, wherein the first fork tube is a metal.

Clause 20. The folded building structure of any one of clauses 1-19, wherein each of the first and second fork tube plates is a metal.

Clause 21. The folded building structure of any one of clause 17, 18, 19 and 20, wherein the metal is steel.

Clause 22. The folded building structure of any one of clauses 1-21, wherein each of the first and second edge reinforcements is laminated strand lumber board.

What is claimed is:

1. A folded building structure transportable to a desired site at which the building structure is to be erected, comprising:
(a) a fixed space portion including a planar rectangular first floor portion having first and second longitudinal floor edges, first and second transverse floor edges and a thickness, the first floor portion comprising across the thickness (i) a first structural layer having a first face and an opposing second face; (ii) a foam panel layer having a first face and an opposing second face, the first face of the foam panel layer being bonded to the opposing second face of the first structural layer; (iii) a second structural layer having a first face and an opposing second face, the first face of the second structural layer being bonded to the opposing second face of the foam panel layer; and (iv) a first edge reinforcement proximate the first longitudinal floor edge, and a second edge reinforcement proximate the second longitudinal floor edge;
(b) the first floor portion having between the first structural layer and the second structural layer (i) a first fork tube oriented in a transverse direction and spanning a distance from the first longitudinal floor edge to the second longitudinal- floor edge so as to define a first aperture in the first longitudinal floor edge and a second aperture in the second longitudinal floor edge, (ii) a planar elongate longitudinally-oriented first fork tube plate secured to the first edge reinforcement and to the first fork tube; and (iv) a planar elongate longitudinally-oriented second fork tube plate secured to the second edge reinforcement and to the first fork tube.

2. The folded building structure of claim 1, wherein the first floor portion additionally has between the first structural layer and the second structural layer (ii) a second fork tube oriented in a transverse direction, spaced apart from the first fork tube and spanning the distance from the first longitudinal floor edge to the second longitudinal floor edge so as to define a third aperture in the first longitudinal floor edge and a fourth aperture in the second longitudinal floor edge, (ii) a planar elongate longitudinally-oriented third fork tube plate secured to the first edge reinforcement and to the second fork tube; and (iv) a planar elongate longitudinally-oriented fourth fork tube plate secured to the second edge reinforcement and to the first fork tube.

3. The folded building structure of claim 2, wherein the first fork tube plate extends beyond the first fork tube along the first edge reinforcement in a direction away from the second fork tube, and the third fork tube plate extends beyond the second fork tube along the first edge reinforcement in an opposite direction away from the first fork tube.

4. The folded building structure of claim 2, wherein the second fork tube plate extends beyond the first fork tube along the second edge reinforcement in a direction away from the second fork tube, and the fourth fork tube plate extends beyond the second fork tube along the second edge reinforcement in an opposite direction away from the first fork tube.

5. The folded building structure of claim 2, wherein the first structural layer of the floor portion is a metal sheet layer.

6. The folded building structure of claim 2, wherein the first and second fork tubes are rectangular in cross section.

7. The folded building structure of claim 6, wherein the first and second fork tubes are in contact with the first structural layer.

8. The folded building structure of claim 2, wherein the second fork tube is a metal.

9. The folded building structure of claim 2, wherein each of the third and fourth fork tube plates is a metal.

10. The folded building structure of claim 1, wherein the first fork tube is a metal.

11. The folded building structure of claim 1, wherein each of the first and second fork tube plates is a metal.

12. The folded building structure of claim 11, wherein the metal is steel.

13. The folded building structure of claim 1, wherein each of the first and second edge reinforcements is laminated strand lumber board.

14. The folded building structure of claim 1, further comprising:
(d) a planar rectangular second floor portion having third and fourth longitudinal floor edges, third and fourth transverse floor edges and a thickness, the second floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; and (iii) a second structural layer having a first face and an opposing second face, the first face of the second structural layer being bonded to the opposing second face of the foam panel layer; and (f) means for pivotally connecting floor portion to the second floor portion to permit the second floor portion to angularly rotate, about a horizontal axis proximate the second and third longitudinal floor edges, from a second floor portion folded position angularly oriented relative to the first floor portion to a second floor portion unfolded position coplanar with the first floor portion.

15. A folded building structure transportable to a desired site at which the building structure is to be erected, comprising:
(a) a fixed space portion including a planar rectangular first floor portion having first and second longitudinal floor edges, first and second transverse floor edges and a thickness, the first floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; (iii) a second structural layer having a first face and an opposing second face, the first face of the second structural layer being bonded to the opposing second face of the foam panel layer; (iv) a first edge reinforcement proximate the first longitudinal floor edge, and a second edge reinforcement proximate the second longitudinal floor edge;
(b) a first beam reinforcing the laminate construction and oriented in a transverse direction, with a first end positioned proximate the first longitudinal floor edge and a second end positioned proximate the second longitudinal floor edge;
(c) the first floor portion having between the first structural layer and the second structural layer (i) a first fork tube oriented in the transverse direction and spaced-apart to a first side of the first beam, the first fork tube spanning a distance from the first longitudinal edge to the second longitudinal edge so as to define a first aperture in the first longitudinal floor edge and a second aperture in the second longitudinal floor edge, (ii) a planar elongate longitudinally-oriented first fork tube plate positioned against and secured to the first edge reinforcement and to the first fork tube, and having a longitudinal length spanning a distance between the first fork tube and the first beam; and (iv) a planar elongate longitudinally-oriented second fork tube plate positioned against and secured to the second edge reinforcement and to the first fork tube, and having a longitudinal length spanning the distance between the first fork tube and the first beam.

16. The folded building structure of claim 15, wherein the first floor portion additionally has between the first structural layer and the second structural layer (ii) a second fork tube oriented in a transverse direction, and spaced-apart to a second side of the first beam opposite the first side, the second fork tube spanning the distance from the first longitudinal edge to the second longitudinal edge so as to define a third aperture in the first longitudinal floor edge and a fourth aperture in the second longitudinal floor edge, (ii) a planar elongate longitudinally-oriented third fork tube plate secured to the first edge reinforcement and to the second fork tube, and having a longitudinal length spanning a distance between the second fork tube and the first beam; and (iv) a planar elongate longitudinally-oriented fourth fork tube plate secured to the second edge reinforcement and to the first fork tube, and having a longitudinal length spanning the distance between the second fork tube and the first beam.

17. The folded building structure of claim 16, wherein the first fork tube plate extends beyond the first fork tube along the first edge reinforcement in a direction away from the first beam, and the third fork tube plate extends beyond the second fork tube along the first edge reinforcement in an opposite direction away from the first beam.

18. The folded building structure of claim 16, wherein the second fork tube plate extends beyond the first fork tube along the second edge reinforcement in a direction away from the first beam, and the fourth fork tube plate extends beyond the second fork tube along the second edge reinforcement in an opposite direction away from the first beam.

19. The folded building structure of claim 16, wherein the second fork tube is a metal.

20. The folded building structure of claim 16, wherein each of the third and fourth fork tube plates is a metal.

21. The folded building structure of claim 15, wherein the first structural layer of the floor portion is a metal sheet layer.

22. The folded building structure of claim 21, wherein the first and second fork tubes are rectangular in cross section.

23. The folded building structure of claim 22, wherein the first and second fork tubes are in contact with the first structural layer.

24. The folded building structure of claim 15, further comprising:
(d) a planar rectangular second floor portion having third and fourth longitudinal floor edges, third and fourth transverse floor edges and a thickness, the second floor portion having a laminate construction comprising across the thickness (i) a first structural layer having a first face and an opposing second face; (ii) a foam panel layer having a first face and an opposing second face, the first face of the foam panel layer being bonded to the opposing second face of the first structural layer; and (iii) a second structural layer having a first face and an opposing second face, the first face of the second structural layer being bonded to the opposing second face of the foam panel layer;
(e) a second beam reinforcing the laminate construction of the second floor portion and oriented in a transverse direction, with a third end positioned proximate the third longitudinal floor edge and a fourth end positioned proximate the fourth longitudinal floor edge; and
(f) the third end of the second beam pivotally connected to the second end of the first beam to permit the second floor portion to angularly rotate, about a horizontal axis proximate the second and third longitudinal floor edges, from a second floor portion folded position angularly oriented relative to the first floor portion to a second floor portion unfolded position coplanar with the first floor portion.

25. The folded building structure of claim 15, wherein the first fork tube is a metal.

26. The folded building structure of claim 15, wherein each of the first and second fork tube plates is a metal.

27. The folded building structure of claim 26, wherein the metal is steel.

28. The folded building structure of claim 15, wherein each of the first and second edge reinforcements is laminated strand lumber board.

* * * * *